(12) United States Patent
Anandakumar et al.

(10) Patent No.: US 7,822,021 B2
(45) Date of Patent: *Oct. 26, 2010

(54) SYSTEMS, PROCESSES AND INTEGRATED CIRCUITS FOR RATE AND/OR DIVERSITY ADAPTATION FOR PACKET COMMUNICATIONS

(75) Inventors: Krishnasamy Anandakumar, San Diego, CA (US); Vishu R. Viswanathan, Plano, TX (US); Alan V. McCree, Acton, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/636,463

(22) Filed: Dec. 11, 2009

(65) Prior Publication Data

US 2010/0085986 A1 Apr. 8, 2010

Related U.S. Application Data

(62) Division of application No. 10/885,911, filed on Jul. 6, 2004, now Pat. No. 7,653,045, which is a division of application No. 09/461,159, filed on Dec. 14, 1999, now Pat. No. 6,765,904.

(60) Provisional application No. 60/148,191, filed on Aug. 10, 1999.

(51) Int. Cl.
*H04L 12/66* (2006.01)

(52) U.S. Cl. .................... 370/352; 370/328; 370/400; 370/395.21

(58) Field of Classification Search ......... 370/350–356, 370/328, 338, 395.1, 389, 400, 473; 455/403, 455/422.1, 426.1, 426.2, 428, 445, 462, 463, 455/554.1–555; 704/208, 219, 220, 222–223
See application file for complete search history.

(56) References Cited

U.S. PATENT DOCUMENTS

| | | | | |
|---|---|---|---|---|
| 5,450,449 | A * | 9/1995 | Kroon | 375/350 |
| 6,161,086 | A * | 12/2000 | Mukherjee et al. | 704/207 |
| 6,301,265 | B1 * | 10/2001 | Kleider et al. | 370/465 |
| 6,445,697 | B1 * | 9/2002 | Fenton | 370/357 |
| 6,496,477 | B1 * | 12/2002 | Perkins et al. | 370/228 |
| 6,744,757 | B1 * | 6/2004 | Anandakumar et al. | 370/352 |
| 6,757,256 | B1 * | 6/2004 | Anandakumar et al. | 370/252 |
| 6,765,904 | B1 * | 7/2004 | Anandakumar et al. | 370/389 |

(Continued)

*Primary Examiner*—Kamran Afshar
(74) *Attorney, Agent, or Firm*—Lawrence J. Bassuk; W. James Brady; Frederick J. Telecky, Jr.

(57) ABSTRACT

A media over packet networking appliance provides a network interface, a voice transducer, and at least one integrated circuit assembly coupling the voice transducer to the network interface. The at least one integrated circuit assembly provides media over packet transmissions and holds bits defining reconstruction of a packet stream having a primary stage and a secondary stage. The secondary stage has one or more of linear predictive coding parameters, long term prediction lags, parity check, and adaptive and fixed codebook gains. The packet stream has an instance of single packet loss, and the reconstruction includes receiving a packet sequence represented by P(n)P(n−1)', [Lost Packet], P(n+2)P(n+1)', and P(n+3)P(n+2)', obtaining as information from the secondary stage one or more of the linear predictive coding parameters, long term prediction lags, parity check, and adaptive and fixed codebook gains, and performing an excitation reconstruction utilizing said packet sequence thus received.

5 Claims, 21 Drawing Sheets

U.S. PATENT DOCUMENTS 6,801,532 B1 * 10/2004 Anandakumar et al. ..... 370/394
7,574,351 B2 * 8/2009 Anandakumar et al. ..... 704/201
2004/0252701 A1 * 12/2004 Anandakumar et al. 370/395.21

* cited by examiner

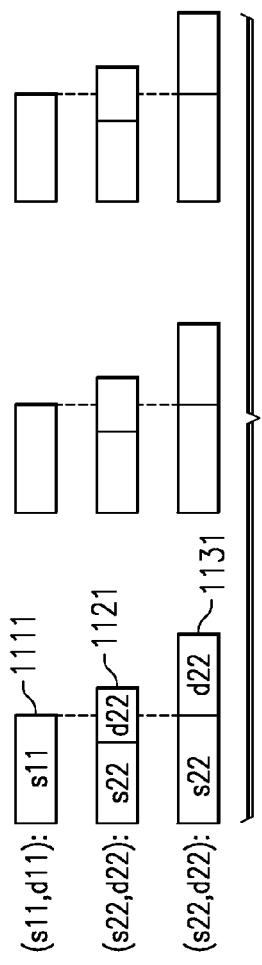
FIG. 11
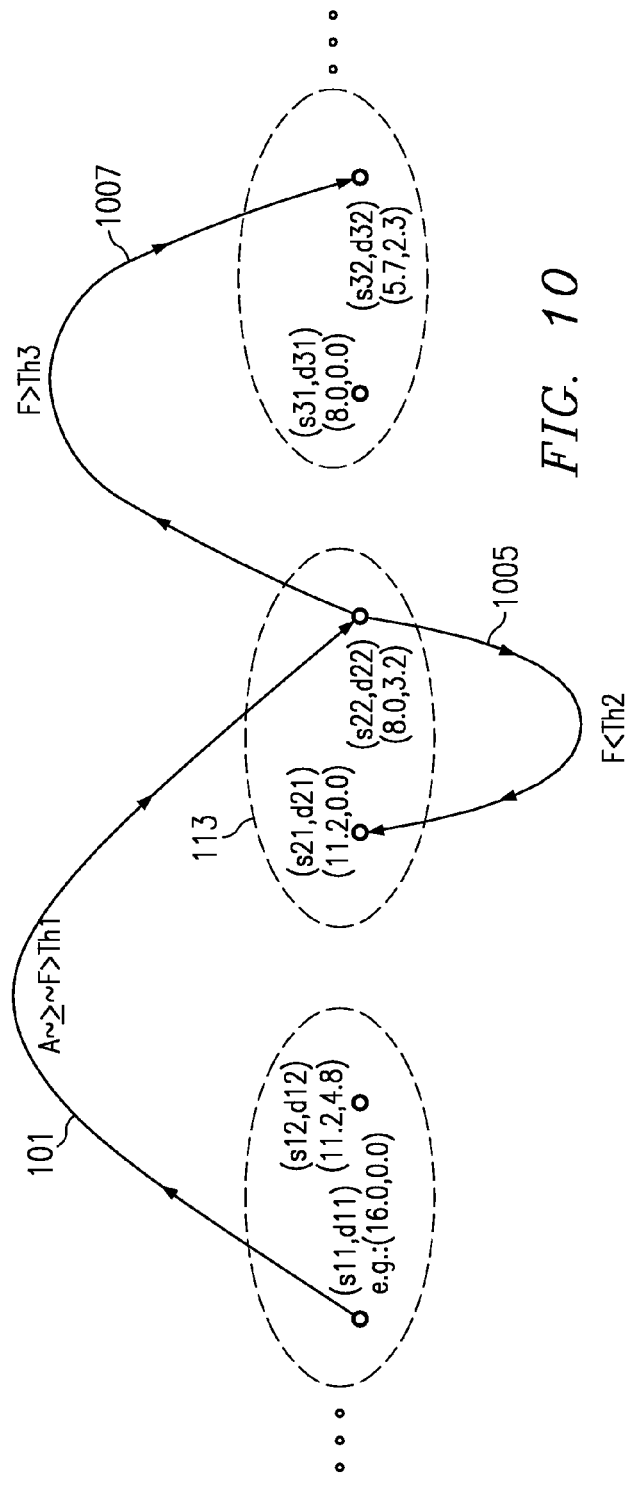
FIG. 10
FIG. 9

SYSTEMS, PROCESSES AND INTEGRATED CIRCUITS FOR RATE AND/OR DIVERSITY ADAPTATION FOR PACKET COMMUNICATIONS

CROSS-REFERENCE TO RELATED APPLICATIONS

This application is a divisional of prior application Ser. No. 10/885,911, filed Jul. 6, 2004;
which was a divisional of prior application Ser. No. 09/461,159, filed Dec. 14, 1999, now U.S. Pat. No. 6,765,904, granted Jul. 20, 2004;
which claims priority from Provisional Application No. 60/148,191, filed Aug. 10, 1999.

TI-28893P Processes, articles and Packets For Network Path Diversity In Media Over Packet Applications," now U.S. Pat. No. 6,496,477, issued Dec. 17, 2002.

TI-27834P "System for Dynamic Adaptation of Data/Channel Coding in Wireless Communications" by J. DeMartin, A. McCree, and K. Anandakumar, Ser. No. 60/086,217 filed May 21, 1998, now U.S. Pat. No. 6,421,527, issued Jul. 16, 2002.

TI-21753P "PC Circuits, Systems and Methods" by John L. So, Ser. No. 60/014,734 filed Apr. 2, 1996, now U.S. Pat. No. 5,978,590, issued Nov. 16, 1999.

TI-25535 "Devices, Methods, Systems and Software Products for Coordination of Computer Main Microprocessor and Second Microprocessor Coupled Thereto" by John L. So, Jeffrey L. Kerr, Steven R. Magee and Jun Tang, Ser. No. 08/833,267 filed Apr. 4, 1997, now U.S. Pat. No. 6,179,489, issued Jan. 30, 2001.

FIELD OF THE INVENTION

The present invention relates to the fields of integrated circuits, networking, systems and processes for packet communications, and especially communication of real time information such as voice, audio, images, video and other real time information over packet.

BACKGROUND OF THE INVENTION

The Internet has long been usable for Internet file transfers and e-mail by packet switched communication. A different technology called circuit switched communication is used in the PSTN (public switched telephone network) wherein a circuit is dedicated to each phone call regardless of whether the circuit is being communicated over in silent periods. Packet switched networks do not dedicate a channel, thereby sharing a pipe or channel among many communications and their users. Packets may vary in their length, and have a header for source information, destination information, number of bits in the packet, how many items, priority information, and security information.

A packet of data often traverses several nodes as it goes across the network in "hops." In a stream of data, the packets representative thereof may, and often do, take different paths through the network to get the destination. The packets arrive out of order sometimes. The packets are not only merely delayed relative to the source, but also have delay jitter. Delay jitter is variability in packet delay, or variation in timing of packets relative to each other due to buffering within nodes in the same routing path, and differing delays and/or numbers of hops in different routing paths. Packets may even be actually lost and never reach their destination. Delay jitter is a packet-to-packet concept for the present purposes, and jitter of bits within a given packet is a less emphasized subject herein.

Voice over Packet (VOP) and Voice over Internet Protocol (VoIP) are sensitive to delay jitter to an extent qualitatively more important than for text data files for example. Delay jitter produces interruptions, clicks, pops, hisses and blurring of the sound and/or images as perceived by the user, unless the delay jitter problem can be ameliorated or obviated. Packets that are not literally lost, but are substantially delayed when received, may have to be discarded at the destination nonetheless because they have lost their usefulness at the receiving end. Thus, packets that are discarded, as well as those that are literally lost, are all called "lost packets" herein except where a more specific distinction is made explicit or is plain from the context.

The user can rarely tolerate as much as half a second (500 milliseconds) of delay, and even then may avoid using VOP if its quality is perceptibly inferior to other readily available and albeit more expensive transmission alternatives. Such avoidance may occur with delays of 250 milliseconds or even less, while Internet phone technology hitherto may have suffered from end-to-end delays of as much as 600 milliseconds or more.

Hitherto, one approach has stored the arriving packets in a buffer, but if the buffer is too short, packets are lost. If the buffer is too long, it contributes to delay.

If the network is very congested, and the packet is routed by a large number of hops, the ratio of lost packets to sent packets in a given time window interval can rise not just to 5-10% but even to 25% or more, and the real-time communication becomes degraded. VOP quality requires low lost packet ratio measured in a relatively short time window interval (length of oral utterance for instance, with each packet representing a compressed few centiseconds of speech). By contrast, text file reception can reorder packets during a relatively much longer window interval of reception of text and readying it for printing, viewing, editing, or other use. Voice can be multiplexed along with other data on a packet network inexpensively over long distances and internationally, at low expense compared with circuit-switched PSTN charges.

A Transport Control Protocol (TCP) sometimes used in connection with the IP (Internet Protocol) can provide for packet tags, detection of lost and out-of-order packets by examination of the packet tags and retransmission of the lost packets from the source. TCP is useful for maintaining transmission quality of e-mail and other non-real-time data. However, the delay inherent in the request-for-retransmission process currently may reduce the usefulness of TCP and other ARQ (automatic retransmission request) approaches as a means of enhancing VOP communications.

RTP (Real Time Transport Protocol) and RTCP (RTP Control Protocol) add time stamps and sequence numbers to the packets, augmenting the operations of the network protocol such as IP. However, these do not provide QoS (Quality of Service) control.

For real-time communication some solution to the problem of packet loss is imperative, and the packet loss problem is exacerbated in heavily-loaded packet networks. Also, even a lightly-loaded packet network with a packet loss ratio of 0.1% perhaps, still requires some mechanism to deal with the circumstances of lost packets.

A conventional speech compression algorithm has a portion that samples, digitizes and buffers speech in a frame buffer in frame intervals (e.g. 20 milliseconds), or frames, and another portion that compresses the sampled digitized speech from one of the frames while more speech is being added to the buffer. If the speech is sampled at 8 kiloHertz, then each 20 millisecond example frame has 160 analog speech samples (8×20). If an 8-bit analog to digital converter (ADC) is used, then 1280 bits (160×8) result as the digitized form of the sampled speech in that 20 millisecond frame. Next the compression algorithm converts the 1280 bits to fewer bits carrying the same or almost the same speech information. Suppose the algorithm provides 8:1 compression. Then 1280/8 bits, or 160 bits of compressed or coded speech result from compression. The compressed speech is then put in the format of a packet, thus called packetized, by a packetizer process.

For every frame of compressed speech in a packet, loss of that packet means loss of each frame in that packet. There then arises the problem how to create 160 bits or more of lost compressed speech. One known approach simply repeats the most recent previous frame that is available at the receiving destination. Another known approach fills the output frame with silence (zeroes). Reduction of packet loss and packet loss handling strategy are very important challenges in advancing VOP technology.

SUMMARY OF THE INVENTION

In one form of the invention, a process of sending packets of real-time information at a sender includes steps of initially generating at the sender the packets of real-time information with a source rate greater than zero kilobits per second, and a time or path or combined time/path diversity rate, the amount of diversity initially being at least zero kilobits per second. The process sends the packets, thereby resulting in a quality of service QoS, and optionally obtains at the sender a measure of the QoS. Another step compares the QoS with a threshold of acceptability, and when the QoS is on an unacceptable side of said threshold increases the diversity rate and sends not only additional ones of the packets of real-time information but also sends diversity packets at the diversity rate as increased. Also, rate/diversity adaptation decision may be performed at receiver.

Increasing the diversity rate while either reducing or keeping unchanged the overall transmission rate is an important new improvement in even solely-time-diversity embodiments.

Further forms of the invention involve new criteria for initiating adaptation transitions, and new types of transitions including number of packets-per-second transitions, diversity transitions, source rate transitions and mixtures thereof.

In another form of the invention a single-chip integrated circuit includes a processor circuit, and a source rate/diversity control. Here again, the diversity is contemplated to be time diversity, path diversity and combined time/path diversity in various embodiments.

Other forms of the invention encompass other processes, improved packets and packet ensembles, integrated circuits, chipsets, computer add-in cards, information storage articles, systems, computers, gateways, routers, cellular telephone handsets, wireless base stations, appliances, and packet networks, and other forms as claimed.

BRIEF DESCRIPTION OF THE DRAWINGS

FIG. 9 is a diagram of a RTP packet;

FIG. 10 is another state transition diagram for a process embodiment with a media-specific redundancy example of adaptive control of combinations called states, of source rate and diversity in a media over packet sending computer;

FIG. 11 is a diagrammatic representation of packets in different states, wherein time extends horizontally as successive columns in FIG. 11, and the different states correspond to different rows of differently labeled packets in FIG. 11 wherein overall transmission rate is allowed to exceed that of an s11 state;

DETAILED DESCRIPTION OF PREFERRED EMBODIMENTS

Figure 1:
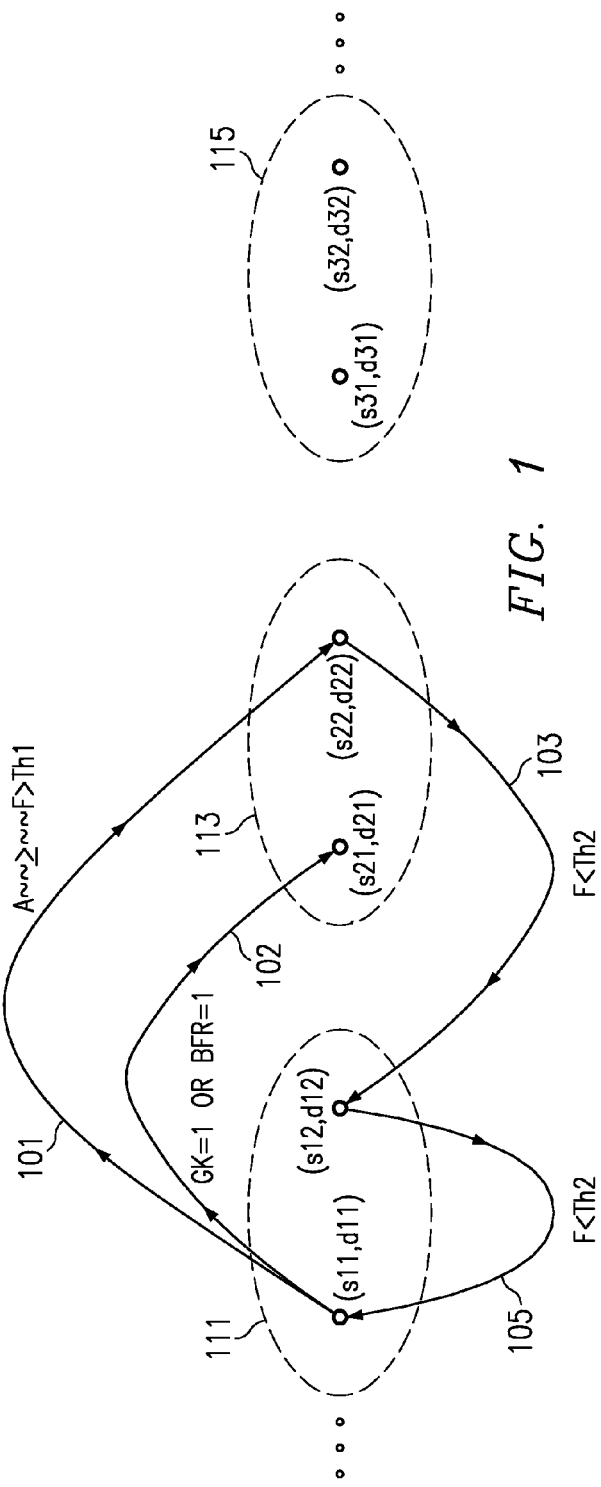
FIG. 1 is a state transition diagram for a process embodiment of adaptive control of combinations called states, of source rate and diversity rate in a media over packet sending computer.

Various embodiments provide adaptive, robust VoIP/VOP/media over packet (including real time signals over packet) solutions. They provide approaches to packet network improvements for incorporation into VoIP/VOP/media-over-packet IETF, TIPHON, and ITU standards. Packet loss resilience encoding and packet loss handling are improved. Adaptive delay and delay jitter handling contribute to efficient playout and congestion detection. An adaptive delay and/or delay jitter handling mechanism is integrated with speech, audio, video and image coders. Constrained rate/diversity adaptation processes and systems embodiments control congestion robustly.

In packet loss resilience encoding and packet loss handling, sender based diversity embodiments improve G.729 and Texas Instruments code excited linear prediction (TI-CELP) codec among other coders. The following document is hereby incorporated herein by reference for use where G.729 is referred to herein: International Telecommunication Union ITU-T G.729 (03/96) Telecommunication Standardization Sector of ITU, General Aspects of Digital Transmission Systems, Coding of Speech at 8 kbit/s Using Conjugate-Structure Algebraic-Code-Excited Linear-Prediction (CS-ACELP), ITU-T Recommendation G.729.

For example, information about packet n is sent in packets $\{n+k: k>0\}$ in a packet sequence:

$$[P(n-1)'P(n)][P(n)'P(n+1)][P(n+1)'P(n+2)][P(n+2)'P(n+3)]$$

Computationally-efficient CELP based important information redundancy schemes are provided.

Computationally-efficient multiple description CELP coding is provided.

Adaptive delay and adaptive delay jitter handling advantageously compensate delay variation in arriving packets, detect delay-spikes of delay value due to congestion, and increase playout delay and send congestion notification.

Adaptive delay and adaptive delay jitter handling process is suitably integrated with G.729 codec and other codecs.

Combined adaptation on both source rate $s_{ij}$ and packet network diversity rate $d_{ij}$, a process called rate/diversity adaptation herein, robustly controls congestion. Some embodiments herein use source rate adaptation alone, with advantageous simplicity and QoS improvement compared to approaches hitherto. Also, further embodiments use diversity adaptation alone or combined with source rate adaptation with the following advantages for real-time traffic:

- overcome distributed congestion
- handle heterogeneous traffics
- overcome packet losses due to bit errors (as in modem/satellite links)
- compensate for packet losses due to processing limitations, late-arrival, etc.
- recognize that during DTX (discontinuous transmission), feedback is not provided.

To handle congestion, TCP reduces the number of packets transmitted and uses retransmission which often introduces unacceptable delay and delay jitter for real-time traffic. In rate/diversity adaptation for real-time communication, diversity is advantageously introduced.

As is described herein, rate/diversity adaptation for robust congestion control offers features in one or another of the embodiments, such as

- Overall transmission rate is reduced during congestion
- Increases source rate through multiple stages
- Avoids oscillations between states by incremental changes based on different thresholds or other transition criteria
- Robust adaptation mechanism or process
- Adaptation mechanism takes into account loss, high delay and delay jitter
- Combines adaptive delay/delay-jitter handling, for congestion detection and playout adaptation
- Works with multiple description (MD) packets improved with diversity processes, devices and systems
- Works with Important Information (I-I) based redundancy packets improved with diversity processes, devices and systems
- Improves other redundancy packet networking techniques both with new temporal diversity and path diversity processes, devices and systems.

Important areas of improvement for VoIP/VOP technology involve minimizing delays inside computers and their software, lowering network latency, and tightening network jitter. One or more of these advantages are conferred by some of the embodiments described herein.

By adapting transmission rate and the amount of time or path or combined time/path diversity in VoIP/VOP applications, robust solutions advantageously handle network impairments and congestion, while utilizing network resources efficiently.

Improvements in VoIP/VOP processes, integrated circuits and systems utilizing path diversity are described in the coassigned patent U.S. Pat. No. 6,496,477 "Integrated Circuits, Systems, Apparatus, Packets and Processes Utilizing Path Diversity for Media Over Packet Applications," which is incorporated herein by reference. In one category of embodiments, the skilled worker uses the circuits and methods described in the incorporated material and adds the adaptive features further described herein.

RTP/UDP/IP protocols do not offer QoS control mechanisms. Hence, VoIP applications, if they were to use RTP/UDP/IP protocols, suffer from fluctuations in network conditions and poor voice quality can result. One approach for QoS control involves source rate control, with no diversity, wherein one approach for QoS control is to adapt the source rate to the fluctuations in network conditions, per "Reducing bandwidth requirements," Micom Whitepaper, 1998; D. Sisalem et al., "The loss-delay based adjustment algorithm: A TCP-friendly adaptation scheme," NOSSDAV, (International Workshop on Network and Operating System Support for Digital Audio and Video), July 1998. However, this approach may not handle short-term network fluctuations well, and is complicated as VoIP/VOP applications often involve multiple links of heterogeneous characteristics. First, there is a need to locate the "bottleneck" link, and, second, all users of the bottleneck link may not reduce their transmission rate.

In time diversity, information about packet n is also transmitted in packet n+1 and sometimes in even further packets where packets having at least some information in common with each other are called dependent packets.

Path Diversity sends dependent packets over two or more paths in the network, thus increasing the probability of recovering the information that was coded to produce the dependent packets.

Combined Time/Path Diversity approach uses both processes of Time Diversity and Path Diversity in innovative ways.

"Diversity packet," where the term is used herein sometimes means a self-contained packet with its own header and diversity information. However, the term "diversity packet" can also mean diversity bits and extra header bits put in a packet that already has a header and a payload.

Time diversity schemes provide inter-packet diversity, by including information about the nth packet in succeeding packets {n+k: k>=1}. They may employ redundancy schemes (media-specific redundancy, forward-error correction FEC) and multiple-description schemes, for instance.

In the example sequence of four packets just below, bits P(n) represent primary packets, and P(n)' and P(n)" each represent instances of diversity. This packet sequence has a number of diversity stages (here 3 namely P(n), P(n)' and P(n)") and a diversity length of 4. Diversity length is the minimum number of packets in a symbol sequence needed to define the diversity used.

P(n)P(n−1)'P(n−3)"P(n+1)P(n)'P(n−2)"P(n+2)P(n+1) 'P(n−1)"P(n+3)P(n+2)'P(n)"

The diversity length is greater than the number of diversity stages because of diversity offset, which is one here. Diversity offset corresponds in this case to absence of P(n) or any primed P(n) in the third packet.

Redundancy schemes piggyback a version/function (media-specific redundancy/FEC) of nth packet to (n+k)th packet, k>=1, as shown hereinbelow. The following sequences of packets are examples of media-specific redundancy schemes:

| P0 | P1 P0' | P2 P1'    | P3 P2' ...   |              |
|----|--------|-----------|--------------|--------------|
| P0 | P1     | P2 P0'    | P3 P1'       | P4 P2' ...   |
| P0 | P1 P0' | P2 P1' P0'| P3 P2' P1'   | P4 P3' P2' ...|
| P0 | P1 P0' | P2 P1' P0"| P3 P2' P1"   | P4 P3' P2" ...| where Pn denotes nth packet, and Pn' and Pn" denote versions of the nth packet. "Version" here means a dependent datum in a packet having at least some information included or encoded therein which corresponds to another packet. Thus, the juxtaposition of symbols used above signifies concatenation in the description of a given packet, and any possible sequence of concatenation in every packet is contemplated, as well as the order of concatenation literally shown for each packet.

Multiple-description (MD) schemes break the input stream into multiple descriptions, for instance, using MD quantizers [V. A. Vaishampayan et al., "Asymptotic analysis of multiple description quantizers," IEEE Trans. On Inform. Theory, January 1998}. Here none of the descriptions have the full information intended for reception, and instead each of the descriptions has less than that full information, and the descriptions which are received (even if some be lost) then have their information combined in the decoder to obtain what information is available in them collectively. The following packet sequences symbolize examples of embodiments of process and systems

| P0 | P1 P0'  | P2 P1'     | P3 P2' ...   |              |         |         |            |
|----|---------|------------|--------------|--------------|---------|---------|------------|
| P0 | P1' P0' | P2 P1      | P3' P2' ...  |              |         |         |            |
| P0 | P1      | P0' P2'    | P1' P3'      | P2 P4        | P3 P5   | P4' P6' | P5' P7' ...|
| P0 | P1      | P2 P0'     | P3 P1'       | P4 P2' ...   |         |         |            |
| P0 | P1 P0'  | P2 P1' P0" | P3 P2' P1"   | P4 P3' P2" ...|        |         |            |
| P0 | P0' P1' | P0" P1" P2"| P1 P2 P3     | P2' P3' P4'  | P3" P4" P5"| P4 P5 P6 ...|     | where Pn, Pn' and Pn" denote multiple descriptions of the nth packet.

One type of embodiment uses plural types of time diversity concurrently so that Redundancy is applied concurrently with Multiple-Description.

Among other advantageous things herein, the present application describes path diversity processes, integrated circuits and systems whereby VoIP/VOP software applications open multiple (two or more) flows between the same source and the destination. The packets in each flow traverse separate paths from packets in other flows (for at least some of the hops between the source and destination). By having multiple paths, or causing multiple network paths to be accessed, used and traversed, such path diversity processes, integrated circuits and systems reduce, as between the diverse flows, the correlation of packet loss, delay, jitter and other less than desirable metrics of performance which are ameliorated herein.

Some examples of combined time/path diversity embodiments for VOP that confer advantageously efficient bandwidth utilization are described next.

1. Combined time/path diversity. The time diversity is redundancy, multiple description, FEC forward error correction, or other suitable process.

| a) | Path 1: P0 | P1 P0',... | | |
|---|---|---|---|---|
|   | Path 2: P0 | P1 P0',... | | |
| b) | Path 1: P0 | P1 P0' | P2 P1',... | |
|   | Path 2: | P0 | P1 P0' | P2 P1',... |

(In embodiment 1(b), the packet stream of Path 2 is time-delayed relative to the packet stream of Path 1.)

2. Path switching diversity randomizes bursty packet losses without increasing bandwidth utilization. First create multiple connections/paths (e.g. 2 connections) between the source and the destination. Then transmit as follows:

| VOP packet stream: | P0 | P1 | P2... | P(n − 1) | P(n) | P(n + 1) | P(n + 2)... |
|---|---|---|---|---|---|---|---|
| Path 1: | P0 | | | P2 | | | P(2n) |
| Path 2: | | P1 | | | P3 | | P(2n + 1) |

Generally speaking, a set of n respective packets are directed into a corresponding number n of respective diverse network paths whereupon the process repeats for the next set of n packets, and so on.

3. Combined path-switching diversity/redundancy embodiments combine path-switching diversity and redundancy processes, and advantageously achieve good voice quality with efficient bandwidth utilization. In a two-path embodiment

| Path 1: | P0 | | P2 P1' | | P4 P3'... |
|---|---|---|---|---|---|
| Path 2: | | P1 P0' | | P3 P2'... | |

In this approach, n respective redundancy packets are directed into a corresponding number n of respective diverse network paths whereupon the process repeats for the next set of n packets, and so on.

4. Combined path-switching diversity/multiple-descriptions embodiments combine path-switching diversity and multiple-description processes, and advantageously achieve good voice quality with efficient bandwidth utilization. In a two-path embodiment

| Path 1: | P0 | | P2 P1' | | P4 P3'... |
|---|---|---|---|---|---|
| Path 2: | | P1 P0' | | P3 P2'... | |

In this approach, n respective multiple-descriptions packets are directed into a corresponding number n of respective diverse network paths whereupon the process repeats for the next set of n packets, and so on.

5. In an embodiment of incorporated coassigned patent U.S. Pat. No. 6,496,477, the original voice packet stream (P0 P1 P2) is sent in its entirety, on path 1 and on path 2.

| Path 1: | P0 | P1 | P2 | P3 | P4... |
|---|---|---|---|---|---|
| Path 2: | P0 | P1 | P2 | P3 | P4... |

The following Performance Table summarizes performance for a two-path system of the above four embodiments. The symbols R, H and R' refer to source bit rate, header bit rate, and redundancy bit rate, respectively. Concealment processes such as interpolation are suitably used to recover missing parts of a media stream. In G.729, a frame erasure concealment method specified in G.729 spec is suitably used when the path diversity feature herein is not being used.

| PERFORMANCE TABLE | | |
|---|---|---|
| EMBODIMENT | BANDWIDTH | QUALITY |
| 1(a), 1(b) | 2(R + H + R') | Full quality when any of the paths is good. Acceptable quality when even both paths are bad. |
| 2 | (R + H) | Packet-loss concealment, when any of the paths is bad. |
| 3 | (R + H + R') | Full quality, when both paths are good. Acceptable quality, when any of the paths is good. Packet-loss concealment, when both paths are bad. |
| 4 | (R + H + R') | Full quality, when both paths are good. Acceptable quality when any of the paths is good. Packet-loss concealment, when both paths are bad. |
| 5 | 2(R + H) | Full quality, when both paths are good. Packet-loss concealment, when both paths are bad. |

In a similar manner, the skilled worker analyzes various embodiments and selects for implementation whichever one(s) are most suitable for the particular needs at hand.

Media-specific redundancy schemes piggy-back a version of nth packet to (n+k)th packet. In VoIP/VOP heretofore a separate encoding scheme generated the redundancy version of the nth packet, or piggybacked the entire nth packet to the (n+k)th packet. Herein computationally-efficient CELP (code-excited linear prediction) based diversity embodiments for VoIP/VOP are described, such as for generating media-specific redundancy information. These are herein called "Important Information" based diversity embodiments. Some Important Information based diversity embodiments use base information, or Important Information, from CELP encoding as redundancy information, to achieve diversity. Below, two embodiments are described in more detail for G.729. These embodiments are given for two stages (primary stage plus one secondary stage), with no diversity offset. Embodiments include extensions based on more than two stages, and diversity offsets.

Embodiment 1: With no pulses in secondary stage. Using G.729, the secondary stage (redundancy stage) has these Important Parameters—LPC (Linear Predictive Coding) parameters, LTP (Longterm Prediction) lags, parity check, and adaptive and fixed codebook gains—according to the sequence

| P(n)P(n − 1)' | P(n + 1)P(n)' | P(n + 2)P(n + 1)' | P(n + 3)P(n + 2)' |
|---|---|---|---|

1A. Reconstruction with single packet loss is shown in the next sequence below. The LPC parameters, LTP lags, parity check, and adaptive and fixed codebook gains are obtained from the secondary stage. The excitation reconstruction mechanism is suitably made to be the replacement excitation generation scheme described in the G.729 standard section 4.4.4 with the following modification. For lost-frames considered as nonperiodic, the adaptive codebook contribution is set to zero only if the absolute value of the adaptive codebook gain (obtained from the secondary stage) is less than 0.4, otherwise the adaptive codebook contribution is reconstructed from the adaptive codebook gain and LTP lag obtained from the secondary stage.

| P(n)P(n − 1)' | [Lost Packet] | P(n + 2)P(n + 1)' | P(n + 3)P(n + 2)' |
|---|---|---|---|
| P(n) | [P(n + 1)'|−](excitation) | P(n + 2) | P(n + 3) |

(where "excitation" shown above refers to reconstruction of the dashed part of the packet symbols)

1B. Reconstruction with two or more consecutive packet losses is shown in the next sequence below. Now the packet (n+2) is reconstructed as described in the paragraph 1A just above. The packet (n+1) is reconstructed by the G.729 frame erasure concealment scheme specified in the G.729 standard section 4.4, used for packet loss concealment. The steps of section 4.4 are repetition of synthesis filter parameters (4.4.1) attenuation of adaptive and fixed-codebook gains (4.4.2), attenuation of the memory of the gain predictor (4.4.3), and generation of the replacement excitation (4.4.4).

| P(n)P(n − 1)' | [Lost Packet] | [Lost Packet] | P(n + 3)P(n + 2)' |
|---|---|---|---|
| P(n) | [-] | [P(n + 2)'|−] (excitation) | P(n + 3) |

Embodiment 2: With pulses in secondary stage. Using G.729, the secondary stage (redundancy stage) has LPC parameters, LTP lags, parity check, and adaptive and fixed codebook gains, and first few or all fixed codebook pulses.

2A. In reconstruction with single packet loss, the LPC parameters, LTP lags, adaptive and fixed codebook gains, and the included pulses are obtained from the secondary stage. The remaining fixed codebook pulses are set to zero.

2B. Reconstruction with two or more consecutive packet losses reconstructs the packet (n+2) as described in the paragraph 2A just above. The packet (n+1) is reconstructed by the G.729 frame erasure concealment scheme specified in the G.729 standard section 4.4, used for packet loss concealment, when there is no diversity.

Multiple-description data partitioning based diversity embodiments are described next.

It is believed that heretofore there has been no CELP-based multiple description process. Herein are described computationally-efficient, CELP-based multiple description embodiments using multiple-description data partitioning. Parentheses are used in the next few sentences to point out certain significant combinations of information.

These embodiments send (the base or important information+a subset of fixed excitation) in one packet and (the base or important information+the complementary subset of fixed excitation) in another packet. Below, two embodiments are described in more detail for G.729. These embodiments are given for two stages, with no diversity offset. Embodiments include extensions based on more than two stages and, diversity offsets.

DEFINITION: Multiple description data partitioning: In this approach, (the base information+a subset of enhancement information) is sent in one packet, and (the base information+the complementary subset of enhancement information) is sent in another packet. Here, when only one of the packets is received at the receiver, to produce acceptable quality that packet is reconstructed. When both packets are received at the receiver, they both are combined to produce better quality.

Embodiment 3: with no pulses in the base or important information. Using G.729, the first stage has LPC parameters, LTP lags, parity check, adaptive and fixed codebook gains, and every other fixed codebook pulses. The second stage has LPC parameters, LTP lags, parity check, adaptive and fixed codebook gains, and the remaining fixed codebook pulses. See sequence below:

P(n)P(n−1)'P(n+1)P(n)'P(n+2)P(n+1)'P(n+3)P(n+2)'

3A. In reconstruction with single packet loss, for packet n and packet (n+1), only one stage is used for reconstruction, and the remaining fixed codebook pulses are set to zero (note that these pulses include the fixed codebook pulses from the lost diversity stage). See reconstruction below:

| Received: | $P(n)P(n-1)'$ | [Lost Packet] | $P(n+2)P(n+1)'$ | $P(n+3)P(n+2)'$ |
|---|---|---|---|---|
| Reconstructed: | $[P(n)|-]$(excitation) | $[P(n+1)'|-]$(excitation) | $P(n+2) + P(n+2)'$ | $P(n+3) + P(n+3)'$ |

(The plus (+) sign refers to combination of information for reconstruction).

3B. Reconstruction with two or more consecutive packet losses reconstructs the packet n and the packet (n+2) as described in the paragraph 3A just above. The packet (n+1) is reconstructed by the G.729 frame erasure concealment scheme specified in the G.729 standard section 4.4, used for packet loss concealment. See reconstruction below:

| $P(n)P(n-1)'$ | [Lost Packet] | [Lost Packet] | $P(n+3)P(n+2)'$ |
|---|---|---|---|
| $[P(n)|-]$ | [---] | $[P(n+2)'|-]$ (excitation) | $P(n+3) + P(n+3)'$ |

Embodiment 4: with pulses in the base or important information. Using G.729, the first stage has LPC parameters, LTP lags, parity check, adaptive and fixed codebook gains, first few fixed codebook pulses, and every other fixed codebook pulses from the remaining pulses. The second stage has LPC parameters, LTP lags, parity check, adaptive and fixed codebook gains, the same first few fixed codebook pulses, and the complementary subset of pulses from the remaining fixed codebook pulses. See sequence below:

$P(n)P(n-1)'P(n+1)P(n)'P(n+2)P(n+1)'P(n+3)P(n+2)'$

4A. In reconstruction with single packet loss, for packet n and packet (n+1), only one stage is used for reconstruction, and the remaining fixed codebook pulses are set to zero. See reconstruction below:

| $P(n)P(n-1)'$ | [Lost Packet] | $P(n+2)P(n+1)'$ | $P(n+3)P(n+2)'$ |
|---|---|---|---|
| $[P(n)|-]$(excitation) | $[P(n+1)'|-]$(excitation) | $P(n+2) + P(n+2)'$ | $P(n+3) + P(n+3)'$ |

4B. Reconstruction with two or more consecutive packet losses reconstructs the packet n and the packet (n+2) as described in the paragraph 4A just above. The packet (n+1) is reconstructed by the G.729 frame erasure concealment scheme specified in the G.729 standard section 4.4, used for packet loss concealment. See reconstruction below:

| $P(n)P(n-1)'$ | [Lost Packet] | [Lost Packet] | $P(n+3)P(n+2)'$ |
|---|---|---|---|
| $[P(n)|-]$ | [---] | $[P(n+2)'|-]$ (excitation) | $P(n+3) + P(n+3)'$ |

Extensions

Further embodiments are contemplated with
diversity offset,
multiple stages, and
multiple stages and diversity offsets.

Regarding performance and delay due to diversity: If the packet delay variation is larger than the packet interval/size, the system may choose not to introduce additional delay while making use of diversity in a limited manner.

Some other embodiments augment the MD (multiple description) approach as follows. For fixed codebook search, minimize [error(full rate)+w1 error(Description 1)+w2 error (Description 2)] instead of minimizing error(full rate) alone. (The letters "w1" and "w2" symbolize weight coefficients. Description 1 and Description 2 symbolize two descriptions). In addition an interpolation filter is used for shaping/filling of excitation. Also, MD quantizers are used for LPC parameters, LTP lags, fixed codebook gain and adaptive codebook gain.

Some Important Information embodiments apply FEC to important information.

Still other embodiments combine interleaving and diversity.

Some diversity based embodiments add interpolation of parameters in addition to fixed excitation repeating, from available (past/future) frames.

Adaptive Rate/Diversity Processes

In a type of constrained adaptive rate/diversity processes, integrated circuits and systems herein, these adapt source rate and the amount of time or path or time/path diversity, in accordance with network fluctuations based on some QoS level measure (e.g., overall packet loss rate due to packet loss, delay, delay-jitter, etc., but before the application or compensation with diversity). Note that QoS is an inverse function of packet loss rate—in other words, QoS goes up as packet loss rate goes down. Thus, being higher than a threshold of QoS means being less than a corresponding threshold of packet loss rate. Put yet another way, QoS is a positive quantity and packet loss rate can be thought of as a negative quantity.

Further details of some adaptation process embodiments are as follows:

When QoS level measure is lower than a given QoS threshold (e.g., overall packet loss rate before the application of diversity exceeds (>) Threshold1), increase/introduce diversity while decreasing overall transmission rate or keeping overall transmission rate substantially unchanged.

B. When QoS level measure is higher than another QoS threshold representing higher quality of service than the given QoS threshold of paragraph A (e.g., overall packet-loss rate before the application of diversity is less than (<) Threshold2 where Threshold2 is less than or equal (<=) Threshold1), increase source rate (the bit rate for packet stream Pn). Note that Threshold1 Th1 and Threshold2 Th2 are values of the packet loss rate metric, inversely related to QoS and thresholds of QoS. The method for determining new steady-state source rate depends on available network resources according to any suitable table, algorithm or method selected by the skilled worker, see examples herein. The process of increasing source rate is achieved through one or more stages or steps. Two different steps which can either be used alone, or consecutively, or concurrently, are 1. When increasing the overall transmission rate, maintain diversity.
2. When reducing the amount of diversity, do not increase the overall transmission rate.

Note that source rate (sij) is different from "overall transmission rate." Overall transmission rate for purposes herein denotes the sum sij+dij in a given state. Roughly speaking, overall transmission rate is the sum of the packet P0 rate plus packet P0' rate plus rates for any other diversity packet for P0-primed.

By the use of diversity, some process embodiments handle short-term network fluctuations well, cope with VoIP/VOP applications that involve multiple links of heterogeneous characteristics, and are TCP-traffic friendly. This is because the overall transmission rate is decreased, or at least not increased, on the network in the event of low QoS level, thereby not burdening the network increasingly, as these process embodiments work to ameliorate the QoS. In this way such process embodiments improve QoS for users and are network friendly in that such process embodiments could be implemented at one node, some nodes, or all nodes without further congesting the network while improving QoS.

In one example, packet loss rate Threshold1 is selected to be three percent (3%), and packet loss rate Threshold 2 is selected to be one-half percent (0.5%). Packet size is forty (40) milliseconds, corresponding to an overhead (header rate) of 320 bits/40 msec=8 kbps for VoIP. RTCP Transmission Interval is set to five (5) seconds, and the fraction lost (or packet-loss rate) is computed during last five (5) seconds in a latter part of the RTCP Transmission Interval. (Use of RTP and RTCP is described further later hereinbelow.) Source rate selections s11, s12, s21, s22, s31, s32 are established at 16.0, 11.2, 11.2, 8.0, 8.0 and 5.7 kilobits/sec respectively. Diversity selections d11, d12, d21, d22, d31, d32 are established at 0.0, 4.8, 0.0, 3.2, 0.0 and 2.3 kilobits/sec respectively. All the foregoing values are, of course, offered illustratively and not in any limiting sense.

QoS level measure computation is temporally localized at the suggested 5 seconds in order to avoid smoothing of network effects. The example adaptation mechanism uses a high threshold (Threshold1) when QoS level decreases, and uses a low threshold (Threshold2) when QoS level improves. This approach advantageously addresses a scenario of possible oscillation between rate/diversity states, but where this scenario is not applicable or is addressed by other means such as delay processes or otherwise, then some embodiments can also use equal thresholds or any choice of thresholds that confers satisfactory adaptation.

Some adaptation embodiments take into account packet loss, high delay, and delay-jitter, such as in the QoS level measure process. In one type of process embodiment, overall packet-loss rate due to loss, delay and delay jitter (and before the application of diversity) is used as QoS level measure.

Figure 2:
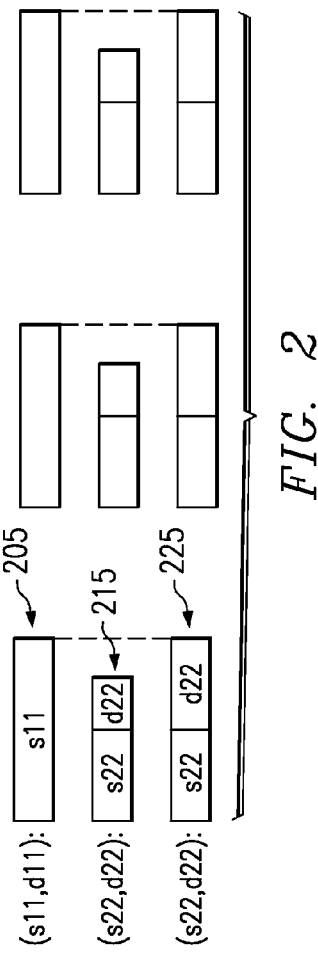
FIG. 2 is a diagrammatic representation of packets in different states of FIG. 1, wherein time extends horizontally as successive columns in FIG. 2, and the different states correspond to different rows of differently labeled packets in FIG. 2 wherein overall transmission rate is kept limited to less than or equal to that of an s11 state.

Two specific embodiments or realizations of a rate/diversity adaptation process or method are diagrammed in the state transition diagrams of FIGS. 1 and 2. Note that these are not an exhaustive set of embodiments or realizations. If a connection is bad, one type of embodiment reduces the source rate and adds diversity while taking the overall transmission rate, or network burden, into account.

A state transition diagram is well understood by the skilled worker, and generally speaking, the arrows are transitions which occur upon the existence of a condition noted near its respective arrow. Thus, in FIG. 1, the arrows join small circles representative of a state of one sending computer connected to a packet network. More particular the state is the state of a source rate and diversity control block (331 of FIG. 3 discussed later hereinbelow), which thereby controls the state of a speech encoder (321 of FIG. 3), audio encoder or other media source encoder or compressor.

FIG. 1 illustrates a state transition diagram for a process embodiment where a new steady-state source rate is designated s11. In FIG. 1, overall packet loss rate F exceeds (>) Threshold1 before the application of diversity. (Where the phrase "packet loss rate" is used herein, it is to be understood interchangeably with packet loss fraction or packet loss ratio which are similar concepts.) When Threshold1 is exceeded by packet loss rate F, a transition 101 occurs from the state (s11,d11) to state (s22,d22). When a gatekeeper request GK or Buffer occupancy full signal occurs, a transition 102 occurs from the state (s11,d11) to state (s21,d21). Gatekeeper and/or router boxes in the network may signal requests as just mentioned, and these are included in the state transition diagram for context and completeness of description.

Note that dotted ovals 111, 113, 115, etc. diagrammatically surround and thus indicate states that have the same sum of s and d components, and thus indicate essentially the same "overall transmission rate" (i.e., same network burden or load). From left to right in each of FIGS. 1, 10, 22, 23, 29 and 31, the ovals indicate progressively reduced overall transmission rate, or sum of s and d components.

In FIGS. 1 and 2, an optional constraint in one class of embodiments introduces a specification: do not increase overall transmission rate. Also, Overall transmission rates: . . . (s11+d11)=(s12+d12)>(s21+d21)=(s22+d22)>(s31+d31)=(s32+d32) . . .

where (d11<d12), (d21<d22) and (d31<d32).

sij denotes the rate for Pn, and dij denotes the rate for Pn'.

In FIG. 2 the bit length of each sij or dij part of a packet is proportional to the source rate and diversity rate when the transmission of packets themselves is at a constant rate of issuing packets from the sender.

In FIG. 2 the source rate of a packet stream 205 is a given amount s11. When QoS falls, the control block 331 of FIG. 3 utilizes a process wherein it reduces source rate to an amount s22 and introduces a small diversity rate of d22 as shown in packet stream 215. Original overall transmission rate s11+0=s11 of packet stream 205 exceeds overall transmission rate s22+d22 of packet stream 215 resulting from rate/diversity adaptation. The overall transmission rate of packet stream 215 has been lowered or reduced from that of packet stream 205.

Further in FIG. 2 an alternative process goes from source rate s11 of packet stream 205 to a packet stream 225. Packet stream 225 has an overall transmission rate comprised of a source rate s22 and diversity rate d22 that sum to an amount substantially equal to original rate s11.

Transitions like transition 101 from left to right in FIGS. 1 and 10 indicate that the process has encountered a QoS degradation where packet loss rate is exceeding Threshold1, and thus has become unacceptable. In response the process is ameliorating the QoS, by lowering the source rate and adding diversity until the QoS improves enough that the packet loss rate has gotten below Threshold2 Th2. Lowering source rate means that the original information is being coded with more compression and perhaps more lossiness of compression, but this compression loss is almost insignificant compared to the user-perceived degradation that packet loss causes.

Conversely, transitions like 103 and 105 from right to left in FIG. 1 indicate that the process is increasing its use of the network at a time when QoS has improved sufficiently to permit such increased use. Such increased use takes the forms of increasing the source rate and reducing and/or terminating path diversity, time diversity or combined time/path diversity.

FIG. 10 illustrates a state transition diagram for a process where a new steady-state source rate is designated s21. In FIG. 10 the process suitably is arranged to make transition 1005 inside oval 113 when QoS has improved to the extent that packet-loss rate F has fallen below Threshold 2. This FIG. 10 example shows that embodiments are also suitably arranged to stay in a lower state (s21, d21). Here, as in FIG. 1, operations move from a higher source rate s11 to a lower source rate s22 if QoS degrades (transition 101).

Thresholds can be varying as well, such as depending on the source rate used. Thus, in FIG. 10, a further transition 1007 occurs when criterion F exceeds a threshold Th3. In one example, transition 101 occurs when loss fraction exceeds 3% and transition 1007 occurs when loss fraction exceeds 4%.

Further details of some more adaptation process embodiments are as follows:

1. Adapt both the source rate sij and the amount of diversity dij, in accordance with network fluctuations based on some QoS level measure (see examples in FIGS. 2 and 11).
   a) When QoS level measure is lower than a given QoS threshold (e.g., overall packet loss rate before the application of diversity exceeds (>) Threshold1), add diversity while decreasing the source rate or keeping the source rate unchanged. (i.e., source rate sij here instead of overall transmission rate sij+dij in some embodiments)
   b) When QoS level measure is higher than another QoS threshold representing higher quality of service than the given QoS threshold of paragraph (a) (e.g., overall packet-loss rate before the application of diversity is less than (<) Threshold2 where Threshold2 is less than or equal (<=) Threshold1), increase source rate. Note that Threshold1 Th1 and Threshold2 Th2 are values of the packet loss rate metric, inversely related to QoS and thresholds of QoS. The method for determining new steady-state source rate depends on available network resources according to any suitable table, algorithm or method selected by the skilled worker, see examples herein. The process of increasing source rate is achieved through one or more stages to reduce or prevent oscillatory behavior.

2. Special case: Adapt both the source rate and the amount of diversity, in accordance with network fluctuations based on some QoS level measure and constrain their sum so that overall transmission rate is reduced or unchanged (see FIG. 2).
   a) When QoS level measure is lower than a given QoS threshold (e.g., overall packet loss rate, packet loss rate before compensating by diversity, exceeds (>) Threshold1), add diversity while decreasing the overall transmission rate or keeping the overall transmission rate unchanged.
   b) When QoS level measure is higher than another QoS threshold representing higher quality of service than the given QoS threshold of paragraph (a) (e.g., overall packet-loss rate, packet loss rate before compensating by diversity, is less than (<) Threshold2 where Threshold2 is less than or equal (<=) Threshold1), increase source rate. Note that Threshold1 Th1 and Threshold2 Th2 are values of the packet loss rate metric, inversely related to QoS and thresholds of QoS. The method for determining new steady-state source rate depends on available network resources according to any suitable table, algorithm or method selected by the skilled worker, see examples herein. The process of increasing source rate is achieved through one or more stages.

3. As noted in 1 and 2, the process of increasing source rate is achieved through one or more stages. Two different steps which can either be used alone, or consecutively, or concurrently, are a) when increasing the overall transmission rate, maintain some diversity, and b) when reducing the amount of diversity, do not increase the overall transmission rate. Note that (a) and (b) can be realized using various combinations of source rate and diversity.

4. The approaches are applied to a) time diversity embodiments (media-specific redundancy, important information diversity, FEC, multiple description, multiple description data partitioning), b) path diversity embodiments, and c) combined time diversity and path diversity embodiments.

5. QoS level measure computations and Adaptation Logics.

5A. Delay-jitter handling via fixed-delay threshold embodiment declares a packet as lost, if the end to end delay of the packet is greater than a fixed threshold. Overall packet loss rate due to loss, delay, and delay jitter (but before the application of diversity) is used as a QoS level measure. Thus, in FIG. 1, transitions 101 and 103, 105 occur on thresholds as shown compared to a value F which is overall packet-loss rate in this 5A embodiment. Preferably but not necessarily, the overall transmission rate sij+dij is not increased on the transitions 101.

5B. Delay-jitter handling via adaptive packet playout embodiment performs delay jitter handling using an improvement over S. B. Moon et al., "Packet audio playout delay adjustment: Performance bounds and algorithms," ACM/Springer multimedia systems, January 1998. In this improvement, overall packet loss rate due to loss, delay, and delay jitter (but before the application of diversity) is used as a QoS level measure.

Transition 101 of FIG. 1 in this 5B embodiment occurs on the criterion (mode=SPIKE) OR (mode=NORMAL AND Overall packet-loss rate>Th1)

Transitions 103 and 105 respectively occur on a criterion (mode=NORMAL AND Overall packet-loss rate <Th2). Preferably but not necessarily, the overall transmission rate sij+dij is not increased on the transitions 101.

Here, the rate/diversity control 331 (or alternatively receiver 361') detects whether network 351 is subject to spike-type delay increase and/or packet losses (SPIKE) even when the packet-loss rate has not yet exceeded the tolerable threshold Th1, or whether a more smoothly varying type of delay change/packet loss behavior (NORMAL) is occurring. This information is stored as a datum called "mode" for purposes of this embodiment 5B and used for adaptation.

When SPIKE mode is occurring, the embodiment is relatively aggressive, being quick to initiate QoS-enhancing measures, and slow to end them.

One formula recognizes a SPIKE event when magnitude of delay difference of consecutive packets exceeds twice a variance measure+800 sampling intervals, compare the Moon et al. paper incorporated hereinabove at p. 21, Algorithm 2, line 2.

This 5B embodiment herein, however, not only recognizes a SPIKE event but also utilizes it for new purposes, processes and structures, to initiate a SPIKE mode to control a state machine of source rate and diversity amount. The SPIKE mode herein recognizes that packets arrive with an average delay based on the time of arrival minus the sender packet time stamp. Also, the packets have an average jitter magnitude, or measure of variance, in the varying delay values comparing packet to packet. The idea behind SPIKE mode herein recognizes an important control function for rate/diversity adaptation purposes when the magnitude of delay difference between consecutive packets exceeds some multiple of the measure of variance plus a constant. The multiple just-mentioned, reflects the idea that an onset of a significant delay difference in the incoming packets should be quite substantial compared to the usual amount of variation in delay in the packet stream. The constant reflects the idea that even if the measure of variance were equal to zero for a packet stream for a while, the onset of some delay difference would not be important if it were below the amount of the constant. It should be clear that various formulas and logic implementations can implement these ideas. One process embodiment determines when delay difference of consecutive packets $|D(I,I-1)|>2J+800$ to initiate the spike mode. Another process embodiment determines when delay difference $$|D(I,I-1)|>mJ+c$$

to initiate the spike mode, where m is a numerical value of a multiplier selected in the range 1.5 to 4 for example, and the constant is equal to average measured delay based on timestamps for a last predetermined number (e.g. 25) of speech packets.

Another process embodiment uses a logic test to test whether the delay difference $[|D(I,I-1)|>m_1J]$ OR $[|D(I,I-1)|>c1]$. m1 is selected in the same range as numerical value m above. Constant c1 is suitably made substantially equal to constant c above.

Still another process embodiment uses any of the foregoing tests but with an average of delay difference magnitudes to smooth out the process somewhat, wherein $$[|D(I+1,I)|+|D(I,I-1)|]/2 > mJ+c \text{ or alternatively a test}$$

$$[[|D(I+1,I)|+|(I,I-1)|]/2 > mJ] \text{ OR } [[|D(I+1,I)|+|D(I,I-1)|]/2 > c].$$

Once the SPIKE mode has been initiated, then any one of various tests for returning to NORMAL mode is implemented. One embodiment repeatedly computes a measure of variance and waits until the measure of variance falls below a predetermined amount, whereupon the NORMAL mode is initiated. Still another approach utilizes the calculations of the Moon paper not only for playout delay, but also to derive controls for SPIKE mode and NORMAL mode in a manner that tracks the calculations of SPIKE and NORMAL conditions for playout delay as described in Moon et al.

5CA. A first (herein type 5C embodiment, subtype A) adaptation embodiment with parameters specified in RTCP uses both Fraction Lost and interarrival jitter field as QoS level measures having their respective thresholds.

Transitions 101 of FIG. 1 in this 5C embodiment respectively occur on the criterion (Fraction Lost>Th1) OR (Interarrival Jitter J>Th2)

Transitions 103 and 105 respectively occur on a criterion (Fraction Lost <Th3) AND (Interarrival Jitter J<Th4)

Note in this 5CA embodiment that QoS enhancing measures are initiated on either an unacceptable level of Fraction Lost or of Jitter J. However, the QoS enhancing measures are relaxed on the occurrence of BOTH Fraction Lost and Jitter J becoming acceptable. Fraction Lost lower threshold Th3 is made less than or equal to Fraction Lost higher threshold Th1. Providing some gap between Th3 and Th1 may help prevent oscillations in QoS in some network environments. Similarly, Jitter lower threshold Th4 is made less than or equal to Jitter higher threshold Th2.

Preferably but not necessarily, the overall transmission rate sij+dij is not increased on the transitions 101.

Figure 22:
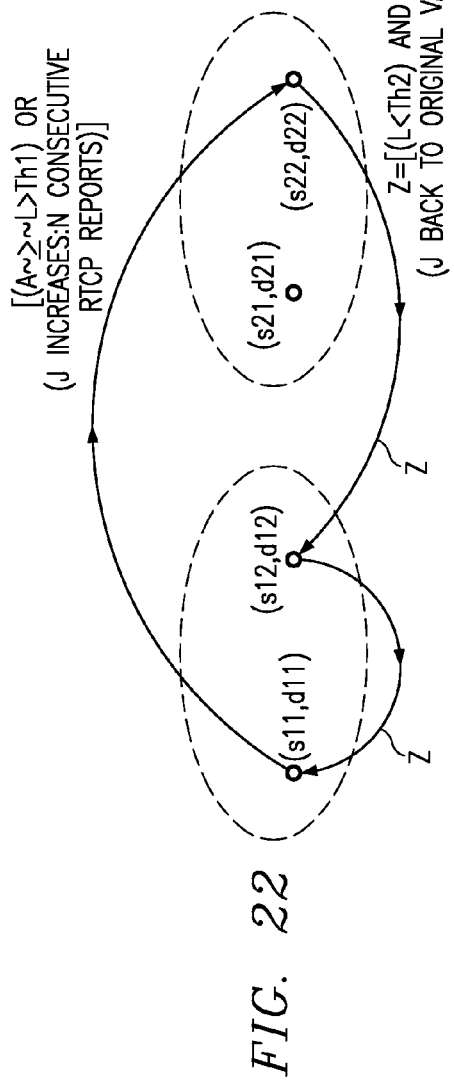
FIG. 22 is a state transition diagram for a process embodiment of adaptive control of combinations called states, of source rate and diversity in a media over packet sending computer, wherein criteria for making various transitions indicated by arrows in FIG. 22 are different from the criteria for making various transitions indicated by the arrows in FIG. 1.

5CB. As illustrated in FIG. 22, a second (herein type 5C embodiment, subtype B) adaptation embodiment with parameters specified in RTCP uses both Fraction Lost and interarrival jitter field as QoS level measures having their respective thresholds.

Transitions 101 of FIG. 1 in this 5C embodiment respectively occur on the criterion (Fraction Lost>Th1) OR (Interarrival Jitter J increases for n consecutive RTCP reports)

Transitions 103 and 105 respectively occur on a criterion (Fraction Lost<Th2) AND (Interarrival Jitter J is equal to or less than the Original Value)

Note in this 5CB embodiment, and in FIG. 22, that QoS enhancing measures are initiated on either an unacceptable level of Fraction Lost or a trend of a certain number n of consecutive increases of Jitter J. The number n is suitably 5 or any other number accomplishing an effective control function over QoS. Note that the QoS enhancing measures are relaxed on the occurrence of BOTH Fraction Lost and Jitter J becoming acceptable. Fraction Lost lower threshold Th2 is made less than or equal to Fraction Lost higher threshold Th1. Providing some gap between Th2 and Th1 may help prevent oscillations in QoS in some network environments. Note further that n+1 values of Jitter J are suitably stored in a buffer or window of n+1 Jitter values. If the criterion of n Jitter increases occurs, then the oldest of the n+1 Jitter values is stored as the Original Value in a suitable register or memory location. Next the buffer is cleared. New RTCP reports of Jitter J now enter the buffer one by one, and are each respectively compared with the Original Value as stored. When the latest value of Jitter J that has come into the buffer is less than or equal to the Original Value, and if the Fraction Lost is less than Threshold 2 (Th2), then the QoS enhancing measures are relaxed by making a transition from state (s22,d22) to state (s12,d12). Then if the succeeding latest value (or alternatively some predetermined plural succeeding number n1 of latest values) of Jitter J that has come into the buffer is less than or equal to the Original Value, and if the succeeding latest value of Fraction Lost is still less than Threshold 2 (Th2), then the QoS enhancing measures are still further relaxed by making a transition from state (s12,d12) to state (s11,d11) as shown in FIG. 1.

Preferably but not necessarily, the overall transmission rate sij+dij is not increased on the transitions 101.

It should be apparent that numerous variations on this theme can be introduced in still further embodiment subtypes.

5D. Adaptation embodiment using TCP throughput estimate for both delay jitter handling approaches compares a ratio of a corresponding TCP throughput estimate to current overall transmission rate with a threshold. One relatively uncomplicated TCP throughput estimate is given by: (constant×packetsize)/(round-trip delay×sqrt(average loss measured during the lifetime of the connection)). A suitable value of the constant is 1.22. See D. Sisalem et al., "The loss-delay based adjustment algorithm: A TCP-friendly adaptation scheme," NOSSDAV, July 1998.

In FIG. 1, this embodiment 5D uses as criterion for transitions 101:

(TCP Throughput Estimate/Current Overall Transmission Rate<Th1)

As criterion for transitions 110, 103 and 105 this embodiment 5D uses (TCP throughput estimate/current overall transmission rate >Th2).

"sqrt" means the "square-root function of." Still further, since thresholding is involved, the throughput estimate and current overall transmission rate can be squared, and compared with the square of threshold Th1 or Th2. This eliminates the square root calculation and speeds computation in some embodiments.

Preferably but not necessarily, the overall transmission rate sij+dij is not increased on the transitions 101.

By the use of diversity, the above embodiments handle short-term network fluctuations well, and cope with VoIP/VOP applications that involve multiple links of heterogeneous characteristics.

All the QoS level measure computations and adaptation logics are suitably used for rate/diversity adaptation (rate and diversity both, or either one alone, selected at different times, or selected on different transitions). All the QoS level measure computations and adaptation logics are suitably used for source rate adaptation alone in various embodiments without any diversity or diversity adaptation. All the QoS level measure computations and adaptation logics are suitably used for diversity adaptation alone in various embodiments without any source rate adaptation.

Figure 23:
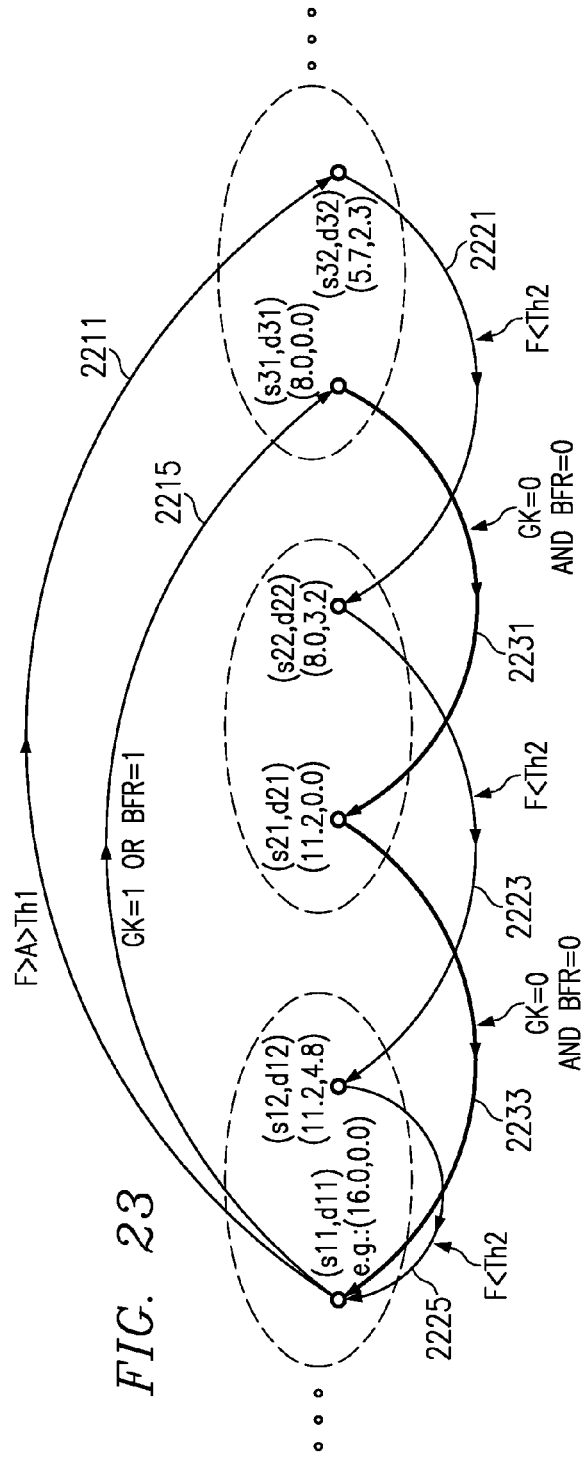
FIG. 23 is a state transition diagram for a process embodiment of adaptive control of combinations called states, of source rate and diversity in a media over packet sending computer, wherein criteria for making various transitions indicated by arrows in FIG. 23 are different from the criteria for making various transitions indicated by the arrows in FIG. 1, and suitably supplement the process of FIG. 1.

In FIG. 23, the amount of overall transmission rate reduction and thus severity of state change advantageously are made to depend on the severity of congestion. For example, one process embodiment is a combination of the processes of FIGS. 1 and 23. The process of FIG. 1 pertains if the congestion severity is low (A≧F>Th1), and a decision step chooses the process of FIG. 23 if the congestion severity is high (F>A>Th1). The value A is an adaptation mode threshold value suitably in the range of 1.1×Th1 to 2.0×Th1. Value of A set at 1.5 times Th1 is mentioned as suitable, for instance. Value A is called an adaptation mode threshold because the mode or process of adaptation (e.g. of FIG. 1 and of FIG. 23) is the subject of selection.

Preferably but not necessarily, the overall transmission rate sij+dij is not increased on the decreasing transitions 2211 and 2215 of FIG. 23. Any of the state transition criteria of embodiments 5A, 5B, 5CA, 5CB, and 5D can be used to trigger a transition. See descriptions hereinabove. For instance if the state transition criteria for F in embodiment 5A is used, then F is a value of overall packet-loss rate reported back in the latest RTCP packet. Similarly, on the return transitions 2221, 2223 and 2225 then F is a value of overall packet-loss rate reported back in the latest RTCP packet then pertaining to the respective determination step giving rise to the respective transition 2221, 2223 and 2225.

Overall transmission rates: . . . (s11+d11)=(s12+d12)>(s21+d21)=(s22+d22)>(s31+d31)=(s32+d32) . . .

Where (d11<d12), (d21<d22) and (d31<d32).

sij denotes the rate for Pn, and dij denotes the rate for Pn'.

Among various embodiments are embodiments for rate/diversity adaptation for Voice over IP and Voice over Packet. Described herein are systems, integrated circuits, and processes to adapt both rate and diversity, or each individually, in Voice over IP, Internet Audio, and Voice over Packet (VoIP/VOP) applications. Advantages include a robust solution for handling network impairments, while utilizing network resources efficiently.

As noted earlier, Voice over Packet (VOP) and Voice over Internet Protocol (VoIP) are sensitive to jitter to an extent qualitatively more important than for text data files for example. This sensitivity is also a problem for other types of real-time communication media such as frames of compressed video, but for brevity, VOP will be discussed as a placeholder for the other types of real-time communication as well.

The frame is the data unit for the speech coder. The packet can hold one frame or more than one frame. With constant number of frames per packet, packet loss rate is equal to frame loss rate.

ATM is a more sophisticated packet network wherein every packet in a stream takes the same path, so it represents a form of transmission that conceptually lies between circuit switching and packet switching. ATM, Frame Relay, and other forms of networking also can benefit by the improvements described herein.

RTP provides time stamps and packet sequence numbers. UDP (User Datagram Protocol) manages end-to-end transmission without any retransmission. UDP sits in the same layer as TCP. In one embodiment, RTP/UDP/IP is herein utilized for VOP instead of TCP/IP.

When multiple users congest the routers in the network, some packets become lost by actual loss or excessive delay.

Figure 4:
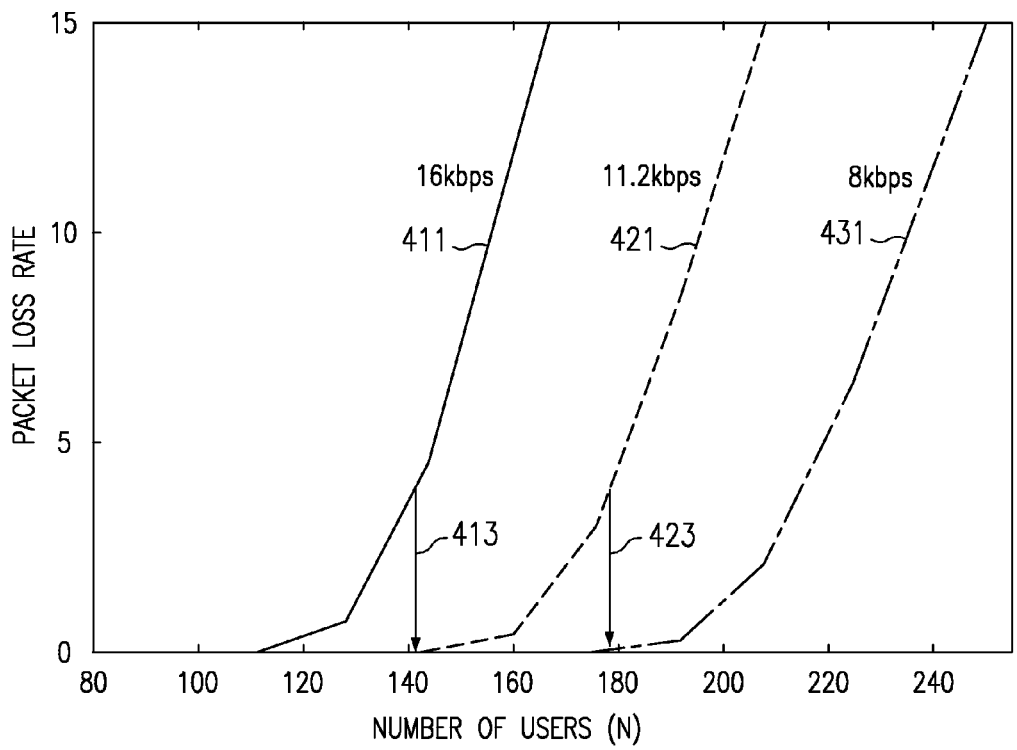
FIG. 4 is a family of curves of packet loss rate in percent versus number of users N, each curve having a different source rate in kilobits per second.

In FIG. 4, source rate control with no diversity, an embodiment uses a one-link network having, for example, a hundred users each transmitting at 16 Kb/s. Each packet has a header which takes about 8 Kb/s of overhead. As the number of users goes up to 140, for example, the packet loss rate goes to 4%. As the number of users increases, the packet loss rate also increases. In one example of a process embodiment, all the users are signaled, for instance, by a gatekeeper, to decrease their transmit rate from 16 Kb/s to 11.2 Kb/s. Then the packet loss rate advantageously drops.

The process executes a QoS determination step, which for example is a packet loss rate calculation over a predetermined window interval, given an expected rate of transmission. For example, if the connection protocol has identified a rate of transmission that is high, then a higher number of packets will be received during the same predetermined window interval at a given QoS than would be received the rate of transmission is lower. A simple packet loss rate calculation simply monitors the tags of the packets in a receive buffer, and counts up the number of packets that are present (a QoS measure) or those that are lost (Loss Rate which is just an inverse type of QoS measure). If a packet arrives in the buffer with a serial number and/or time stamp that indicates it is unusable, then it is dropped from the buffer and not counted. This is because VOP in some forms can only play or decode packets that have arrived in time to be meaningful to the user.

Another packet loss rate calculation that can be used with a short receive buffer keeps independently of the buffer a Service List of the packet tags and when they were received. The process simply counts from the Service List the number of packets which are within the window interval (e.g. last 5 seconds), or the number of missing packets depending on the approach.

Yet another process increments a counter when a new usable packet is received and decrements the counter when the time of arrival of a previously-counted usable but now-old packets has its time of arrival has become prior to the predetermined window interval from the present into the past. Other more sophisticated and arithmetically complex QoS measures are useful as well.

The skilled worker implements any suitable QoS determination. For example RTCP protocol has a reception block with a packet loss rate field wherein the protocol specification specifies how to compute a QoS measure at destination and transmit it back to the source. Thus, one type of embodiment suitably uses, supports or is compliant with RTCP protocol. Desirably, the source receives an "effective or overall packet loss rate or ratio" type of QoS measure which takes into account all lost packets, not only those actually lost in the network, but also those packets which came too late to be usable for the application, such as VOP, actually in use at the destination. Note further that the effective packet loss rate might be less when more sophisticated inventive VOP application software is implemented at the destination, even though the network congestion were no different.

Packets Lost=Packets Lost in Network+Packets Unusable at Destination.

EPLR=Effective Packet Loss Ratio=[Packets Lost in Network+Packets Unusable at Destination]/Packets Sent.

Figure 3:
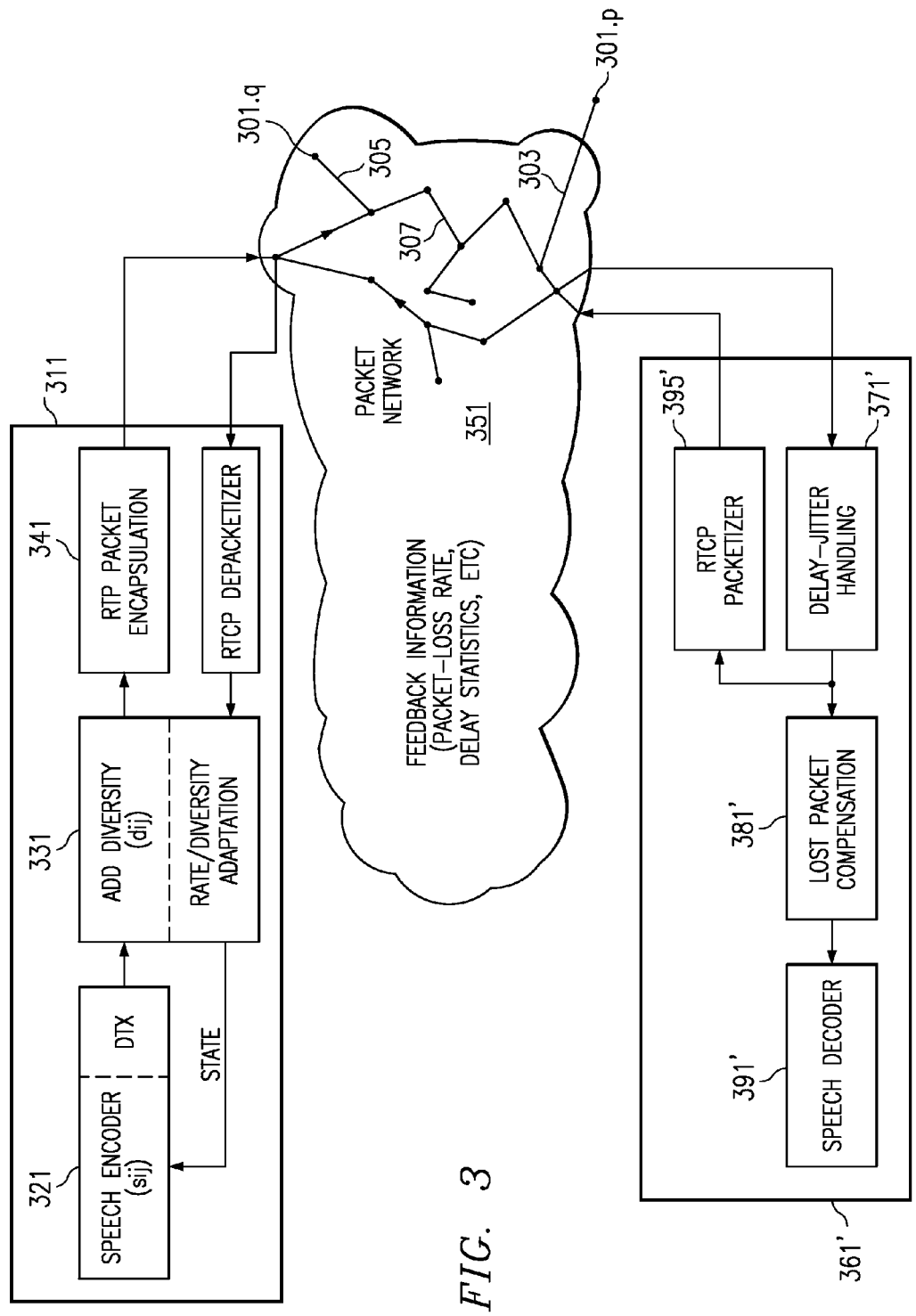
FIG. 3 is a block diagram of a system embodiment of a sender computer, a network cloud, and a receiver computer showing improvements for rate/diversity adaptation.

FIG. 3 shows a system embodiment for adaptation to network conditions by adjusting either or both of at least two communications variables, here transmission rate and diversity. For brevity, process embodiment employed in this system embodiment is called "Rate/Diversity Adaptation." The various blocks of FIG. 3 are suitably implemented as all software, all firmware or hardware, or some mixture of software, firmware and hardware allocated and partitioned among the various blocks. In one embodiment, the blocks are all software code and manufactured into one or more sections of non-volatile memory on a single semiconductor chip. Combinations of volatile and non-volatile on-chip and off-chip storage are also suitably implemented in various other embodiments by the skilled worker.

In FIG. 3, a transmit section 311 in a source computer (computer not shown) has a speech encoder block 321 having sending rate sij. Block 321 supplies encoded speech to a Rate/Diversity Adaptation control block 331. Control block 331 determines the degree of diversity dij to be commanded by control block 331. Control block 331 feeds a STATE command to speech encoder 321 to initiate the generation of more or fewer packets for time-diversity, path diversity or both time and path diversity purposes. Also, control block 331 has an Add Diversity portion which couples and multiplexes encoded speech from encoder 321 to an RTP Packet Encapsulation block 341. The Add Diversity portion introduces diversity according to each implemented process embodiment as taught elsewhere herein depending on STATE. Packet encapsulation block 341 supplies, communicates and sends packets to and through a packet network 351, to a receive section 361' of a destination computer (not shown). Receive section 361' has a Delay jitter Handling block 371' coupled to a Lost Packet Compensation block 381' which in turn is coupled to a speech decoder block 391'. One process embodiment operates Lost Packet Compensation block 381' so that if packet P0 is not received, then packet P0' is decompressed and fed to speech decoder 391' for playout. Lost Packet Compensation block 381' in the destination also supplies via an RTCP packetizer 395' RTCP packet loss information descriptive of source-to-destination packet communication back via packet network 351 to the Control block 331 in the source.

Both sides, source and destination, have speech encoder, rate/diversity control block, packet encapsulation, delay jitter handling, lost packet compensation and speech decoder. Thus, it should be understood that for two way communication, there is suitably provided a transmit section 311' (not shown) in the destination computer suitably (but not necessarily) identical to transmit section 311 described hereinabove. Also suitably provided is a receive section 361 (not shown) in the source computer suitably (but not necessarily) identical to receive section 361' described hereinabove.

Primes in FIG. 3 indicate blocks in the destination computer, and unprimed numerals indicate blocks in the source computer. This format of drawing visually and literally communicates the transmitter source path to the receiver destination. Also, this format concisely and conveniently permits the reader to visualize both the transmit and receive software blocks 311 and 361 at the transmitter-source end by ignoring the primes on the numerals for the receive blocks. Further, the format represents software blocks 311' and 361' at the receiver destination end by considering all numerals as primed for transmit blocks and receive blocks.

Lost Packet block 381 (not shown) in the source also supplies via an RTCP packetizer 395 (not shown) second RTCP packet loss information descriptive of destination-to-source packet communication back via packet network 351 to the Control block 331' in the destination.

In other more complex embodiments the path of communication from Lost Packet Compensation 381' to Rate/Diversity control block 331 is suitably made independent of packet network 351, as by satellite, wireless, PSTN, etc.

Advantageously, control block 331 and compensation block 381 are each important improvements, singly and in combination with each other and in combination with the other blocks described. Also, feeding back STATE command information to a speech encoder improved to respond in its operations thereto, advantageously confers flexibility and control over QoS under different network 351 loading conditions.

Receive section 361' has a Delay-jitter Handling block 371' with a buffer in it, a process for reading the packet headers including their packet sequence numbers and time stamps, and a process of discarding or ignoring packets that arrive too late. Block 371' is coupled to a Lost Packet Compensation block 381' which utilizes any suitable means of reconstructing lost VOP data in lost packets such as by inserting zeroes or white noise, or by interpolation or by reconstructing from time-diversity, path diversity, or combined time/path diversity packet information.

In addition block 381' calculates the QoS measure, such as packet loss ratio as described earlier hereinabove. Lost Packet block 381' in the destination also supplies the RTCP packetizer 395' the QoS measure which packetizer 395' incorporates into the payload of return RTCP packets and sends them to control block 331.

Block 381' couples commands and encoded speech data to speech decoder block 391'. The commands identify which of plural modes speech decoder block 391' is to execute. For example, when only a single packet stream having a first type of encoding and transmission rate is being received, then the speech decoder is commanded to decode that first type of encoding and transmission rate. When a single packet stream having time-diverse packets in the stream is being received, then the speech decoder is commanded to decode by type of encoding, and to put the diverse packets information together to somewhat improve the quality of the output sound. When multiple packet streams having path-diverse packets are being received, then the speech decoder is commanded to decode by type of encoding, and to put the diverse packets information together to advantageously improve the quality of the output sound according to processes particularly emphasized herein. When multiple packet streams having not only time-diverse packets but also path-diverse packets are being received, then the speech decoder is commanded to decode by type of encoding, and to combine the packet information together to further advantageously improve the quality of the output sound.

Among various voice coders (vocoders) or speech coders contemplated for block 321 of FIG. 3 are G.711 PCM (pulse code modulation), 64 kbps (kilobits per second); G.726 ADPCM (adaptive differential pulse code modulation), 32 kbps; G.729, 8 kbps; G.729 Annex A, reduced complexity version; G.729 Annex B, silence compression; G.723.1, 5.3/6.3 kbps (dual rate); G.723.1 Annex A, silence compression; TI-CELP and VOP-optimized vocoders as described in the literature cited herein or elsewhere. These specific identifications of vocoders are non-limiting examples.

Turning again to FIG. 3, the RTCP specification describes feedback information which is contemplated herein as sent from packetizer 395' eventually to rate/diversity control block 331. It is contemplated that in one type of embodiment the feedback information be computed as described herein and/or as described in the RTCP spec. Note that RTCP can be extended if an application requires additional feedback information.

In connection with FIG. 9, RTP is useful for real-time data like interactive voice and video. RTP services include payload type identification, sequence number, time stamp, and synchronization source identifier (identifies sender and any conference contributors to the packet). The header includes other information, and the payload includes voice frames, compressed audio, video, real-time control and measurement data, or other real-time information. The timestamp reflects the sampling instant of the first byte of the first voice frame in the packet. A clock oscillator in the system of FIG. 3 provides a suitably stable time base for calculating this sampling instant time with sufficient accuracy to allow the delay jitter handling block 371' and lost packet compensation block 381' to respond to delay, jitter, and out-of-order packets.

RTP is suitably carried on top of UDP and IP. Each frame or set of frames of audio/voice/video/media has RTP header and a UDP packet contains the frame(s) and RTP header. The Payload type field in the RTP header identifies the type of coding that the encoder 321 uses.

RTCP is a control protocol for RTP. An RTCP "report packet" has a header as in FIG. 20. The report packet carries the synchronization source identifier of each sender 311 that a given one of one or more report blocks describes, as well as the synchronization source identifier of the computer (herein further improved with block 361') that creates the report packet. A report block has several fields: 1) fraction lost L, 2) cumulative number of packets lost CL, 3) extended highest sequence number received EHSN, 4) interarrival jitter J, 5) last report packet time stamp LSR, and 6) delay since last report packet DLSR. Further report blocks in the report packet of FIG. 20 identify a different sender computer (as in a conference) and report values L, CL, EHSN, J, LSR, DLSR back to that sender. Profile-specific extensions follow the report blocks as the skilled worker elects.

In RTCP report packet report block, the Fraction Lost field occupies eight (8) bits. Fraction Lost means the fraction of RTP data packets that were lost out of the packets sent by the described-sender since the last report packet was sent by the reporting sender. Fraction Lost is expressed as a binary fraction with the binary point at the left edge of the 8-bit field. Put another way, the integer occupying the 8-bit field is the Fraction Lost multiplied by 256. Put another way, Fraction Lost is the number of packets lost divided by the number of packets expected during the period since the last report packet. If the loss is negative due to duplicates, the fraction lost is set to zero. If all packets are lost in a reporting interval, no reception report is made. Note that in various alternative embodiments, the Fraction Lost calculation is either replaced by another QoS calculation, or suitably altered so that duplicates and diverse packets do not decrease the loss fraction.

Figure 21:
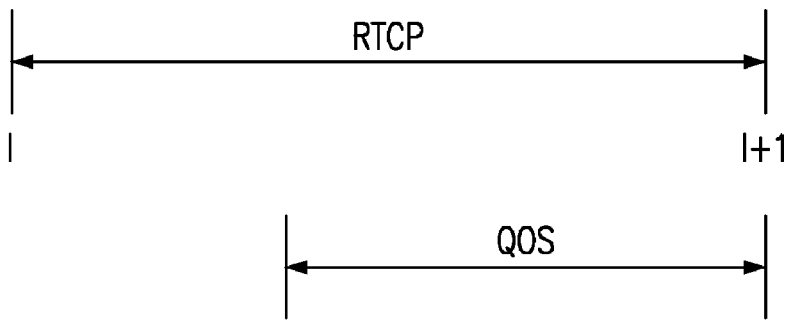
FIG. 21 is a timing diagram of time from left-to-right for sending two RTCP packets, packet I and packet I+1, and a time interval for a QoS computation process.

In FIG. 21, QoS level measure computation process embodiment is temporally localized in order to avoid smoothing of network effects. While other intervals can be used in various embodiments, currently the RTCP Transmission Interval (longer line in FIG. 21) is made long enough to gather and report statistically meaningful new QoS data. The RTCP transmission interval is made short enough at receiver 361' to report back the new QoS data and also enable the sender 311 to adaptively change its source rate and diversity in a manner that is reasonably responsive to network conditions and opportunities. The RTCP interval in one range of embodiments is set between 1 second and 30 seconds. An example value of 5 seconds RTCP Transmission Interval between the I and I−1 RTCP report packets is contemplated in the foregoing range, for instance.

The QoS level measure computation process (shorter line QoS in FIG. 21) is preferably arranged to occur right up to the end of the RTCP Transmission Interval so that the latest RTCP report packet is using the latest QoS data possible. The QoS level measure computation interval is made short enough at receiver 361' to avoid smoothing of network effects.

Packets Lost=Packets Lost in Network+Packets Unusable at Destination.

EPLR=Effective Packet Loss Ratio=[Packets Lost in Network+Packets Unusable at Destination]/Packets Sent.

Number of packets lost in a time interval between reports is suitably calculated as the difference in the cumulative number of packets lost in the report packets. The ELSN (extended last sequence number) data in the report packets is used as follows. Calculate the difference in the ELSNs between two report packets to obtain the expected number of packets during the interval between the report packets.

The packet loss fraction PLR=Packets Lost in Network/#Packets Expected=(Difference in Cumulative # of Packets Lost)/(Difference in ELSNs).

Note that the Effective Packet Loss Ratio includes not only Packets Lost in Network but also Packets Unusable at Destination in the numerator.

Figure 20:
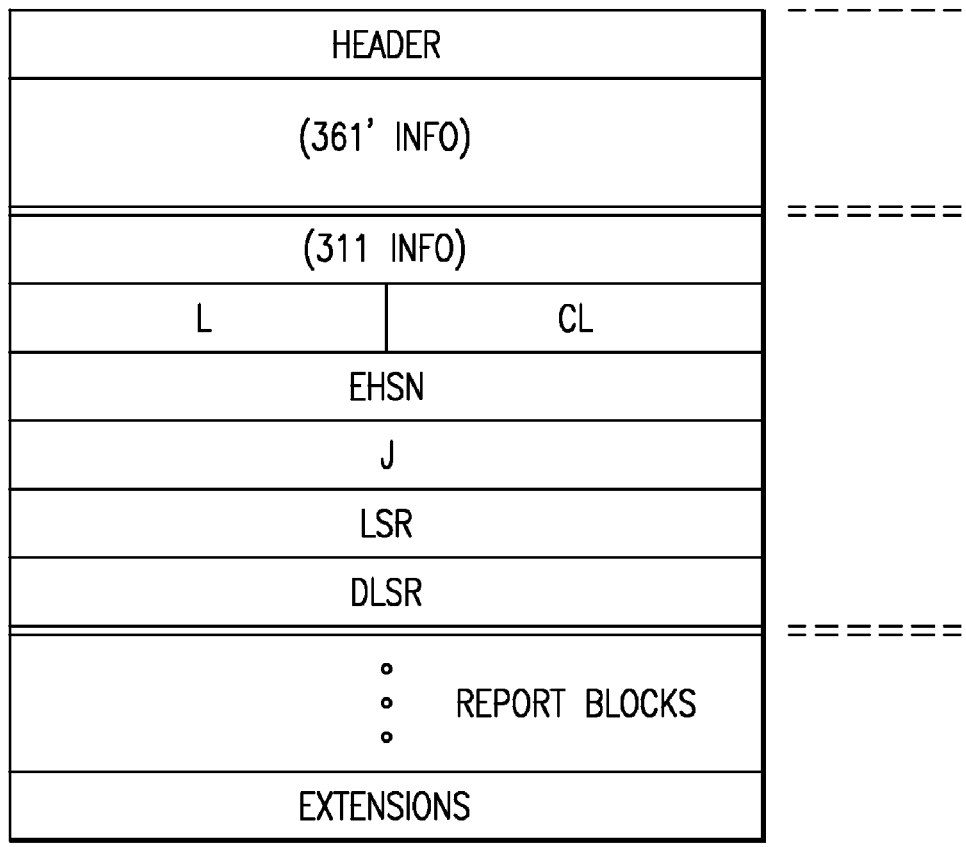
FIG. 20 is a diagram of an RTCP packet for QoS-related reporting from a receiver computer back to a sender computer.

In FIG. 20, the value L communicated from receiver to sender is suitably made equal to EPLR, or alternatively the RTCP Loss Fraction is used.

Interarrival Jitter J is a 32-bit mean deviation, smoothed absolute value, of the difference D(I, I−1) in packet spacing at the receiver compared to the sender for a pair of consecutive packets I and (I−1). Difference D is the absolute value of the difference in delays of at least two received packets. Delay d is the difference between a packet's RTP timestamp and the time of arrival in RTP time stamp units. In mathematical terms, Delay $d(I)=t(I)-s(I)$ (actual time received minus time stamp when sampled at source)

Delay Difference $D(I,I-1)=d(I)-d(I-1)$

J is suitably calculated in a calculation loop starting from an initialized value J of zero and successively calculating:

$J=J+(|D(I,I-1)|-J)/N$. N=16 is an example smoothing divisor constant used in RTCP.

Other approaches can calculate jitter as an average of absolute values of Delay Difference over a window. One procedure, among others suitable, is $J=J+[|D(I,I-1)|-|D(I-N,I-N-1)|]/N$. N=16 is an example.

Still other approaches calculate jitter as the statistical variance, or otherwise suitably as the skilled worker elects for the purposes at hand.

So another type of embodiment computes jitter J in block 371' to report back QoS. Jitter J reported back by RTCP is then compared to a threshold in rate/diversity control block 331 of FIG. 3. Thus, when packets come so variably due to jitter that a steady voice decode stream in the receiver is unobtainable (beyond threshold of acceptability), then adaptation of rate/diversity should occur.

Figure 16:
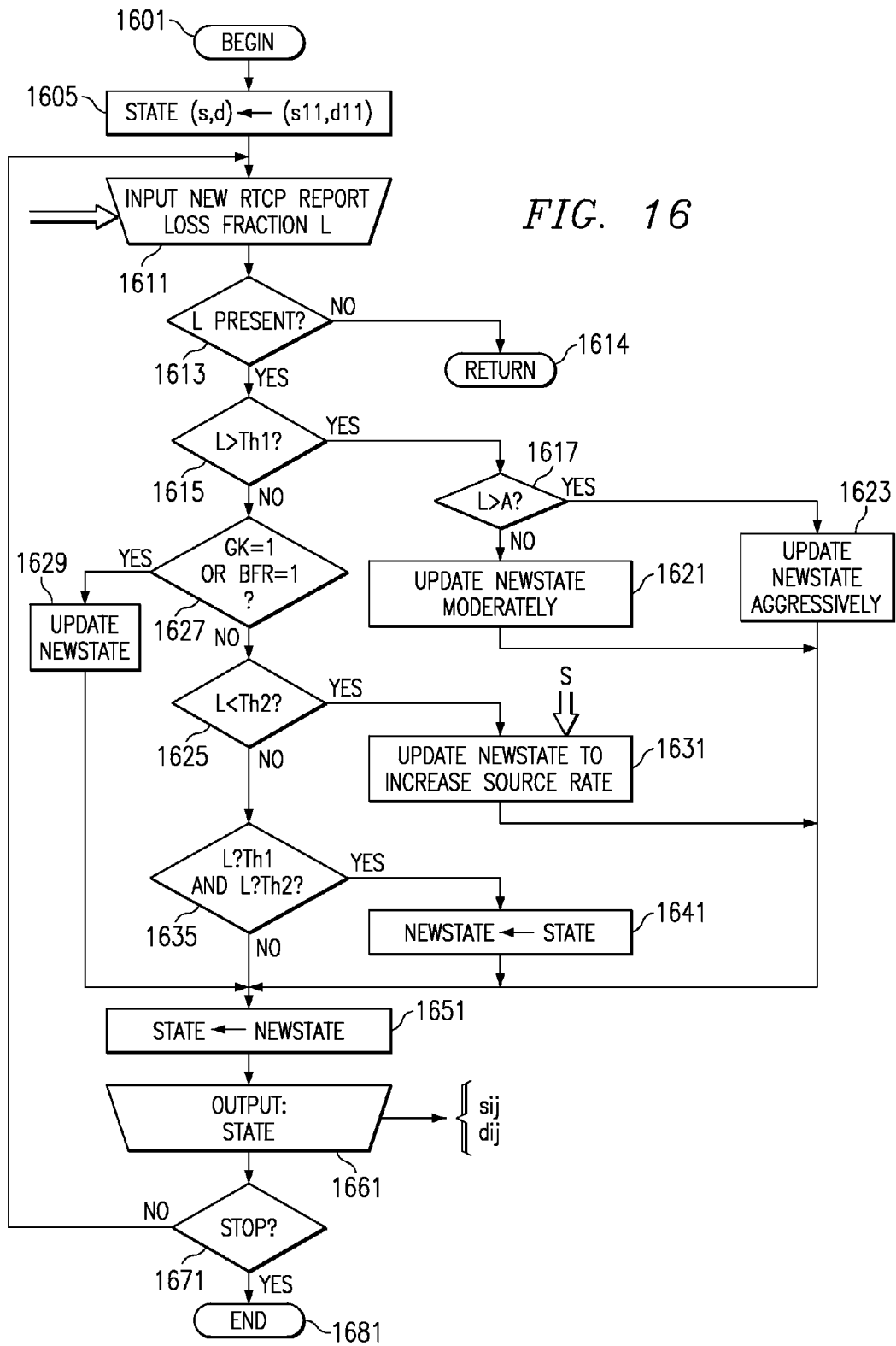
FIG. 16 is a flow diagram of a process embodiment of rate/diversity adaptation.

Still another type of embodiment computes in rate/diversity control block 331 a joint function f(Loss Fraction, Jitter) and compares its value f with a threshold and then issues STATE controls based thereon according to a control loop similar to that described in FIG. 16, only with value f substituted for value L. It should be apparent that numerous embodiments of integrated circuits, process, and systems are available to the skilled worker in implementation.

Other data in the RTCP report packet are suitably used in fashioning yet other embodiments.

Cumulative Number of Packets Lost is a 24 bit count of lost packets since beginning of reception.

Extended Highest Sequence Number Received is two data: First, the sequence number in the RTP header of the latest RTP data packet from sender 311 as received at receiver 361'. Second, a count of sequence number cycles.

Last Report Packet Time Stamp is the time of reception at receiver 361' of the latest RTCP report packet received from sender 311.

Delay Since Last Report Packet is the time difference between reception of an RTCP report packet from the sender 311, and sending this RTCP report packet from the receiver 361'.

RTCP provides for Profile-Specific Extensions in the report packets. Therefore, various QoS functions as described herein can be computed at the receiver 361' in block 371' and put into the Profile-Specific Extensions area of the report packet in some embodiments. Otherwise, the QoS functions are suitably computed in block 331 of sender 311 from RTCP report packet information like Loss Fraction and Jitter coming back from the receiver. In still a further variation, embodiments use very short RTCP application-defined packets, called APP packets and receiver 361' sends back these very short report packets instead of the longer RTCP report packets. The short APP packet suitably contains Packets Lost only, from which Loss Fraction is computed at the sender 311. Or the short packet suitably contains Cumulative Number of Packets Lost only. Or the short report packet from receiver contains Jitter and Loss Fraction only.

In this way, the introduction of block 381' as a structural and process improvement into the system advantageously improves VoIP/VOP quality by establishing adaptive control of source rate sij and diversity dij. Block 381' feeds QoS information such as packet-loss rate, delay statistics and any other information selected by the skilled worker as useful for this purpose, back to rate/diversity control 331. Rate/diversity control 331 thereupon responds to the feedback information according to any suitable process established in control 331 and described herein or hereafter devised to improve QoS when it becomes less satisfactory. Such process can operate according to a thresholding algorithm as described elsewherein, or respond in a more gradual manner either according to more closely spaced thresholds or according to a virtually continuous adjustment of source rate and diversity.

Further, the introduction of block 381' as a structural and process improvement into the system advantageously improves VoIP/VOP quality by actually utilizing more of the packets sent to receiver 361' via packet network 351. Block 381' utilizes packets having diverse information and combines their information and controls speech decoder 391' so as to form a speech output (or other audio or image or other media output) that more nearly replicates the speech input to speech encoder 321 originally or otherwise improves the quality.

Having a sender that has RTP protocol and a receiver that has RTCP to feed back a packet loss fraction to the sender are improved. The sender is improved by introducing rate/diversity control block 331 to add diversity and rate/diversity adaptation with state feedback to the speech encoder. Likewise improvements for lost packet compensation for the receiver are provided by block 381'.

Turning now to FIG. 4, and considering operations at the system level, source rate control with no diversity looks at the packet loss rate, for example. If the packet loss rate is higher than a particular threshold, then an embodiment of the process requests one, some or all the senders to reduce their source rate so that the congestion condition can be removed from network 351.

Packet network 351 is a collection of interconnected routers or nodes, interconnected by links, and for the senders in a complex network, not all of the users are necessarily using the same links between the nodes. Thus, in FIG. 3, user 301.p is using different links such as link 303 in contrast to user 301.q who is using other links such as link 305. However, a link 307 may be used by many users more frequently than some other links in network 351, and thus contributes to packet loss and consequent low QoS more than do links 303 and 305. Such a link 307 is then termed a bottleneck link.

In FIG. 4 a bottleneck network link simulation was run with speech activity at 45%. The header bit rate was set at 8 kbps and the channel capacity was set for 24×64 kbps (in FIGS. 4, 5, 7 and 8). The simulation studied source rate control with no diversity. Packet loss rate in percent (accounting for both actually lost packets and too-late packets) was graphed versus number of users (N) in a family of curves in FIG. 4 corresponding to various source rates of 16 kbps, 11.2 kbps and 8 kbps wherein source rate is a parameter of the family of curves. Given an initial source rate of all users at 16 kbps, then as number of users N rises, the packet loss rate rapidly and nonlinearly rises along a curve 411 until packet loss rate has reached Threshold1 of about 4% at about 140 users. Further in the FIG. 4 example, requesting a source rate reduction from illustratively 16.0 kbps to 11.2 kbps suddenly and effectively causes the packet loss rate to fall, as shown by arrow 413, from curve 411 to a curve 421 having parameter 11.2 kbps. Then as more users access the network and their number rises to about 180 users, then the packet loss rate even on the curve 421 rises rapidly once again nonlinearly to Threshold1 of about 4%. Once again, the source rates are dropped for all users, this time from 11.2 kbps to 8 kbps, and the packet loss rate drops as shown by arrow 423. Now packet loss rate for the 180 users is near zero, as seen by inspection at N=180 of a curve 431 having parameter 8 kbps.

As can be seen from inspection of the FIG. 4, more curves for higher source rates, intermediate source rates, and lower source rates can be added, and numerous quite sophisticated embodiments can be devised by the skilled worker to control packet loss rate. For example, the packet loss rate suitably is arranged to fall along an arrow like 413 not to essentially zero as shown but to still-significant positive value, by adding intermediate source rate values and more smoothly adjusting source rate. Alternatively, the system and process are structured to vary the source rate (and/or diversity) in the manner of a servomechanism or servo process loop to minimize an error defined as the departure from a target level of QoS. The loop would lock onto the target QoS level, except when to do so would require a source rate in excess of a maximum source rate permitted for the system or otherwise be subject to some technical constraint. Then arrows 413 and 423 would be essentially insignificant in magnitude.

Figure 5:
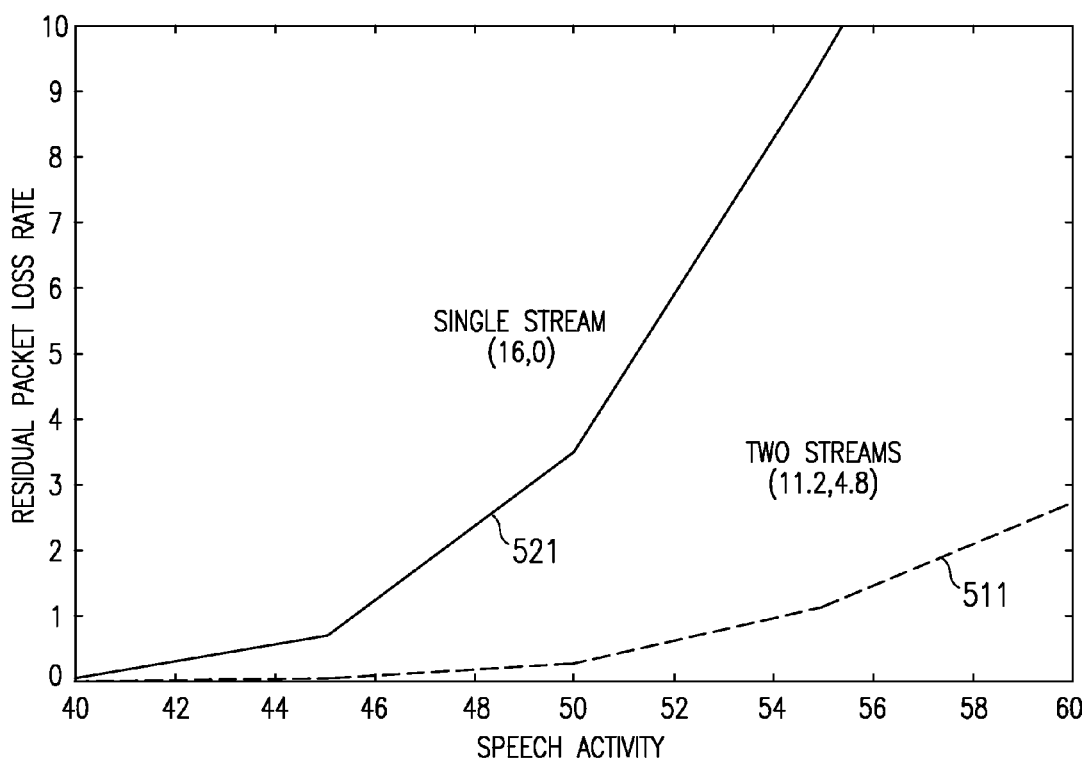
FIG. 5 is graph of residual packet loss rate in percent versus speech activity for two curves in a media-specific redundancy example, a first curve corresponding to a source rate and no diversity, and a second curve having a lower source rate and with diversity introduced.
Figure 7:
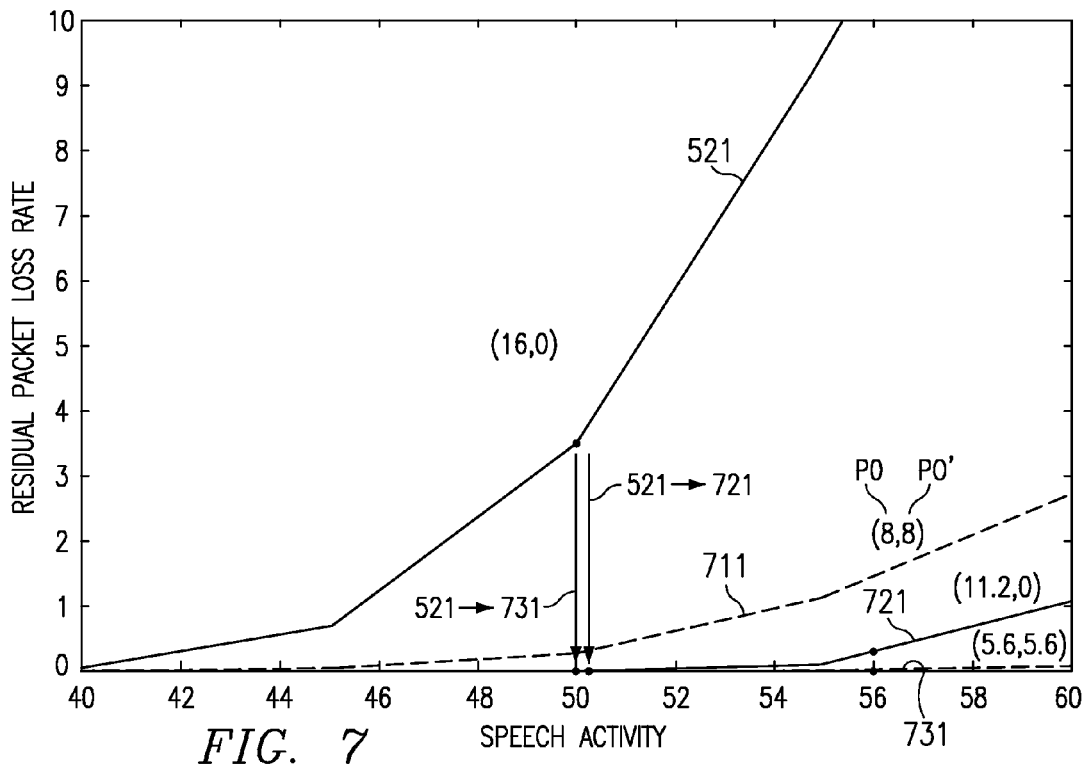
FIG. 7 is a family of curves of residual packet loss rate in percent versus speech activity for four curves in a multiple description example, two of the curves corresponding to a source rate and no diversity, and two more curves having a respectively lower source rate and with diversity introduced.

In FIG. 5, the advantageous effect of diversity in reducing the y-axis residual packet loss rate is illustrated for a media-specific redundancy example. Residual packet loss rate accounts only for actually lost packets and too-late packets that were not compensated by receipt of diversity packets. Speech activity is a percentage of time that speech and not silence is occurring. Over a wide span of speech activity from 40-60 percent on the x-axis, the residual packet loss rate curve 511 when diversity is used, is dramatically lower than for curve 521 when a single stream of packets is used. Diversity curve 511 is illustrated for s12=11.2 kbps and d12=4.8 kbps using P0 P1P0' P2P1' . . . sequence. Diversity curve 521 is illustrated for s11=16 kbps and d11=0 kbps using P0 P1 P2 . . . sequence. The curves of FIGS. 4, 5, 7 and 8 were derived from a simulation model described in connection with FIG. 12. In FIGS. 5 and 7 simulated number of users N was 128. It was assumed that all users use the same source rate and diversity rate in computing each curve in FIGS. 5 and 7.

FIG. 7 is similar to FIG. 5 in the axes and uses MD (multiple description) coding as an example. Further in FIG. 7, residual packet loss rate L is progressively reduced for any given x-axis amount of speech activity in the order of curves 711, 721 and 731. Those curves respectively represent (sij, dij)=(8,8), (11.2,0) and (5.6,5.6) kbps. Rate/diversity adaptation is dramatically effective.

Figure 8:
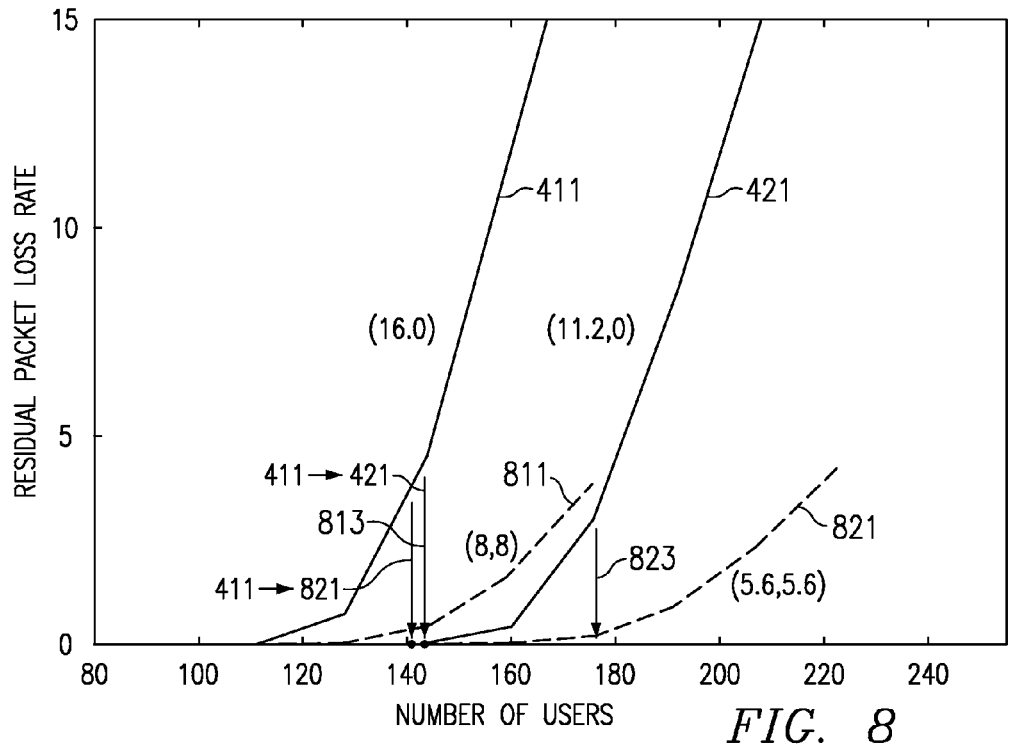
FIG. 8 is a family of curves in a multiple description example of residual packet loss rate in percent versus number of users N, each curve having a different source rate in kilobits per second, and two of the curves having diversity as well.

FIG. 8 illustrates another MD (Multiple Description) coding example. FIG. 8 changes the axis of Packet Loss rate of FIG. 4 to Residual Packet Loss Rate in FIG. 8. No-diversity source rate curves 411 and 421 (16.0 and 11.2 kbps source rate respectively) are repeated for clarity in FIG. 8 because when no diversity is used Residual Packet Loss Rate equals Packet Loss Rate. This bottleneck link simulation had speech activity held constant at 45%, and header bit rate 8 kbps. Again, the introduction of diversity at a given overall transmission rate (sij+dij) produces a dramatic improvement in residual packet loss rate.

The FIG. 8 curves substantiate the feasibility and advantage of using stepwise changes of STATE according to a process embodiment of FIG. 1, wherein not only does transition 101 improve QoS but also a further step 1007 (of FIG. 10) further improves QoS if such further step becomes needed. Compare the improvement represented by curve 811 (represents (8,8) case) compared to curve 411 (16,0). At a given number of users the improvement in packet loss rate, indicated by down-arrow 813 is striking—down from 3% example Threshold1 to less than 1%. Further compare the improvement represented by curve 821 (represents (5.6,5.6) case) compared to curve 421 (11.2,0). At a higher given number of users the improvement in packet loss rate, indicated by down-arrow 823 is also striking—again down from 3% example Threshold1 to less than 1%.

While in the rate diversity adaptation of FIG. 3 only two users are shown, at a sender 311 and a receiver 361', various network embodiments do contemplate dozens, hundred, thousands or more users of network 351 in FIG. 3. Some, many or all of the users are each provided with improved transmit/receive software and apparatus 311 and 361 of FIG. 3. Packet network 351 is thus recognized to be a common area where the service demands of many users may start to contend or to produce congestion. Put another way, if FIG. 3 be visualized as the send/receive software 311, 361 and computer of one user, then for 140 users, FIG. 3 is replicated or multiplied 140 times with packet network 351 being common to all the diagrams. It should be understood further that because of the numerous different embodiments of the invention, various of those embodiments are suitably distributed to the various users with advantageously compatible use of one or more of the various embodiments all across the network.

In FIG. 3, the RTCP block sends back the packet-loss rate for packets that originated at the sender computer for which the receiver destination computer is receiving. And so, if it so happens that a low packet loss rate is detected at RTCP packetization block 395', the receiver 361' will signal back to sender 311 control block 331 a low packet loss rate that tells the sender block 331 "do not add any diversity dij." Whereas, another receiver at 301.$p$ would detect another packet loss rate from a sender, such as 301.$q$, from which 301.$p$ is receiving and not sender 311 and not coordinated in any way with receiver 361' either, but independent from both of sender 311 and receiver 361'. So a receiver at 301.$p$ improved with an embodiment like that at 361' would send back packet loss fraction information through network 351 to its own sender 301.$q$ the instructions whether to add diversity or not, or the information on which sender 301.$q$ would determine whether to add diversity or not in further transmission to the receiver at node 301.$p$.

The amount of source rate adjustment and diversity adjustment responsively introduced by a given sender is subject to selection of any of various embodiment, the selection suitably made by the skilled worker bearing in mind principles of engineering economics, desirably short response-time, and other considerations.

For example, if the RTCP packet loss fraction datum rises above a tolerable Threshold1, one type of embodiment makes relatively smaller adjustments to source rate and diversity at the sender, and awaits reception of one or more additional RTCP packets to determine whether the packet loss fraction datum remains above the tolerable Threshold1, whereupon further adjustments to source rate and/or diversity are incrementally introduced until the packet loss fraction has been reduced acceptably.

In another type of embodiment, when the RTCP packet loss fraction datum rises above a tolerable Threshold1, such type of embodiment detects the difference between the packet loss fraction and Threshold 1 (or compares the fraction with Threshold1 and one or more additional even less tolerable higher Thresholds). Then block 331 in such embodiment makes adjustments to source rate and diversity at the sender, the adjustments being either incremental or more major depending on whether the packet loss fraction is near Threshold1 or in fact is much greater than Threshold1. Such embodiment does not await reception of one or more additional RTCP packets to determine whether the adjustment should be major rather than incremental. However, such embodiment does further update its adjustments and operations utilizing packet loss fraction data from further RTCP packets. The process in such embodiment is suitably tuned to produce adjustments that converge upon appropriate level of QoS in a desirably short response time. The process is tuned to prevent any major adjustments from leading to oscillation. Oscillation occurs when major decrease adjustments alternate with major increase adjustments, or divergent sequences of adjustments happen that do not contribute to satisfactory QoS.

Sender 311 decides whether to perform rate/diversity adaptation depending on the particular packet loss fraction (or other QoS measure) reported back from the particular receiver 361' to which sender 311 communications are destined. Sender at node 301.$q$ decides whether to perform rate/diversity adaptation depending on the particular packet loss fraction (or other QoS measure) reported back from the particular receiver at node 301.$p$ to which the communications from the sender at node 301.$q$ are destined.

The adjustments thus involve two or more of adjusting source rate sij, adjusting diversity rate dij (involving either or both of time diversity and path diversity rates), and adjusting the overall transmission rate sij+dij.

It is possible to have one receiver 361' having no problem with packet loss and another receiver say at 301.$p$ having a lot of packet loss. Advantageously, various embodiments avoid contributing in any way to an metastable or unstable network equilibrium wherein some nodes would interact collectively to "hog" network resources and others would be starved for network resources. Some schemes use redundancy wherein they repeat packets or information therein and thus increase the overall transmission rate. An important advantage of some embodiments is to use diversity adaptively—in other words, based on the network needs—and to avoid making congestion or the deleterious significance of a given bottleneck-link worse. Some embodiments have a first advantage of using the diversity as it is needed, and/or a second advantage of trying to reduce the congestion by both changing the source rate and the amount of diversity as well.

If some senders were encountering a lot of packet loss problems, then suppose that they start adding diversity and thus attempting to use more network resources and congesting the network some more. A further sender and receiver pair are now forced over their Threshold1 of tolerable packet loss fraction, due to the increase in network congestion due to the first-mentioned senders. Suppose the further and now newly over-Threshold1 sender and receiver also add diversity and attempt to use more network resources and congest the network still more, introducing QoS problems at further and further senders and receivers, in a snow-balling or chain reaction effect, wherein the packet network becomes even more greatly congested leading to network problems. Various embodiments avoid this problem by adding diversity to recover QoS adaptively, and either use the same overall transmission rate sij+dij, or decrease the overall transmission rate.

The response of sender 311 under control of block 331 might in some embodiments, as illustrated in FIG. 11, ask the network for more bandwidth, and such embodiments can be used where the chain reaction scenario is not applicable. But many of the embodiments advantageously avoid the chain reaction scenario even when it is applicable, by adapting to reduce the overall transmission rate sij+dij when the QoS becomes less acceptable. Thus, a form of the latter such process reduces the overall transmission rate even when it adds diversity, by concurrently reducing the source rate by an amount exceeding an amount of contribution due to addition of diversity. In other words, some process embodiments are improvements to control the sender in such a way as not to increase the overall transmission rate, thus the requested bandwidth and attendant network congestion, but instead will use the network in a way which will reduce lost VoIP/VOP packets.

Rate and diversity usage of the network is optimized subject to the constraint that overall transmission rate be less than or equal to a given amount (which might change with network conditions). In optimization mathematics terminology, a QoS merit function is optimized subject to at least one constraint, namely that overall transmission rate be less than or equal to a given amount.

QoS is affected jointly by the amounts of source rate at which the speech encoder is transmitting and given by variable sij and diversity given by variable dij commanded by control block 331 of FIG. 3. Diversity has types: time diversity or path diversity or combined time/path diversity, for instance.

The overall transmission rate is allocated between the source rate and the diversity dij.

Given a subsisting state of the network, QoS is a function of sij and dij. Mathematically, QoS is a function of two variables sij and dij. Graphically, QoS is a surface in a three-dimensional space having QoS as a vertical dimension and having two horizontal dimensions sij and dij. Thus, $$QoS=f(sij,dij).$$

As between two users p and q, QoS(p,q,t) represents the QoS for communications from p to q at time t. QoS(q,p,t) represents the QoS for communications in the opposite sense from q to p at time t. QoS varies with number of users N, speech activity A, and over time depending on the configuration state of the network. Put another way, $$QoS=QoS(p,q,sijp,dijp,A,N,t).$$

This 7-dimensional QoS function expresses the idea that QoS depends on which two users are involved, the source rate sij from sender p, the diversity rate dij from sender p, number of users N and the time t.

Let L be the packet loss after the application of diversity, meaning after any packet recovery or reconstruction that is implemented. Packet loss rate L is inversely related to QoS by a function g(L) so $$QoS=g(L((p,q,sijp,dijp,A,N,t)).$$

FIGS. 4, 5, 7 and 8 represent graphs of residual packet loss in various hyperplanes cutting through the multi-dimensional space representing L(p,q,sijp,dijp,A,N,t).

Further, the following inequality expresses the challenge solved by embodiments herein to keep QoS above a threshold subject to a constraint on each sender p on overall transmission rate:

$$QoS(p,q,sijp,dijp,A,N,t)>\text{threshold}$$

*sijp+dijp*<=max overall transmission rate respective to each sender p.

or, put otherwise, $$L(p,q,sijp,dijp,A,N,t)<\text{threshold}$$

*sijp+dijp*<=max overall transmission rate respective to each sender p.

The sender takes advantage of the diverse properties of the packet network so as to reduce the packet loss rate and increase the QoS to at least an acceptable amount.

When the threshold applies to all the users on the network, then the challenge of maintaining high QoS calls for the network-friendly advantages discussed elsewhere herein.

Some embodiments have just one QoS threshold wherein if the transmission quality becomes less acceptable than that threshold, an embodiment will make an adjustment in rate/diversity adaptation indicated by transition 101 of FIG. 1 to improve QoS. However, the fact of even a single threshold does not prevent control block 331 from making one or more further adjustments like transition 1007 of FIG. 10 when additional RTCP packets indicate that the QoS remains on the unacceptable side of the threshold. The apparatus acts like a servomechanism wherein the use of even just one error threshold (although other embodiments herein can use more thresholds) enables the servo notwithstanding to continually make adjustments in its output to keep the error within the threshold. Thus, when QoS is unacceptable, the apparatus keeps adapting, if possible, by changing the values of sij, dij, or both, until QoS is brought within an acceptable range. At some point, given a subsisting state of the network, there will be an state of adaptation of an embodiment that confers not just adequate QoS but optimum QoS. Some embodiments find a barely acceptable QoS, others provide adaptive ways to reach the optimal QoS structure of (sij, dij) and search until the optimum QoS is obtained. Suppose the optimal QoS is obtained in the computers of every one of the network users. Since the optimum is the best the apparatus can do under constrained circumstances, consider whether network performance will start to degrade or become unstable. When circumstances are bad, the conditions are improved by adding diversity and reducing the overall transmission rate. When the situation is measurably improved, the source rate is suitably increased cautiously or incrementally through multiple stages 103 and 105 in FIG. 1, while the diversity is suitably reduced, maintained, or in the example of transition 103 even increased. Further in the example, the diversity is reduced or terminated on the final recovery transition 105 in oval 111.

Control block 331 takes original compressed speech packets P0, P1, P2, P3 and suitably adds diversity. If diversity robustness becomes needed, then it adds P0' a form of the information in packet P0. So if the network loses the packet P0, or P0 comes too late and thus is not available while P0' is on hand, then the lost packet compensation block 381' uses bits P0' to reconstruct the information in packet P0 to some extent or even fully.

Figure 6:
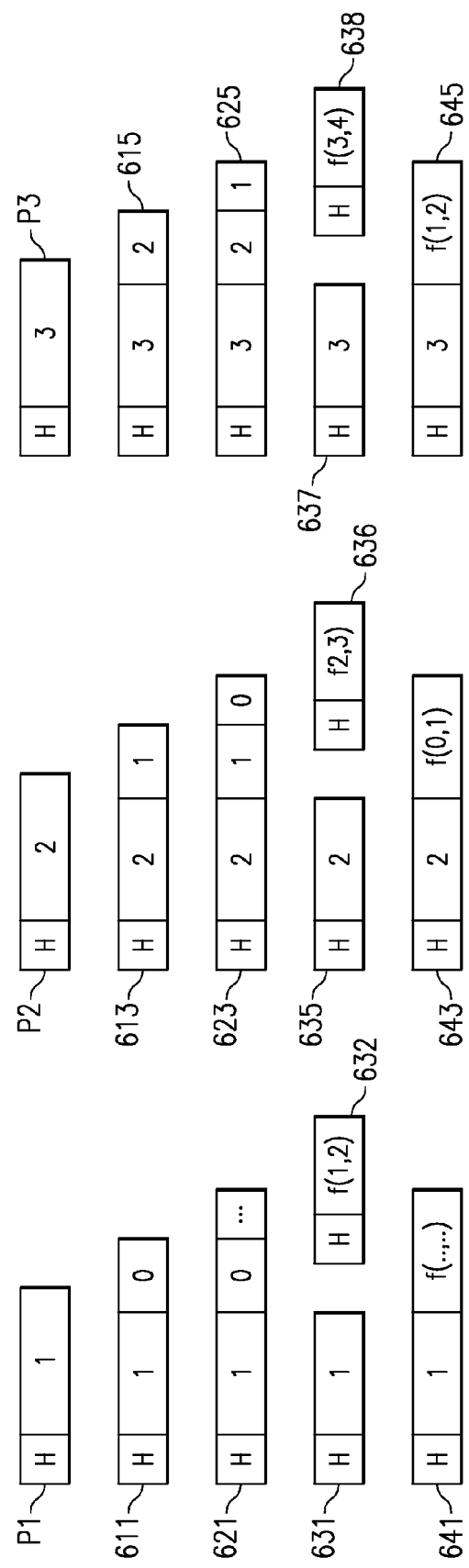
FIG. 6 is a diagrammatic representation of packets in 5 transmission processes, wherein time extends horizontally as successive columns in FIG. 6, and the different transmission processes correspond to five different rows of differently labeled packets in FIG. 6.

In FIG. 6 no diversity is implemented as a stream of packets P1, P2, P3 with their respective different headers H. Time diversity, in a first example has packet 611 with the information of packet P1 and an appended, or trailing set of compressed bits (0) having information dependent relative to a previous packet P0. Packet 611 is followed by packet 613 bearing information of packet P2 and an appended, or trailing, set of compressed bits (1) having information dependent relative to packet P1. Packet 613 is similarly followed by packet 615 bearing information of packet P3 and a trailing set of compressed bits having information dependent relative to packet P2.

Time diversity, in a second example has packet 621 with the information of packet P1 and trailing bits for compressed information dependent relative to two previous packets. Packet 621 is followed by packet 623 bearing information of packet P2 and an appended, or trailing, set of compressed bits having information dependent relative to packet P1 and the next previous packet before P1. Packet 623 is similarly followed by packet 625 bearing information of packet P3 and two trailing sets of compressed bits having information dependent relative to packets P2 and P1 respectively. Succeeding packets have information of the nth packet and two trailing sets of compressed bits having information dependent relative to the nth packet's two predecessor packets P(n−1) and P(n−2).

Further in FIG. 6, a packet 631 having the information of packet P1 is sent through the network. Further, a packet 632 has compressed bits which are a function not only of packet P1 information but also packet P2 information. Further in the sequence, packets 635 and 637 are successively sent bearing the information of packets P2 and P3. Dependent packet 636 bears information that is a function f(2,3) of packets 635 and 637. Dependent packet 638 is similarly constructed in sequence. Here an example of function f is exclusive-OR (XOR) as in FEC parity schemes.

Another embodiment of time diversity has packets 641, 643, 645, etc. having information same as packets P1, P2, P3, etc. as well as respective appended information bits dependent as a joint function of the information in the two preceding packets, e.g. f(1,2).

In FIG. 11, the source rate s11 of a packet stream 1111 is a given amount. When QoS falls, the control block 331 utilizes an alternative process wherein it reduces the source rate to an amount s22 compared to first source rate s11. However, diversity d22 is added in packet stream 1121 and the overall transmission rate s22+d22 exceeds the original transmission rate s11 (where d11 was zero).

In a further alternative, control block 331 maintains source rate s22 equal to s11 and diversity d22 is added as shown in a packet stream 1131. Here again overall transmission rate exceeds the original transmission rate of stream 1111.

Figure 12:
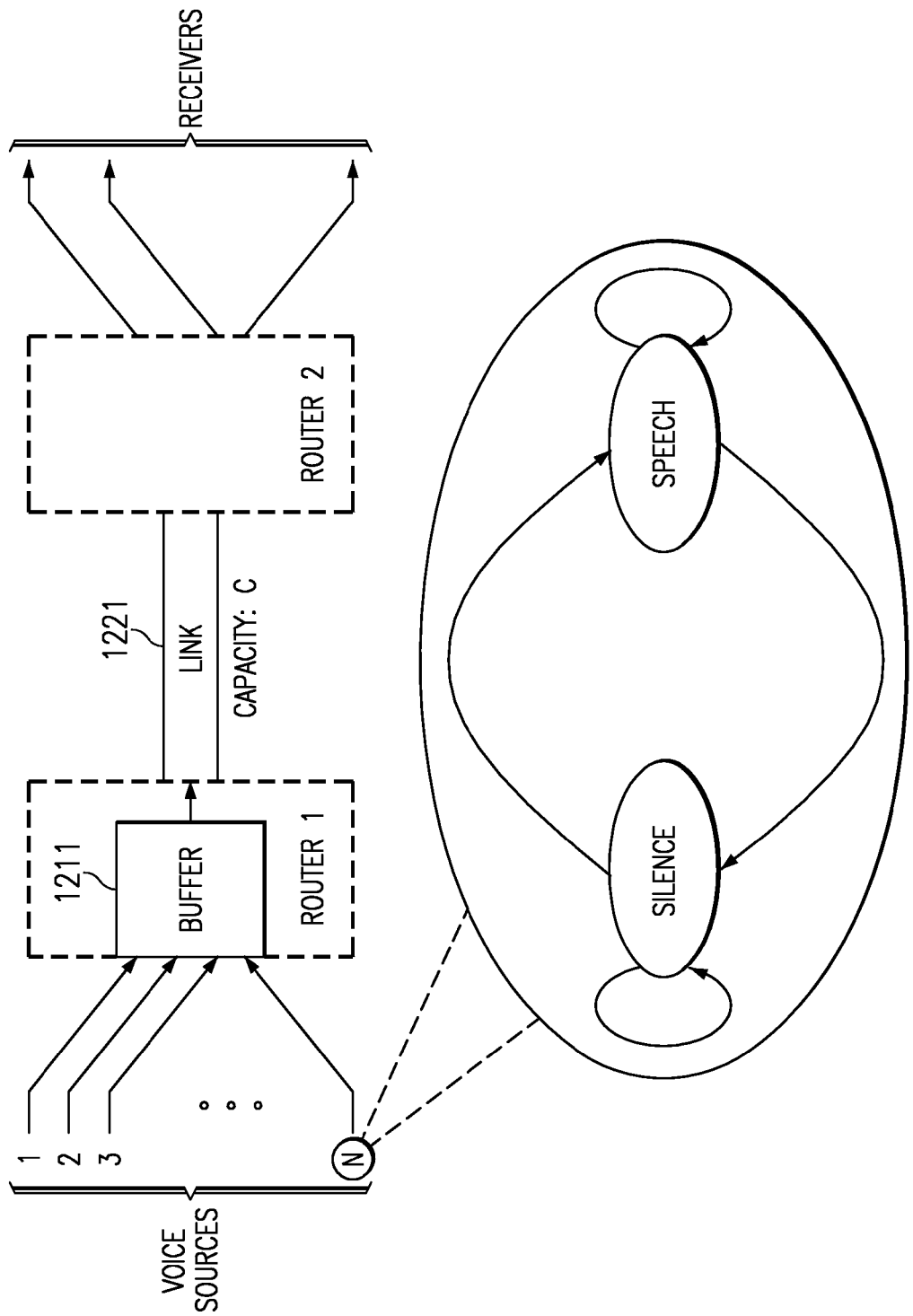
FIG. 12 is a block diagram of a simulated network, called a single bottleneck link simulation having voice sources each described by a state transition diagram inset depicting a two-state Markov voice source.

FIG. 12 illustrates packet loss simulation. Voice sources 1, 2, 3, . . . N each have two-state Markov models comprising speech and silence states. Each voice source is assumed to use the same coder rate R. The voice sources are fed to a buffer 1211 and thereupon to a communications link 1221 having a capacity C of, for example, 24×64 kbps. The buffer 1211 has a size, for example, of C/(R+H) packets, where C is link capacity, R is coder rate, and H is overhead rate. The model simulates to determine the packet loss rate L which results from various combinations of source rate, time diversity and path diversity, thus producing the graphs of FIGS. 4,5,7 and 8. Software prepared in a straightforward manner by the skilled worker operates various blocks of the system of FIG. 3 and implements the process embodiments such as those represented by the state transition diagrams of FIGS. 1 and 10.

Figure 13:
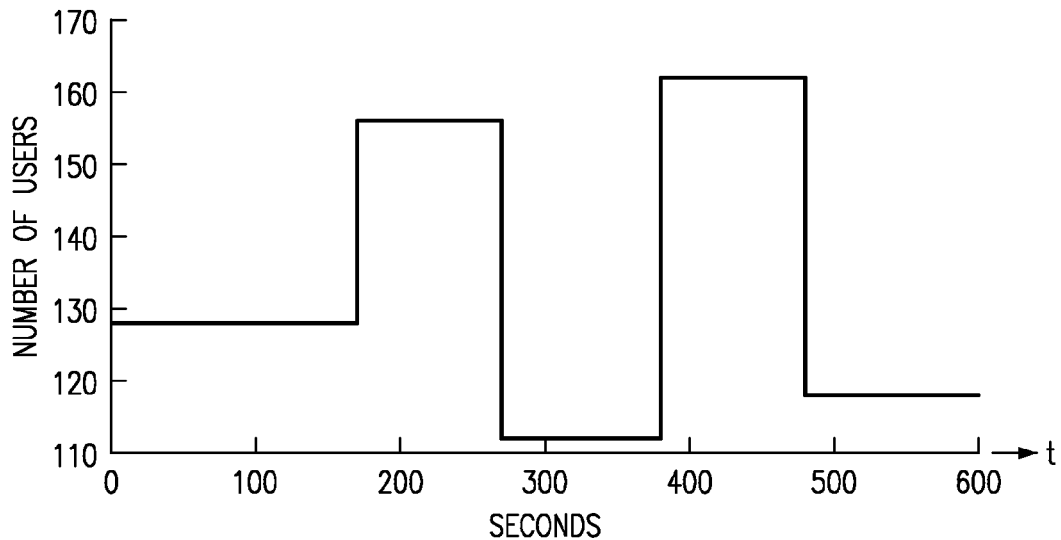
FIG. 13 is a graph of simulated network usage by number of users N versus time t, which is input to the FIG. 12 bottleneck link simulation.

In FIG. 13, input to the simulator of FIG. 12 varied number of users N over a time interval of ten (10) minutes (600 seconds). N started out at 128, rose to 155, then dropped to 112, rose to 164 and then dropped to 120. The simulator of FIG. 12 then produced packet loss rate data. This data was fed to control software for control block 331, which in turn produced states of FIG. 1 for line STATE in FIG. 3 in order to bring packet loss rate, and thus QoS, under control.

Figure 14:
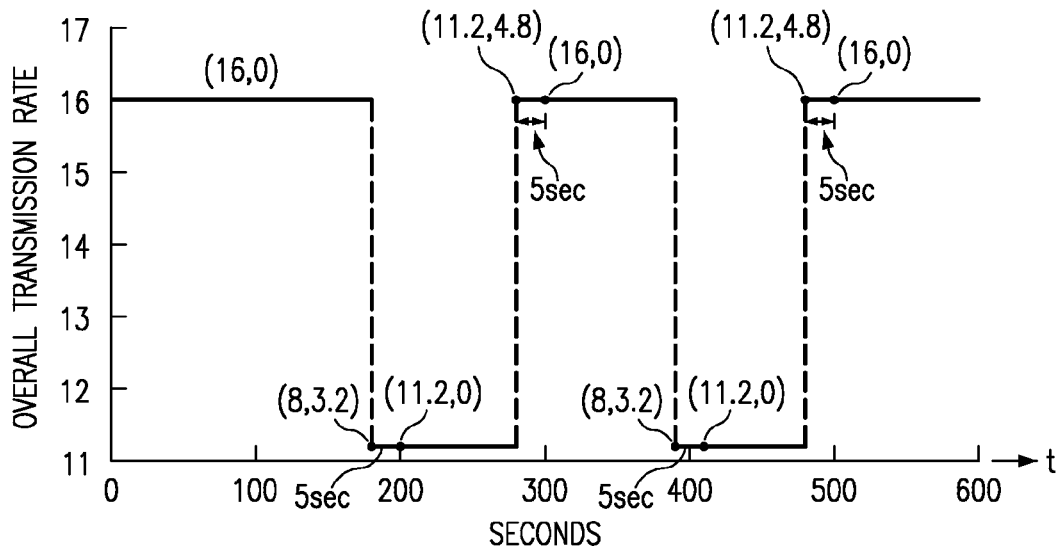
FIG. 14 is a graph of overall transmission rate showing various states of FIG. 1, versus time, which states are output from the FIG. 12 bottleneck link simulation.

In FIG. 14, the states produced by the control block 331 are illustrated in a graph of Overall Transmission Rate sij+dij versus time t over the ten minute interval of FIG. 13. During use by the initial number N=128 of users, 16 kbps source rate and zero diversity is selected by control block 331, corresponding to state (s11,d11) of FIG. 1. When the users rise to N=155, the control block downshifts to 8 kbps source rate and 3.2 kbps of diversity, corresponding to FIG. 1 transition 101 to state (s22,d22). Then a transition next occurs after about 5 seconds to a state (s21, d21) of (11.2, 0) kbps which persist for about 100 seconds. Next, when the users drop to N=112, the control block 331 transitions back to 16 kbps overall transmission rate, but does the transition as two-step up-shift in the structure of source rate and diversity as follows. First, the transition goes to state (s12,d12) using 11.2 kbps source rate and 4.8 kbps diversity rate. Second, a succeeding transition goes from state (s12,d12) back to state (s11,d11) and recovers 16 kbps source rate and turns off the diversity to zero. Later and further in FIG. 13, when the number of users subsequently goes to N=164 and then lastly down to N=120 in FIG. 13, the control block 331 adapts by again transitioning through steps as described.

Figure 15:
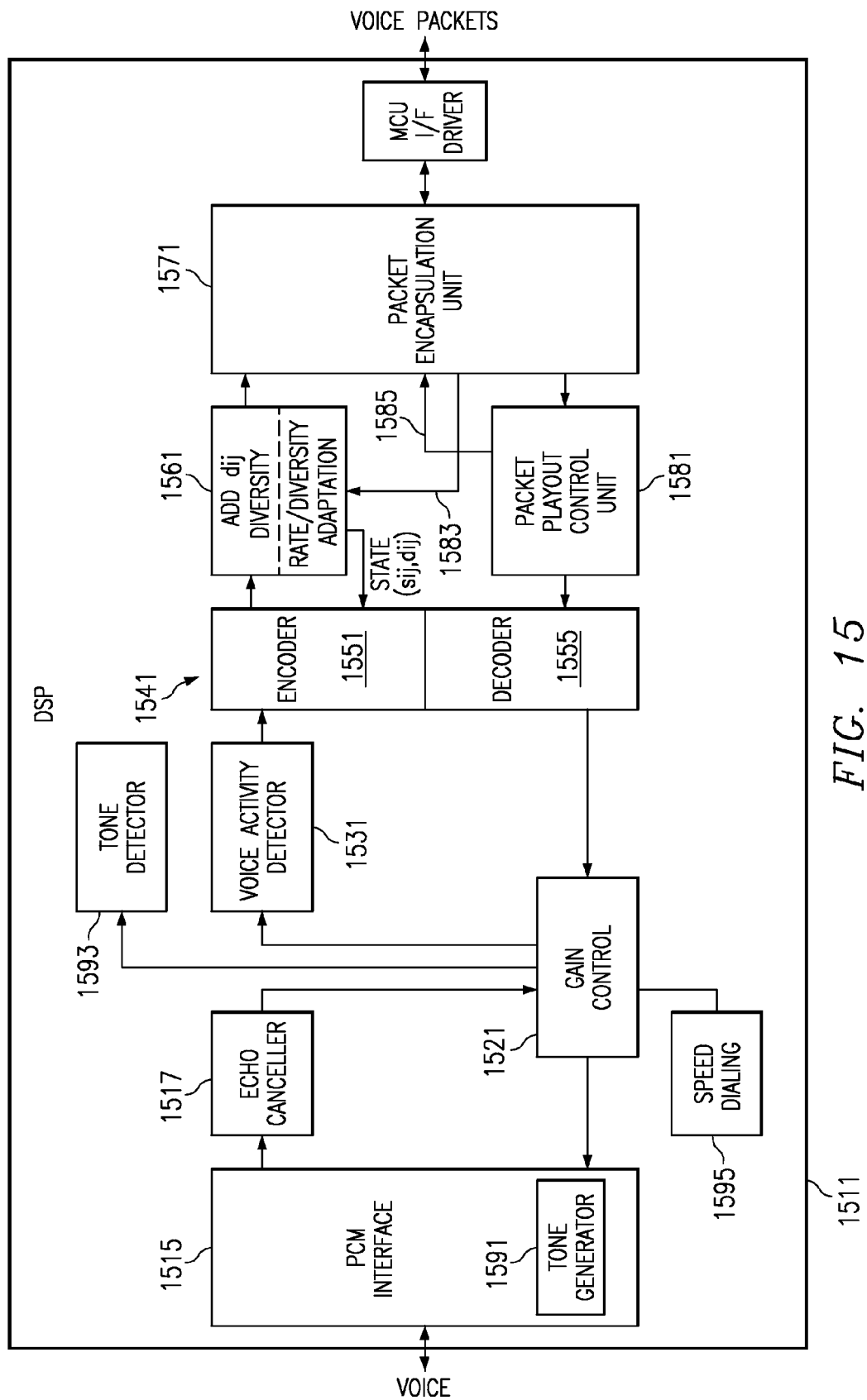
FIG. 15 is a block diagram of a combined sending/receiving process, integrated circuit device and system embodiment with adaptive rate/diversity improvements.

In FIG. 15, a packet voice digital signal processor (DSP) is implemented as an integrated circuit 1411. The integrated circuit is suitably a CMOS DSP such as any suitable selection from the TMS320C54x or TSM320C6x DSP families, or other such families commercially available from Texas Instruments Incorporated, Dallas, Tex. USA. See Wireless and Telecommunications Products Central Office, Telemetry RF Receivers and Personal Communications Solutions, Data Book, Texas Instruments Incorporated, 1996, which is hereby incorporated herein by reference, and particular Chapter 9, Digital Signal Processors therein.

For example, the TMS320C54x fixed-point, DSP family is fabricated with a combination of an advanced modified Harvard architecture which has one program memory bus and three data memory buses. This processor also provides a central arithmetic logic unit which has a high degree of parallelism and application-specific hardware logic, on-chip memory, additional on-chip peripherals. This DSP provides a specialized instruction set for operational flexibility and speed of the DSP.

Separate program and data spaces allow simultaneous access to program instructions and data. Two reads and one write operation can be performed in a single cycle. Instructions with parallel store and application-specific instructions are provided. Data can be transferred between data and program spaces. The parallelism supports a powerful set of arithmetic, logic and bit-manipulation operations that can all be performed in a single machine cycle. Control mechanisms manage interrupts, repeated operations and function calling. On-chip RAM and ROM memories are provided. Peripherals on-chip include serial port and HPI host port interface.

In FIG. 15, integrated circuit 1511 is improved with software manufactured into the ROM, or other nonvolatile, memory for implementing some part of the process embodiments. Thus, FIG. 15 emphasizes an example of software blocks manufactured into the integrated circuit 1511, the hardware described hereinabove being understood. Thus, description in software parlance follows next regarding FIG. 15 wherein for example a "unit" refers primarily to a block of software, although a hardware block is another suitable alternative.

In FIG. 15, voice samples are supplied from an analog to digital converter (ADC) not shown, to a PCM interface 1515 and converted there to pulse code modulation. Next the PCM is fed to an Echo Canceller block 1517, which feeds a Gain Control block 1521. Gain control 1521 supplies a Voice Activity Detector 1531 which detects whether voice packets or silence packets are to be generated. The output of Voice Activity Detector 1531 goes to a speech coder 1541 having a Voice Coding Unit, or encoder, 1551. The speech coder 1541 is suitably devised or implemented by the skilled worker so as to have multiple coding rate modes as contemplated herein. For one example, G.729 and Annexes with 11.8 kbps, 8 kbps and 6.4 kbps selectable source rates sij is suitably used. Then an Add Diversity (dij) Rate/Diversity Control Block 1561 couples the output of encoder 1551 to a Packet Encapsulation Unit 1571 which thereupon outputs voice packets from the DSP. Control Block 1561 also feeds back STATE (sij,dij) control signals back to voice coding unit 1551 to command unit 1551 to produce speech packets at the sij source rate, and to produce diversity packets for diversity transmission at rate dij via packet encapsulation unit 1571.

On a receive path in FIG. 15 voice packets enter packet encapsulation unit 1571 where they are depacketized and passed to a Packet Playout Control Unit 1581. Control Unit 1581 has software that implements process steps for delay handling, delay jitter handling and lost packet compensation. Incoming RTCP packets contain lost packet fraction information from a destination across the network external to integrated circuit 1511. This lost packet fraction information is fed via a path 1583 to the Rate/Diversity control block 1561.

Also, the delay and jitter handling portion of Packet Playout Control Unit 1581 includes software process steps to produce second lost packet fraction information representative of the incoming voice packets to integrated circuit 1511. This second lost packet fraction information is fed via a path 1585 to Packet Encapsulation Unit 1571 which packetizes the second lost packet fraction information into outgoing RTCP packets to update the destination across the network. The destination is suitably improved with an integrated circuit 1511' (not shown) similar to or identical to integrated circuit 1511 of FIG. 15.

From Packet Playout Control Unit 1581, depacketized compressed voice information being received is then supplied in a controlled manner to a speech decoder 1555 portion of speech coder 1541. Silence packets and voice packets, suitably dejittered and compensated by use of diversity packets as improved according to any of various process embodiments herein, then are decoded by speech decoder 1555 and thus played out. The speech thus played out, passes via Gain Control 1521 to PCM interface and from there to a DAC (digital to analog converter) not shown which can be provided either on-chip or off-chip as the skilled worker elects. The PCM output as converted by the DAC thus reconstitutes the voice in an advantageous manner more fully satisfactory and enjoyable to the user, by virtue of the various improvements provided and discussed herein. Further, a DTMF "touch-tone" generator 1591 and Tone Detector 1593 handle the dialing steps for placing a VOP/VoIP telephone call to confer a comprehensive application improved as discussed herein.

Operations of add diversity block 1561 of FIG. 15 are illustrated in FIG. 16. A software implementation is illustrated. In FIG. 16, operations commence at BEGIN 1601 and proceed to a step 1605 to initialize a vector STATE having vector element values s (source rate) and d (diversity rate). The values s and d are initialized with initial values s11 and dl 1 respectively.

Next in FIG. 16, a loop begins at an input step 1611 to input a newly-arriving QoS datum such as a new RTCP report QoS inverse measure such as the packet loss fraction L. If no RTCP packet is present, operations branch to a RETURN 1614. If an RTCP packet is present, then operations proceed to a decision step 1615.

In the decision step 1615, the value L is compared to determine if L exceeds a first threshold, designated Threshold1 or Th1, indicating too much packet loss at the destination. If too much packet loss, then operations proceed from step 1615 to a decision step 1617 to determine whether L also exceeds an even higher level A. If L is less than or equal to A, operations go next to a moderate update step 1621. If L exceeds A, operations go to an aggressive update step 1623.

In step 1621, a vector NEWSTATE is moderately updated in the manner shown in FIG. 1 and intended to improve QoS and likely reduce value L expected subsequently when the destination reports back. NEWSTATE is an intermediate state value holding vector, used intermediately in controlling the values called STATE. NEWSTATE is suitably updated according to any software method selected by the skilled worker, such as by looking up in a table, or executing a CASE statement, or implementing a software state machine, or otherwise. If the source rate can be decreased no further, and the diversity can be increased no further, then step 1621 simply makes NEWSTATE the same as the current state. After step 1621 operations go to step 1651.

In step 1623, vector NEWSTATE is aggressively updated (for example to state (s32,d32)) in the manner shown in FIG. 23 and intended to improve QoS and likely reduce value L expected subsequently when the destination reports back. Here again, NEWSTATE is suitably updated according to any software method selected by the skilled worker, such as by looking up in a table, or executing a CASE statement, or implementing a software state machine, or otherwise. If the source rate can be decreased no further, and the diversity can be increased no further, then step 1623 simply makes NEWSTATE the same as the current state. After step 1623 operations go to step 1651.

Some embodiments have thresholds B, C, etc., such that NEWSTATE is moderately updated if (A≧F>Th1), NEWSTATE is aggressively updated if (B≧F>A>Th1), and NEWSTATE is even more aggressively updated if (F>B>A>Th1).

If in step 1615, L does not exceed Threshold1, operations proceed to a decision step 1627. Step 1627 determines if either the gatekeeper signal GK is on (GK=1) OR a buffer full flag is on (BFR=1). If NO, then operations go directly to step 1625, but if YES, operations go to an update step 1629.

In step 1629, vector NEWSTATE is updated (for example to state (s31,d31)) in the manner shown in FIG. 23 and intended to improve QoS and likely reduce value L expected subsequently when the destination reports back. Here again, NEWSTATE is suitably updated according to any software method selected by the skilled worker, such as by looking up in a table, or executing a CASE statement, or implementing a software state machine, or otherwise. After step 1629, operations go to step 1651.

In decision step 1625, the packet loss fraction value L is compared with a second threshold Threshold2, or Th2. If value L is less than Th2, then QoS has improved or is at a high level already. In such case, operations pass to a step 1631 to update NEWSTATE to increase the source rate. Step 1631 inputs a new estimated steady state overall transmission rate S. As in steps 1621 and 1623, NEWSTATE is suitably updated according to any software method selected by the skilled worker, such as by looking up in a table, or executing a CASE statement, or implementing a software state machine, or otherwise. As indicated in FIG. 1 and FIG. 10, the process need not be simply the reverse of the transitions available in step 1621, and so step 1631 is customized for its own updating purposes. Also, if the source rate can be increased no further, and the diversity can be decreased no further, then step 1631 simply makes NEWSTATE the same as the current state. One embodiment performs aggressive overall transmission rate increase if the ratio R of estimated steady state overall transmission rate S to current overall transmission rate exceeds a threshold Th3 (e.g. 3.0), and performs gradual overall transmission rate increase otherwise. For example, such embodiment uses TCP throughput estimate for new estimated steady state overall transmission rate S. The TCP throughput estimate is suitably that given earlier (5D) as 1.22×packetsize/(round-trip delay×sqrt (average loss measured during lifetime of the connection)).

After step 1631 operations go to a step 1651. If in step 1625, value were greater than or equal to second threshold Th2, then operations go to decision step 1635.

In decision step 1635, the packet loss fraction value L is tested to see if it lies in the range from first threshold Th1 to second threshold Th2 inclusive. If yes, then operations go to a step 1641 wherein intermediate NEWSTATE is filled with the values in the vector STATE. Together with a later step 1651, this operation 1641 maintains the current control state. If the decision in step 1635 is NO (out of range), or when step 1641 is completed, then operations pass to step 1651.

In step 1651 the vector STATE is filled with the values of NEWSTATE. Next in an output step 1661, the values of STATE are output as control signals (sij, dij) to the encoder 321 of FIG. 3 and the encoder 1551 of FIG. 15. Steps 1651 and 1661 thus implement transitions like 101 and 413 (see FIG. 4) and other transitions discussed herein. From step 1661 operations pass to a decision step 1671 whether to STOP. If not, then operations loop back to step 1611 and continue repeatedly as discussed above. If STOP is yes, then operations go to END 1681. STOP may be responsive to disconnection of communications with the particular destination, or to power off or to other conditions of a chip or system as desired.

The herein-incorporated patent U.S. Pat. No. 6,496,477 provides further disclosure about how path diversity packets are added. The emphasis of FIGS. 1,3, 15, 16, 17 and 18 are on the adaptive control features of some process, integrated circuit and system embodiments whereby source rate and diversity are either individually or jointly initiated, increased, decreased and terminated. The said adaptations are performed according to a process embodiment in response to QoS-related data obtained from the network or from a destination monitoring process. The adaptively-determined sij and dij, or controls generated in a relationship to sij and dij in the manner of a function thereof or substantially correlated to them, are then used to start, stop and adjust the operations of the diversity software and hardware disclosed in herein-incorporated U.S. Pat. No. 6,496,477 and the other disclosure herein.

Figure 17:
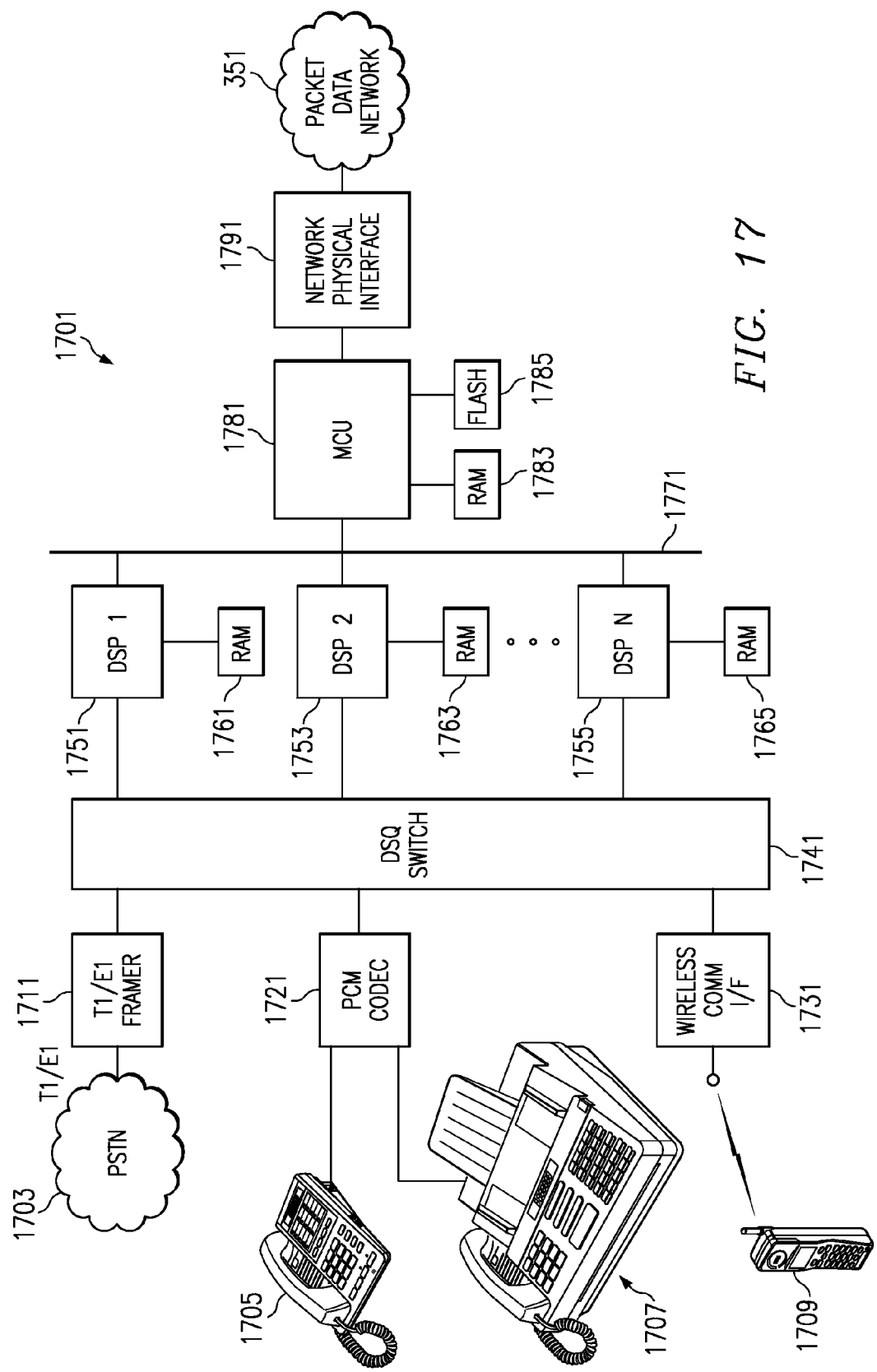
FIG. 17 is partially pictorial, partially block, diagram of integrated circuits and subsystems for gateways, private branch exchange (PBX) units, wireless base stations, and routers in various embodiments.

In FIG. 17, system components are arranged to provide gateway functions and combined with cellular phone basestation functions. A communication system 1701 interfaces to a PSTN (public switched telephone network) 1703, to a telephone 1705 (and PBX private branch exchanged connected to many wired and cordless telephones, not illustrated), to a fax machine 1707 and to cellular telephones 1709. PSTN 1703 is coupled via T1/E1 Framer 1711 to a DSQ Switch 1741. Telephone 1705 and Fax 1707 are coupled via a PCM Codec 1721 to the DSQ Switch 1741. Cellular telephones 1709 are coupled via a wireless communications interface 1731 to the DSQ Switch 1741.

Further in FIG. 17, the DSQ switch 1741 couples the various types of communications to a first port of a bank of one or more DSPs (digital signal processors, such as TI TMS320C6x or TMS320C54x DSPs) 1751, 1753, and so on to the Nth DSP 1755 in the DSP bank. Each DSP suitably has associated memory 1761, 1763, . . . 1765 respectively provided as any suitable mix of volatile and nonvolatile memory selected by the skilled worker. The DSPs are connected via a second port of the bank to a bus 1771 which couples them to a microcontroller 1781 that has its own RAM memory 1783 and flash nonvolatile memory 1785. The microcontroller 1781 communicates via a PHY, or Network Physical Interface 1791, to packet data network 351 of FIG. 3.

In FIG. 17, one, some or all of the DSPs are improved for adaptive rate/diversity operation as described herein. Also, various parts of the improvements described herein are suitably partitioned between the DSPs 1751, 1753, . . . 1755 and the microcontroller (MCU) 1781 and stored on-chip and in the off-chip memories as desired. Various partitioning alternatives are contemplated. Also, the MCU is omitted in another embodiment (not shown) and the various software blocks are partitioned among execution units of one DSP or among multiple DSPs.

Figure 18:
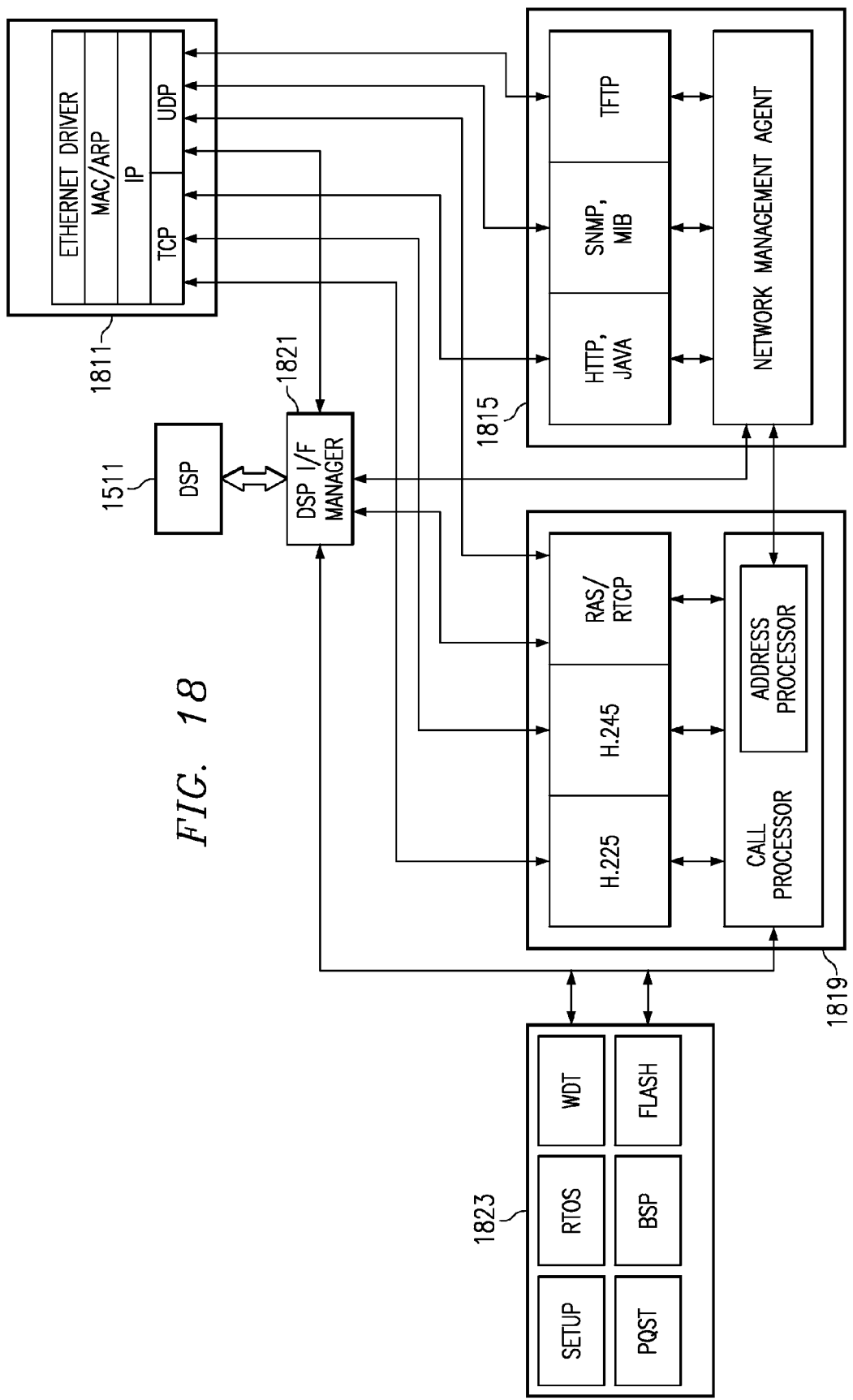
FIG. 18 is a block diagram of an improved software system having the improved integrated circuit device of FIG. 15 as a digital signal processor DSP.

In FIG. 18, the improvements are illustratively partitioned so that the RTCP is associated with MCU 1781 of FIG. 17 and the rate/diversity control block 331 and lost packet compensation block 381 (not shown but unprimed in sender 311 of FIG. 3) are provided in the DSP software complement.

In FIG. 18, MCU 1781 of FIG. 17 is provided with a TCP/UDP/IP stack 1811 which further has MAC/ARP, Ethernet driver and other network interface protocol blocks. Further, network management software 1815 for MCU 1781 has a network management agent controlling and interfacing to a first software block for embedded webserver HTTP (Hypertext Transfer Protocol) and Java applications, a second software block for SNMP protocol, Voice MIBs, and Protocol MIBs, and a third software block for TFTP software download. Still further, telephone signaling gateway software for MCU 1781 has call processing software, address translation and parsing software, and H.323 protocols including H.225 signaling, H.245 software, and RAS/RTCP software. The RTCP function in block 1819 is coupled to the UDP function in TCP/UDP/IP stack 1811 and also coupled to the Packet Encapsulation unit in DSP 1511.

A DSP interface manager software block 1821 is coupled to software blocks 1811, 1815, 1819 and 1823 and communicates with DSP 1511 and the software blocks described in connection therewith.

MCU 1781 runs system software 1823 including RTOS (real time operating system such as Microsoft Windows CE or Symbian EPOC, as well as DSP BIOS™ RTOS from Texas Instruments Inc.) System software 1823 includes WDT driver software, flash memory manager, BSP software, development and self-test (IPQST) software, and software installation code.

DSP 1511 has software in FIG. 18 improved as described in FIG. 15 for adaptive rate/diversity in both the send and receive functions.

Figure 19:
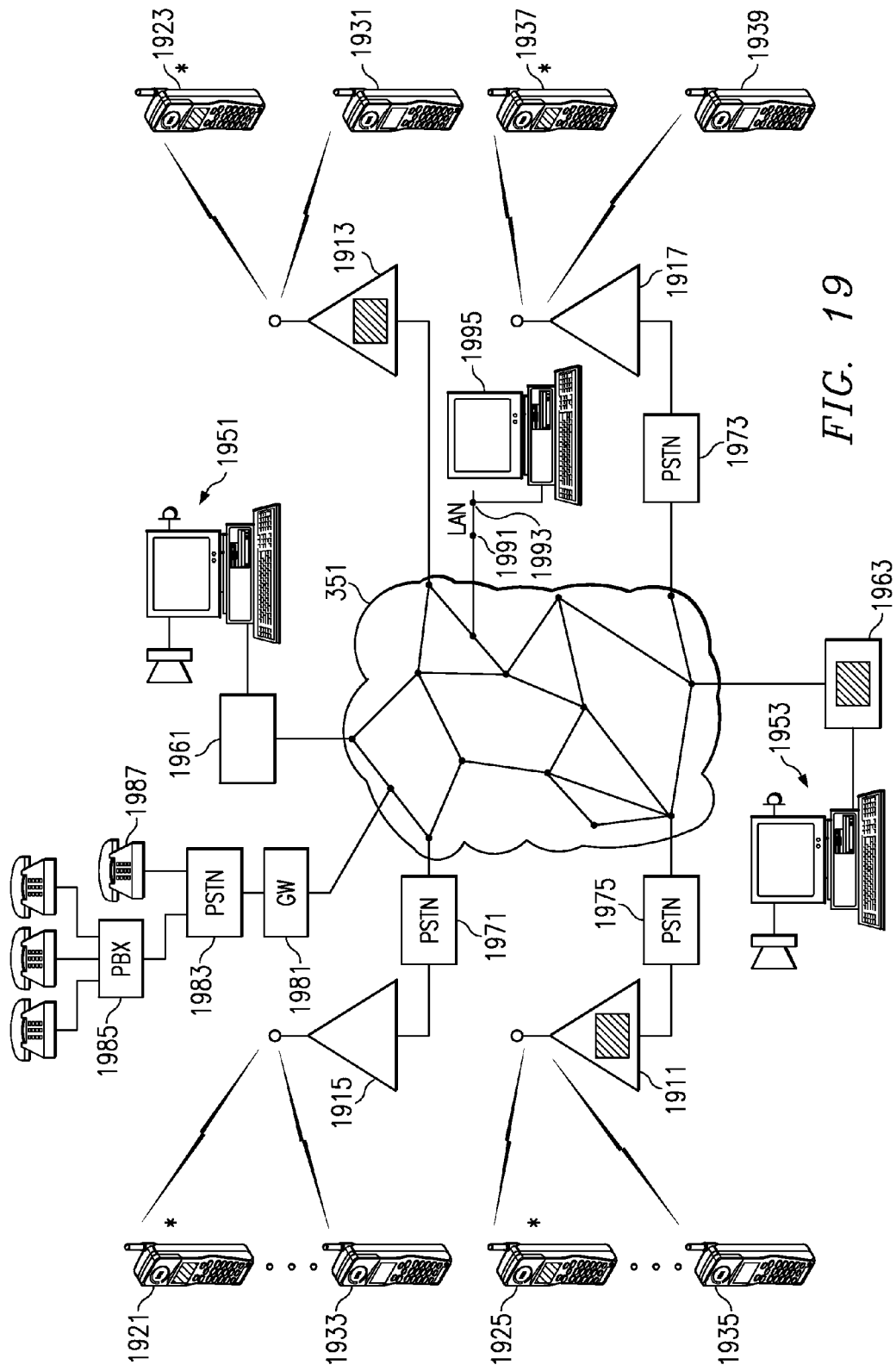
FIG. 19 is a partially pictorial, partially block, network diagram with edge devices improved as described herein, for analysis of different paths having different selections of improved and unimproved devices at different sites along each of the different paths.

In other embodiments, as shown in FIG. 19, network 351 has cellular phone base stations 1911, 1913, 1915, 1917. Cell phone base stations 1911, 1913, 1915, 1917 are improved to be multimodal, receiving user-selected packet voice or non-packet wireless voice from cell phones 1921, 1923, 1925, 1931, 1933, 1935, 1937, 1939. Wireless two-way communications are established between pairs of units listed as ordered pairs (cell-phone, base station): (1921, 1915), (1933, 1915), (1925, 1911), (1935, 1911), (1923, 1913), (1931, 1913), (1937, 1917), (1939, 1917).

Some of the cell-phones 1921, 1923, 1925, and 1937 have a shaded rectangle, indicating for purposes herein improvements for adaptive rate/diversity as disclosed herein in their packet voice communications mode, for example as shown in any one or more of FIGS. 1, 3, 15-18. Other illustrated cell-phones 1931, 1933, 1935, 1939 lack the improvements for adaptive rate/diversity as disclosed herein in their packet voice communications mode, and have no corresponding shaded rectangle in FIG. 19.

Some of the cell phone base stations 1911, 1913 have a shaded rectangle, indicating for purposes herein improvements for adaptive rate/diversity as disclosed herein in their packet voice communications mode, for example as shown in any one or more of FIGS. 1, 3, 15-18. Other illustrated base stations 1915, 1917 lack the improvements for adaptive rate/diversity as disclosed herein in their packet voice communications mode, and has no corresponding shaded rectangle in FIG. 19. Even when no adaptive source rate/diversity control feature is provided, as in the base stations 1915 and 1917, they do support both the mobile Internet Protocol phones (IP-phones) wherein IP-packetization suitably occurs at the mobile IP-phone, as well as support conventional wireless mobile phones.

Personal computer (PC) telephony units 1951 and 1953 have respective microphones and speakers, and these units 1951 and 1953 have modems of any suitable type, such as voice-band V.90, DSL (digital subscriber line), cable modem, wireless modem, among other choices. Personal computer (PC) telephony units 1951 and 1953 are respectively coupled to the network 351 via gateways 1961 and 1963 respectively. The gateways are suitably located in a private branch exchange or in a telephone central office, or in the office of an ISP (Internet Service Provider) or in the office of a private commercial network, for example. IP-packetization occurs at the PC telephony units 1951 and 1953. The adaptation is end-to-end such as when phone at source has the rate/diversity control block and the phone at destination has a block to send QoS data back as well as to couple diverse packet information to the decoder for improved QoS.

For placing phone calls over the Internet, user voice goes in through microphone, then is processed in the computer by the main microprocessor, microcontroller, and DSP for vocoding and rate/diversity adaptation as in FIG. 3. Even if the access of the PC telephony unit is connected via voice-band modem to telephone central office and then to Internet service provider, the rate/diversity adaptation software is suitably provided in the PC telephony unit or wherever the rate/diversity adaptation software is suitably installed to adaptively produce diversity packets or dependent packets and/or to control the state of a voice encoder or audio compressor or image compressor or other media coder.

Adaptive rate/diversity improvements in an integrated circuit, software and system are suitably provided in an Internet mobile terminal such as an Internet appliance or mobile phone, cell phone or cordless phone with Internet or other packet network capability.

Cell phone base stations 1915, 1917 and 1911 are respectively coupled to IP packet network 351 via PSTN blocks 1971, 1973 and 1975 respectively. Each of the PSTN blocks 1971 and 1973 has a gateway therein to connect the call to the packet network 351. The gateways in PSTN blocks 1971 and 1973 suitably have adaptive rate/diversity embodiments included therein. Thus, rate/diversity adaptation modules suitably are sited in the gateways and base stations of the system of FIG. 19. For example, base stations 1911 and 1913 are directly connected to packet network 351 by their own adaptive rate/diversity packet interface software and software stacks, all as taught herein in the present patent application and the incorporated U.S. Pat. No. 6,496,477.

A gateway GW 1981 couples network 351 to PSTN 1983 to which telephones (not shown) are coupled via a PBX 1985. Also, one or more individual telephones 1987 are directly connected to PSTN 1981. Further in FIG. 19, a LAN has nodes 1991 and 1993 coupled to network 351. A computer 1995 is connected to node 1993.

Integrated circuits into which the adaptive rate/diversity improvements are suitably manufactured include DSP (digital signal processor) from Texas Instruments and other companies offering DSP integrated circuits. Other integrated circuits suitable for the adaptive rate/diversity improvements include host microprocessor such as Intel's Pentium®, Pentium II®, Pentium III®, Celeron®, Xeon® and IA-64 microprocessors, AMD K6 and K7 microprocessors, National MediaGX and other microprocessors, and microcontrollers such as ARM and StrongARM series, MIPS series, Intel i960, Motorola Mcore and PowerPC integrated circuits, among many others. Still other integrated circuits which are contemplated for adaptive rate/diversity improvements include non-volatile memories such as ROM, EPROM, EEPROM, Flash memory, EAROM, and FeRAM (Ferroelectric random access memory). Volatile memories such as DRAM, synchronous DRAM (SDRAM), R-DRAM (Rambus DRAM), DDR-DRAM, and other variants suitably also have a logic section or non-volatile section incorporating the adaptive rate/diversity improvements built into them as taught herein. In yet other embodiments, the adaptive rate/diversity improvements are loaded onto or manufactured into rigid disk drives, hard disk drives, and also various media such as floppy insertable disks, CD-ROM optical storage media, and/or chips in the read circuitry or other circuitry of drives for such storage media. Also, chipsets associated with processors suitably are in improvement embodiments made to have adaptive rate/diversity improvements manufactured into them, such as the Intel "440xx" series of chipsets, sometimes known as North Bridge and South Bridge chips, and the chipsets of other chipset manufacturers. (Chipsets of this type are also suitably improved with digital signal processors, as taught in any one or more of the patents U.S. Pat. Nos. 5,987,590 and 6,179,489 which are hereby incorporated by reference. The DSP suitably runs the adaptive rate/diversity improvements. In other versions, the adaptive software runs on the host microprocessor such as Pentium series or IA-64 series, or partitioned with part of the software on a DSP coupled to the host microprocessor(s) in the computer system.

Also, the rate/diversity adaptation can be provided at the telephone central office gateway. Also, rate/diversity adaptation can be put in a router in a packet network to improve it there.

Even more advantageously, when the adaptation is end-to-end and the units at both ends have at least the adaptation software, the mobile phone or desktop or notebook PC telephony unit adapts for advantageously satisfactory QoS.

As discussed further, an improved cell-phone base station (and also a gateway improved similarly) runs multiple packet voice modules with an inventive embodiment for each mobile telephone using the base station at a given time.

Some improvement embodiments are intended for gateways, wherein a improved gateway embodiment runs multiple packet voice modules with an inventive process, chip and system embodiment working in the gateway itself to adaptively control source rate and diversity rate for advantageous QoS for each telephone using the gateway at a given time.

In other embodiments, a base station itself is not only improved to be multimodal, supporting both the mobile Internet Protocol phones (IP-phones) and conventional mobile phones. But also, the improved base station embodiment runs multiple packet voice modules with an inventive process, chip and system embodiment working in the base station itself to adaptively control source rate and diversity rate for advantageous QoS for each cell-telephone communicating speech in non-packet form to the base station at a given time. Then the base station itself and not necessarily the cell-phone codes or recodes the speech and packetizes it with an inventive process, chip and system embodiment working to adaptively control source rate and diversity rate for advantageous QoS over a packet network to which the base-station is in turn connected.

Numerous combination embodiments and paths of advantageous operation are conveniently identified in FIG. 19 using sequences apparatus numerals to name them. For example, a communication path 1921-1915-1961-1951 has the improved adaptive VOP in the terminal handset or PC IP phones but not in the base station or gateway. Path 1935-1911-1913-1931 has improved VOP in the base stations but not in the terminal handsets. Robustly, still other paths and embodiments like 1925-1911-1913-1923 have improved adaptive VOP both in the terminal handset and in the base stations. Here the adaptive VOP blocks work together or one defers to another as the skilled worker suitably elects to implement. The adaptive VOP blocks are advantageously upwardly compatible, so that an improved elements 1921, 1911, 1951, or 1963 for some examples, can talk to unimproved elements such as 1933, 1917, 1961 or 1939 and vice versa. Still other combinations and paths are present in FIG. 19 and important to peruse, but for conciseness do not appear to need tedious further explanation.

FIG. 20 shows a RTCP packet as discussed earlier hereinabove.

FIG. 21 shows QoS processing timing as discussed earlier hereinabove.

FIG. 22 shows a state transition diagram of a state diagram for hereinabove-described Type 5CB QoS level measure computations and Adaptation Logics.

In FIG. 23, a state diagram for rate/diversity adaptation process and apparatus has example states (sij, dij) as already discussed in FIG. 1. In FIG. 23, however, the state transitions operate differently. When operations are in state (s11,d11), e.g. (16.0, 0.0) and criterion F not only exceeds Threshold1 but also aggressive trigger level A, then a transition 2211 goes from (s11,d11) to state (s32,d32), e.g., (5.7,2.3) kbps of source rate and diversity rate respectively. Another transition 2215 is discussed later hereinbelow. After transition 2211, operations remain at state (s32,d32) unless and until criterion F becomes ameliorated and falls below Threshold2, whereupon a state transition 2221 to state (s22,d22) e.g., (8.0,3.2). By transition 2221, source rate is increased, and diversity rate is also increased, and their sum (overall transmission rate) is increased. Operations remain at state (s22,d22) unless criterion F continues to be below Threshold2, or in case criterion F rises and later falls below Threshold2. Thereupon a state transition 2223 transfers the system to state (s12,d12) e.g., (11.2,4.8). By transition 2223, source rate is increased, and diversity rate is also increased, and their sum (overall transmission rate) is increased. Operations remain at state (s12, d12) unless criterion F continues to be below Threshold2, or in case criterion F rises and later falls below Threshold2. Thereupon a state transition 2225 transfers the system to state (s11,d11) e.g., (16.0,0.0). By transition 2225, source rate is increased, but diversity rate is decreased to zero, and their sum (overall transmission rate) is maintained unchanged at 16.0 kbps. Transition 2225 thus increases source rate and turns off the diversity feature. This turnoff is suitably accomplished in some embodiments by terminating the path diversity connection, and suitably accomplished in other embodiments by holding the path diversity connection open for instant use in case another transition 2211 is needed, but not transmitting any voice packets over it. Engineering economics and delay in disconnection and connection operations are suitably considered in selecting the type of embodiment to use there.

When operations are in state (s11,d11), e.g. (16.0, 0.0) and either a gatekeeper request GK=1 or Buffer Occupancy BFR=1 occurs, then adaptive source rate measures are employed without diversity measures, in this example. In such case, a transition 2215 goes from (s11,d11) to state (s31,d31), e.g., (8.0,0.0) kbps of source rate and no diversity rate. After transition 2215, operations remain at state (s31, d31) unless and until both the gatekeeper request is turned off and the Buffer Occupancy condition is not present, i.e. GK=0 AND BFR=0. At that point, state transition 2231 takes the system from state (s31,d31) to state (s21,d21) e.g., (11.2,0.0). By transition 2231, source rate is increased, and diversity remains off. Operations at state (s21,d21) poll the gatekeeper and buffer for updated status information. Then operations remain at state (s21,d21) unless the GK and BFR remain off, or in case GK or BFR go on again and later become both off, i.e. GK=0 AND BFR=0. Thereupon a state transition 2233 transfers the system to state (s11,d11) e.g., (16.0,0.0). By transition 2233, source rate is increased, and diversity rate remains disabled or at zero, and their sum (overall transmission rate) is increased. Operations remain at state (s11,d11) unless criterion F causes aggressive transition 2211 of FIG. 23 or moderate transition 101 of FIG. 1 or unless GK or BFR go on again to cause transition 2215 of FIG. 23.

The processes and systems of FIGS. 1 and 23 importantly introduce new criteria for transition, as in steps 101 combined with 2211 for instance, and combine the new criteria for transition with discrete states (sij,dij). Advantageously, the use of discrete states with these new criteria reduces the incidence of false alarms and oscillations.

Note that the state transition diagrams of FIGS. 1, 22 and 23 compactly show advantageous features of some embodiments. Further note that the flowcharts of FIGS. 16, 24, 25 and 26 show some of the same things as the state transition diagrams and also further advantageous features of processes, devices and systems as taught herein.

Figure 24:
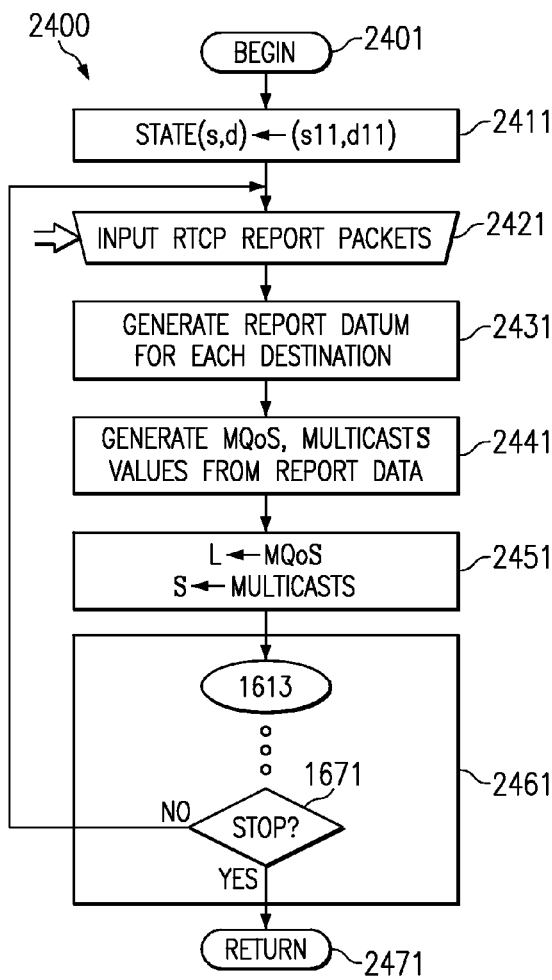
FIG. 24 is a flow diagram of a process embodiment of rate/diversity adaptation for multicasting, conferencing or other multiple destination services which uses part of the process of FIG. 16.

FIG. 24 shows a process for implementation in software media, integrated circuits, printed circuit cards, personal computers, networked appliances and other network edge-device computers, cell phone base stations, servers, routers, gateways and other apparatus. This process supports conferencing and multicasting.

The adaptive rate/diversity improvements are suitably implemented in conferencing, broadcast, unicast, and multicast devices and processes since UDP universal datagram protocol, RTP real-time transport protocol and RTCP and other protocols now available or yet to be devised are useful for supporting these services.

Broadcast with path diversity is described in connection with incorporated patent U.S. Pat. No. 6,496,477 FIG. 11. Conventional broadcast replicates the process of a single unicast connection from source to destination so that communication of a media stream is directed to many destinations. Improving upon conventional broadcast, adaptive rate/diversity processes as taught herein are replicated so that the media stream takes diverse packets to each of many destinations, and adaptive control of rate and time or path or combined time/path diversity as taught herein is applied to the communications each by each.

Multicast with path diversity is described in connection with incorporated patent U.S. Pat. No. 6,496,477 FIG. 12. Conventional multicasting fans out a media stream from a source farther out in the packet network so that communication of a media stream is directed to many destinations. Improving upon conventional multicast, adaptive rate/diversity process as taught herein is applied to the communications. The situation differs from adaptive rate/diversity control of improved broadcasting as described in the previous paragraph because rate/diversity adaptation of a given media stream at the source 1111 of U.S. Pat. No. 6,496,477 FIG. 12 affects plural destinations. When the plural destinations are experiencing different levels of QoS as reported in their RTCP packets sent back to source 1111, then the rate/diversity adaptation thus can be faced with conflicting QoS information to reconcile in making an adaptation transition such as 101 of FIG. 1.

Before proceeding further, note an example process context in FIG. 24. Operations commence at a BEGIN 2401 and proceed to establish an initial state (s11,d11) in a step 2411. Next a step 2421 inputs RTCP report packets, but now from multiple destinations. A step 2431 generates information called herein a "report datum" for each destination, in some embodiments. Next a step 2441 generates a value from the "report data" collectively. This special value is called MQoS, motivated by but not limited to a concept of a Multicast QoS. Then the special MQoS value is used in place of Loss Fraction L in a step 2451 to drive the adaptive rate/diversity process steps at the sender which are collectively called process 2461. Process 2461 includes the steps 1613 through 1671 of FIG. 16 used in the particular part of FIG. 24 identified by numeral 2461. The process 2461 selectively and adaptively updates the NEWSTATE when appropriate and operations loops back to step 2421 to input more RTCP report packets as the process goes forward in time. When process 2400 is to be turned off, operations go from STOP decision step 1671 to RETURN 2471.

The operations of steps 2441 and 2431 are next described in considerable detail. Note that there are many alternative ways of doing each of them, and an outline format is used to facilitate the detailed description.

Accordingly, several embodiments of adaptive rate/diversity control of improved multicasting are contemplated. As noted hereinabove, rate/diversity adaptation of a given media stream at the source 1111 of U.S. Pat. No. 6,496,477 FIG. 12 affects plural destinations. QoS reports come back to source 1111 from the various destinations for each portion in a series of portions comprising the transmission from source 1111. The QoS reports from the various destinations for a given portion of the transmission are combined into one or more herein-defined "Multicast QoS" evaluation numbers in FIG. 24 step 2441 to drive the rate/diversity adaptation processes. Multicast QoS (MQoS) is variously defined for different process and device embodiments next. (The value of S, meaning estimated steady state overall transmission rate as in step 1631, is also chosen in a similar manner to compute what is herein called "Multicast S". In other words, use the information from each destination to compute an S value for that destination. Then, in a manner precisely analogous to any selected one of the MQoS calculations below, compute the Multicast S from the S values).

A. In a first method, the QoS reports from the various destinations for a given portion of the transmission are combined into a single herein-defined "Multicast QoS" evaluation number in step 2441 to drive the rate/diversity adaptation processes. In other words, Multicast QoS (MQoS) is defined for each corresponding transmission portion such as activity in a 5-second interval described by an RTCP report packet. The step 2431 of FIG. 24 simply uses the Loss Fraction datum in one RTCP report packet as a report datum (or computes criterion F from data like Loss Fraction and Delay Jitter in one RTCP report packet) or computes criterion F using QoS computation methods described with reference to FIGS. 1 and 23 for instance.

A1. The MQoS in step 2441 depends on what happens to fewer than all of the destinations A1a. The MQoS depends on what happens to a majority of the destinations. Example:

For the 37th RTCP packet, QoS values came back from 150 out of 155 destinations. The A1a embodiment is programmed to find the value of a statistic based on the QoS values from the best-QoS reporting X % of the 155 destinations, e.g., (say 90% of them), the best 140 (=155×0.90) out of the 150 QoS values.

| | |
|---|---|
| MQoS=average of the best reporting X % | A1ai. |
| MQoS=minimum of the best reporting X % | A1aii. |
| MQoS=median of the best reporting X % | A1aiii. |
| MQoS=average of the worst reporting Y % | A1aiv. |
| MQoS=minimum of the worst reporting Y % | A1av. |
| MQoS=median of the worst reporting Y % | A1avi. |
| MQoS=maximum of the worst reporting Y %. | A1avii. |

A1b. The MQoS depends on what happens to selected ones of the destinations. Example: For the 23rd RTCP packet, QoS values came back from 205 out of 324 destinations. The A1b embodiment is programmed to find the value of a statistic based on the QoS values disregarding the best-QoS reporting X % of the 324 destinations and disregarding the worst-QoS reporting Y % of the 324 destinations. MQoS=average of 20 percentile to 90 percentile loss fraction RTCP reports.

A1c. The MQoS depends on randomly selected ones of the destinations. Example: For the 147th RTCP packet, QoS values came back from 2000 out of 3000 destinations. The A1b embodiment is programmed to find the value of a statistic based on a random sample of N=100 of the 2000 QoS values. Then the processes apply a statistical computation according to any of the following alternatives:

| | |
|---|---|
| MQoS=average of the N selected QoS values | A1ci. |
| MQoS=minimum of the N selected QoS values | A1cii. |
| MQoS=median of the N selected QoS values | A1ciii. |
| MQoS=average of the selected QoS values, but leaving out their top X % and bottom Y %. | A1civ. |

A2. A rate/diversity adaptation decision step depends on a MQoS statistic based on all the destinations' reports of QoS received back for the given transmission portion.

A2a. The statistic is the median QoS. Example: For the $7^{th}$ RTCP packet, QoS values came back from 150 destinations out of 180 destinations. The loss fraction values varied from 0.2% to 12%, mostly around 3%. 2.8% loss fraction was the median value. MQoS=2.8%.

A2b. The statistic is the QoS of the destination at the nth percentile of QoS. Example: For the $17^{th}$ RTCP packet, QoS values came back from 138 destinations out of 180 destinations. The embodiment is programmed to find the $30^{th}$ percentile as indicated by listing the reports in loss fraction order. Example: The loss fraction values varied from 0.2% to 12%, mostly around 3%. The $30^{th}$ percentile value was 6.2%. MQoS=6.2%.

A2c. The statistic is the average QoS. Example: For the $24^{th}$ RTCP packet, QoS values came back from 155 destinations. The embodiment is programmed to find the arithmetic mean or average QoS. Example: The loss fraction values varied from 0.2% to 12%, mostly around 3%. The arithmetic mean was 3.3%. MQoS=3.3%.

A2d. The statistic is the minimum QoS of any destination. Example: For the 33rd RTCP packet, QoS values came back from 125 destinations. The loss fraction values varied from 0.2% to 12.2%, mostly around 3%. The minimum QoS was 12.2% loss fraction. MQoS=12.2%.

In a second process type, the QoS reports from the various destinations for two or more portions of the transmission are combined into a single herein-defined "Multicast QoS" evaluation number to drive the rate/diversity adaptation processes. Two or more RTCP packets from the same destination are used to generate each report datum by averaging, median, minimum or other statistic, and step 2431 becomes more detailed. If only one RTCP packet from a given destination comes back when a most destinations are reporting back three for the given process, then the report datum is the value of that RTCP packet. The report data thus derived destination by destination are used according to any of the A-numbered processes to generate MQoS by step 2441 of FIG. 24, according to a correspondingly B-numbered embodiment.

Example Embodiment B2a: The statistic is the median QoS. Example: For the $7^{th}$ through 12th RTCP packets, QoS values came back from 150 destinations. Each set of six RTCP packet Loss Fraction values for a given destination was averaged to produce a report datum for that destination. The report data varied from 0.5% to 7%, mostly around 3%. 2.9% loss fraction was the median value. MQoS=2.9%.

A tedious description of other B-type embodiments is suitably generated by following the directions of the previous paragraph, which is believed to amply disclose the subject matter of numerous B-type embodiments.

Other QoS level measures and adaptation logics are suitably combined with the teachings and figures shown herein.

Figure 25:
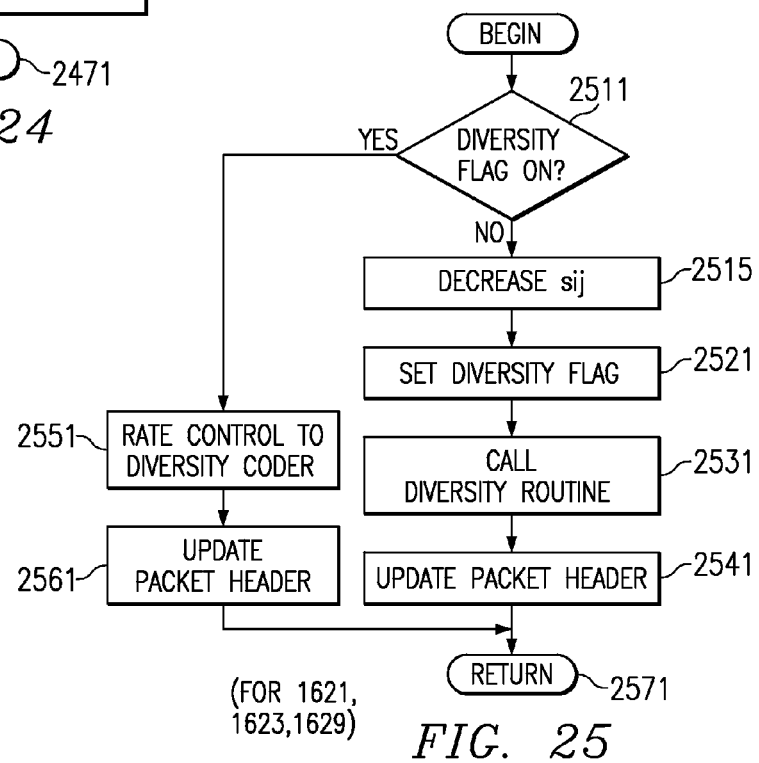
FIG. 25 is a flow diagram of further substeps detailing each of steps 1621, 1623 and 1629 of FIG. 16.

FIG. 25 illustrates software to implement each of steps 1621, 1623 and 1629 of FIG. 16. In FIG. 25, after a BEGIN, operations go to a step 2511 to determine whether a diversity flag is on. If not, then source rate sij is decreased in a step 2515. Next after step 2515, a step 2521 sets, or turns on, the diversity flag. Then a step 2531 calls a diversity routine to create diversity packets. Then a step 2541 updates packet header diversity fields and dependency information appropriately. Those features of the packet are described in U.S. Pat. No. 6,496,477 for path diversity. Then a RETURN 2571 is reached.

If in step 2511 the diversity flag is already on, then operations branch to a step 2551 to vary the source rate and diversity aspects of the coder. Then in step 2561, the packet header is updated in the dependency information and diversity fields to correspond to the changes made by step 2551, whereupon RETURN 2571 is reached.

Figure 26:
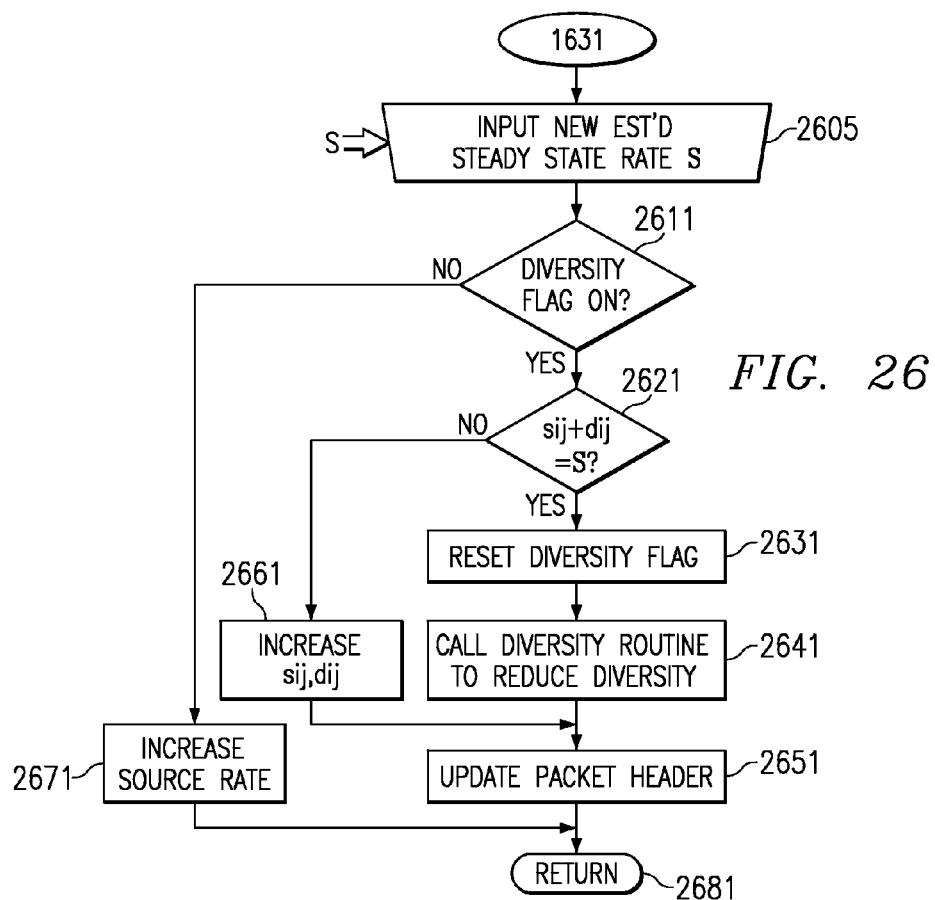
FIG. 26 is a flow diagram of further substeps detailing step 1631 of FIG. 16.

In FIG. 26, step 1631 of FIG. 16 commences and goes to an input step 2605. In step 2605, information specifying a steady state overall transmission rate S is either estimated locally or input from a network element. Next, operations go to a decision step 2611 to determine whether the diversity flag is on. If so, operations go to a decision step 2621 to determine whether the overall transmission rate sij+dij is equal to estimated steady state overall transmission rate S from step 2605, e.g., 11.2. If an estimated steady state overall transmission rate S value is not available, then a maximum amount (e.g., 16.0) is used for S by default. If so, then operations turn off (reset) the diversity flag in a step 2631. Next a step 2641 calls the diversity routine to reduce diversity. Then a step 2651 updates packet header diversity fields and dependency information appropriately. Those features of the packet are described in U.S. Pat. No. 6,496,477 for path diversity, and the path diversity routine is described in FIG. 18 therein. Then a RETURN 2681 is reached.

If in step 2621, the overall transmission rate is below value S, then operations branch to a step 2661 to change both the source rate and diversity (and suitably the path diversity method of the Packet Transmission Table of U.S. Pat. No. 6,496,477 and other diversity methods) without closing down the diversity feature. Then operations go to step 2651 to update packet header as described above.

If in step 2611, the diversity flag is off, then operations branch to a step 2671 to increase the source rate only, whereupon RETURN 2681 is ultimately reached.

Figure 27:
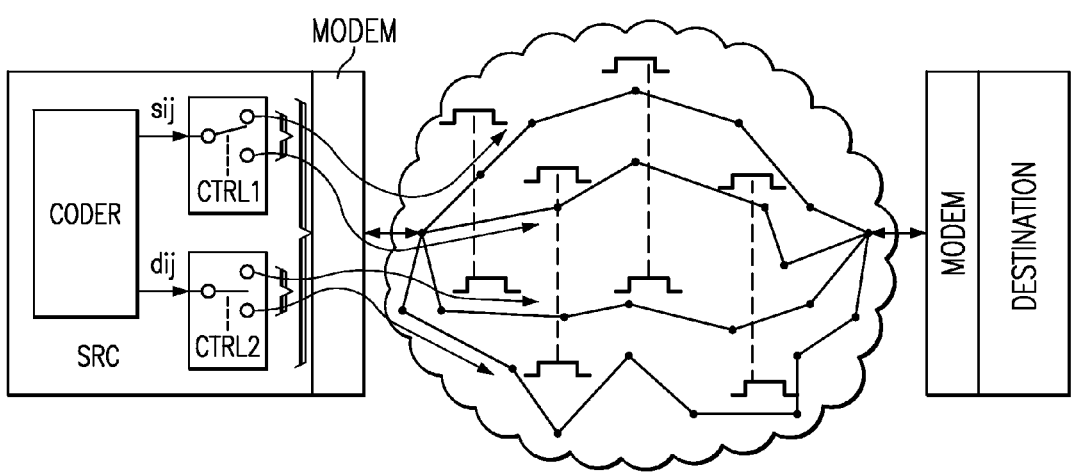
FIG. 27 is a block diagram of an embodiment combining adaptive multipath routing with adaptive rate/diversity processes, in integrated circuits, devices, computers, systems and networks.

FIG. 27 shows how adaptive multipath routing is combined with adaptive rate/diversity to form a new combination process for integrated circuits, and systems of all kinds. In one embodiment, diverse paths via three particular proxies are identified as described in incorporated U.S. Pat. No. 6,496, 477, FIGS. 18-25. A first path via the first proxy is maintained throughout a communications connection. A second path is established via the second proxy, but when packet loss becomes unacceptable the second path is reestablished via the third proxy. In another more complex embodiment of FIG. 27, the multipath routing process seeks a satisfactory path and may switch adaptively from one path to another. Concurrently, the multipath routing process has its source rate adaptively varied. Also concurrently, the multipath routing process has one or more additional adaptive multipath routing process "siblings" seeking a respective second satisfactory path for diversity packets and switching adaptively from one second path to another. Advantageously, a path diversity receiving process implemented in the destination operates as shown and described in connection with FIGS. 5, 17 and 26 of incorporated patent U.S. Pat. No. 6,496,477 and/or as elsewhere described therein. In this way, complex and hard-to-solve network congestion problems are addressed by improved embodiments as illustrated by FIG. 27.

Figure 28:
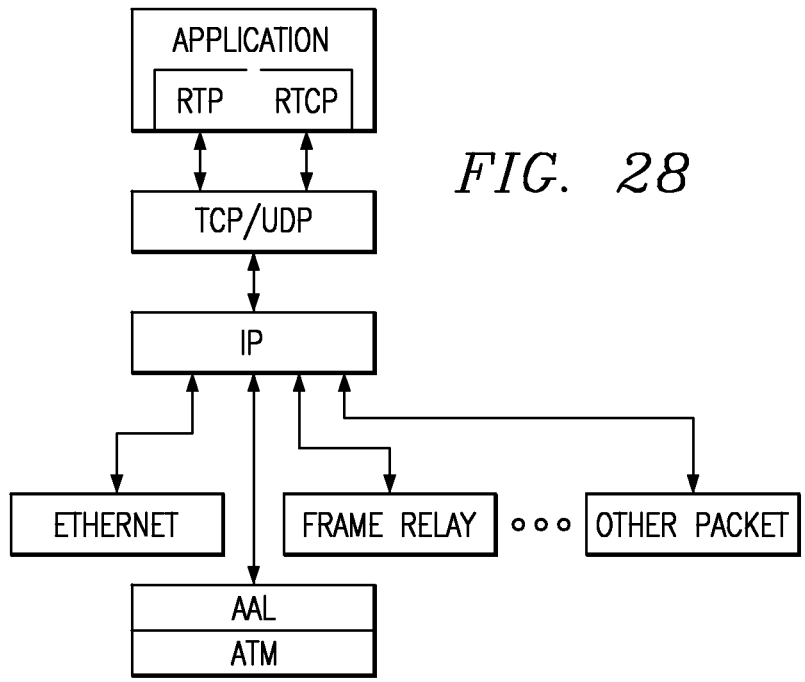
FIG. 28 is a block diagram of software for implementing a networking protocol stack useful with the software and system of FIG. 18.

FIG. 28 supplements the software blocks of FIG. 18 by adding ATM (asynchronous transfer mode), AAL (ATM Adaptation Layer) and Frame Relay Software coupled to the IP block in a TCP/UDP/IP software stack.

Figure 29:
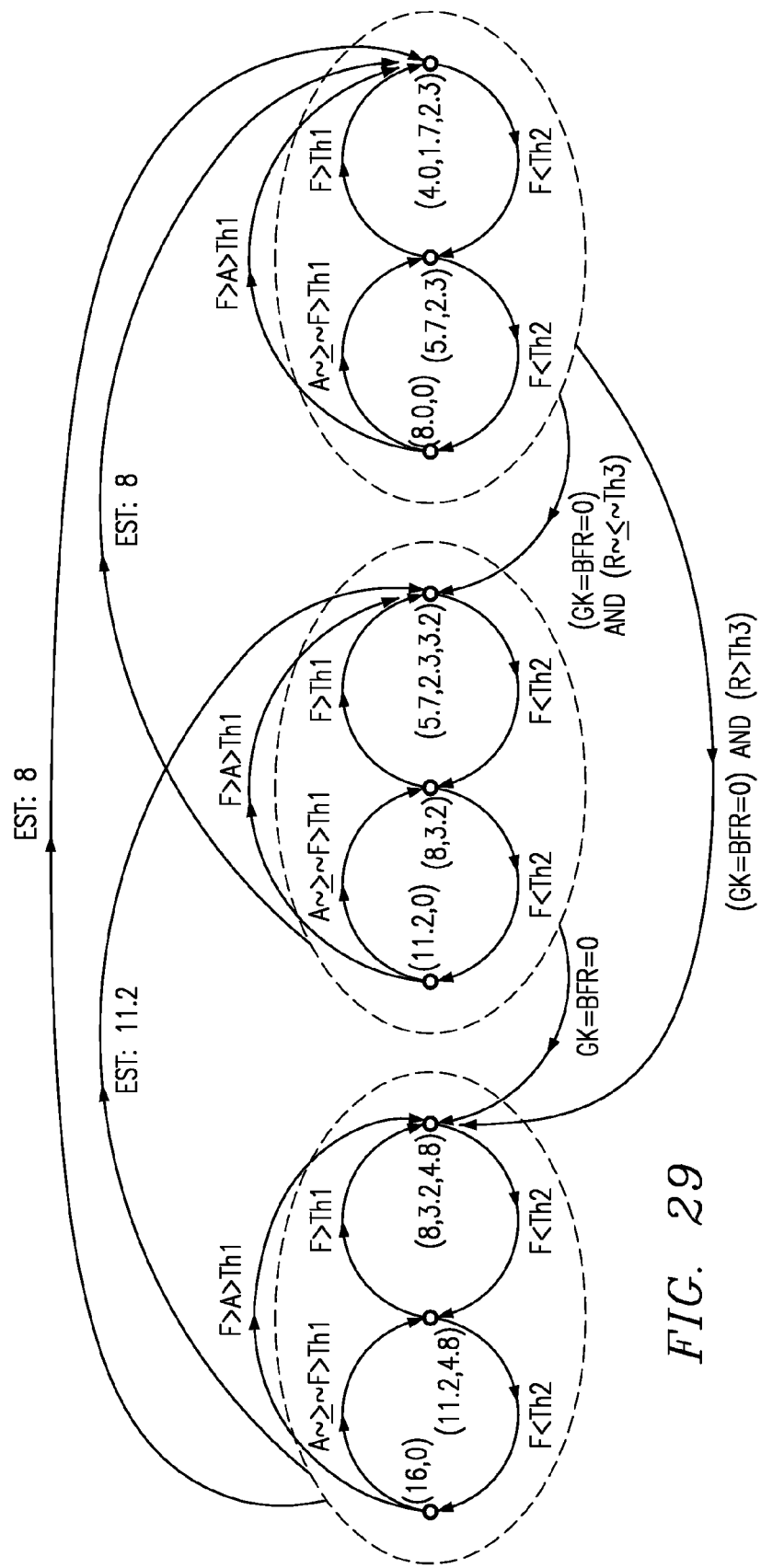
FIG. 29 is a state transition diagram for a process embodiment of adaptive control of combinations called states, of source rate and first and second diversity rates in a media over packet computer.

In FIG. 29, a local software application of rate/diversity control switches between states within the same oval (same overall transmission rate). Thus, diversity allocation is done by the DSP software application.

FIG. 29 also illustrates the concept that not just two, but three or even more states per rate oval are suitably introduced. One state per oval has source rate only, with no diversity. Another state per oval has packets with a source rate and a diversity packet with its diversity rate. A third state per oval has packets with a source rate, plus two diversity packets with respective diversity rates. Various examples of a third state are shown in FIG. 6, diversity packets 621, 631 and 641. Furthermore, path diversity alternatives are illustrated in the incorporated patent U.S. Pat. No. 6,496,477 such as in the Packet Transmission Table therein.

In a complementary way, the network advantageously controls overall transmission rate, so that transitions between ovals in FIG. 29 are under network control, such as by a gatekeeper.

In FIG. 29, operations suitably begin at state (16,0) at left. An estimation EST of network congestion is computed by network or by sender or by receiver to determine whether to make a high priority source rate adjustment. If operations are in any of the state of the 16 kbps oval and EST=8, then a transition goes from the originating 16 kbps state to state (4.0,1.7,2.3) on far right. If EST is neither of 11.2 or 8 then no EST driven transition is executed. If EST=11.2 as signaled by the network (or alternatively estimated by sender or receiver), then a transition goes from the originating 16 kbps state to state (5.7,2.3,3.2).

If at any 11.2 kbps state estimation EST=8, then a transition goes from the originating 11.2 kbps state to state (4.0,1.7,2.3). If GK=0 AND BFR=0 is signaled by the network, then a transition goes from any originating 8 kbps state back to state (5.7,2.3,3.2) provided that a ratio R is also less than or equal to a threshold Th3. For example, R is the ratio of estimated steady state overall transmission rate divided by current overall transmission rate. Th3 suitably lies in a range of 1.5 to 4.0, and a value of 3.0 is suitable. Estimated steady state overall transmission rate S is that rate which the network signals is now available or which test algorithms at sender or receiver indicate is now available. Rate S is suitably computed as in the discussion of FIG. 16 step 1631.

If at any 11.2 kbps state, GK=0 AND BFR=0 is signaled by the network, then a transition goes from the originating 11.2 kbps state to state (8,3.2,4.8). If at any 8 kbps state, network conditions indicate greatly lessened congestion, then an aggressive recovery to state (8,3.2,4.8) is desirable. In FIG. 29, criterion (R>Th3) AND (GK=BFR=0) triggers a transition from any originating 8 kbps state to state (8,3.2,4.8) when the criterion is met.

Within a given oval, DSP software determines from QoS reports whether to make transitions to add diversity, relax diversity, or release diversity. Starting at state (16,0), a determination that A≧F>Th1 adds diversity and takes operations to a state (11.2,4.8). However, starting at state (16,0), if F>A>Th1, then operations adds two stages of diversity and goes to a state (8.0, 3.2,4.8). Starting at state (11.2,4.8), a determination that F>Th1 adds further diversity and takes operations to state (8.0,3.2,4.8). If QoS becomes ameliorated, such that F<Th2, then operations are transitioned from state (8.0, 3.2,4.8) to state (11.2,4.8) and/or from state (11.2,4.8) to state (16,0) as shown.

Starting at state (11.2,0), a determination that A≧F>Th1 adds diversity and takes operations to a state (8.0,3.2). However, if F>A>Th1, then starting at (11.2,0) operations become more aggressive and add two stages of diversity and go to a state (5.7,2.3,3.2). If F>Th1 continues (unacceptable QoS) at state (8.0,3.2), then operations add diversity and go from state (8.0,3.2) to the state (5.7,2.3,3.2). If QoS becomes ameliorated, such that F<Th2, then operations are transitioned from state (5.7, 2.3,3.2) to state (8.0,3.2) and/or from state (8.0,3.2) to state (11.2,0) as shown.

Starting at state (8.0,0), a determination that A≧F>Th1 adds diversity and takes operations to a state (5.7,2.3). However, if F>A>Th1, then starting at (8.0,0), operations become more aggressive and add two stages of diversity and go to a state (4.0,1.7,2.3). If F>Th1 continues (unacceptable QoS) at state (5.7,2.3), then operations add diversity and go from state (5.7,2.3) to a state (4.0,1.7,2.3). If QoS becomes ameliorated, such that F<Th2, then operations are transitioned from state (4.0,1.7,2.3) to state (5.7,2.3) and/or from state (5.7,2.3) to state (8.0,0) as shown.

With the use of ratio R in the transition criteria, overall transmission rate changes from low rate ovals are advantageously arranged to be larger than rate changes on return transitions between higher rate ovals. Thus, successively smaller increases in rate are achieved with finer increases as higher rates (and attendant network burden) are approached.

Figure 30:
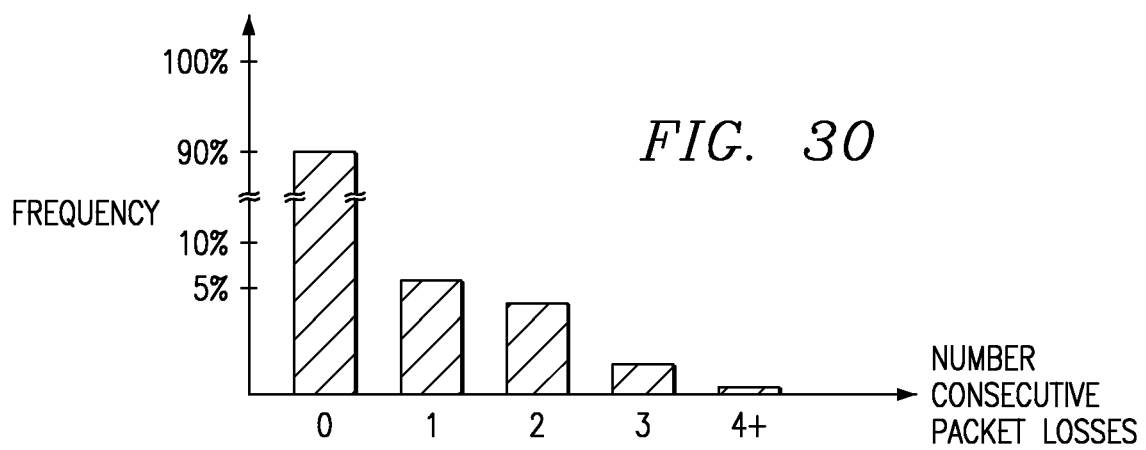
FIG. 30 is a histogram of frequency of consecutive packet losses versus number of consecutive packet losses.

FIG. 30 shows a histogram of frequency in percent versus number # of consecutive packet losses in a window time interval such as 5 seconds. The instances of packet losses are tabulated zero (no loss) where a packet is received, one (1: only one packet lost and not two or more consecutively), two (2: two packets lost consecutively and not 3 or more consecutively), three (3: three packets lost consecutively and not 4 or more consecutively) and four plus (4+: four or more packets lost consecutively).

The histogram information is here recognized as quite useful for rate/diversity adaptation purposes. Even though the packet loss rate might be the same in two different cases, the aggressiveness of adaptation measures is suitably made more aggressive if the histogram is more populated with higher numbers of packets lost consecutively.

Figure 31:
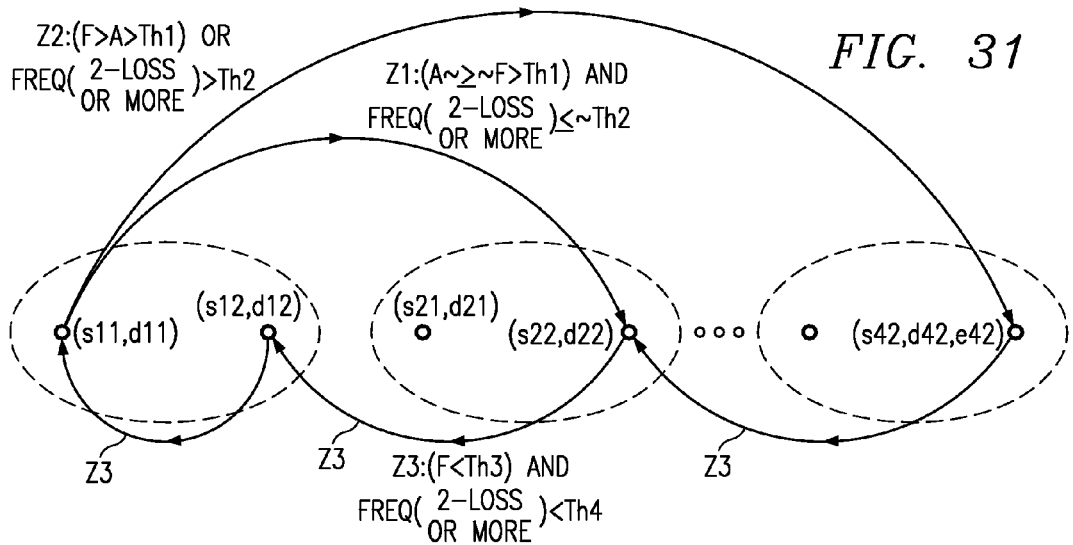
FIG. 31 is a state transition diagram for a process embodiment of adaptive control of combinations called states, of source rate and first and second diversity rate controlled according to the histogram of FIG. 30 in a media over packet computer.

FIG. 31 shows a state transition diagram for implementing selectively aggressive measures based on the histogram information of FIG. 30. The receiver 361' of FIG. 3 collects the information of the histogram and acts upon it directly, or sends the information of the histogram back to sender 331 for rate/diversity adaptation in sender 331.

In FIG. 31 operations suitably are arranged to begin at a high source rate and low (or zero) diversity state (s11,d11). Different criteria called z1 and z2 cause respectively moderate and aggressive adaptation measures based on the consecutive packet loss histogram information. If z1 occurs, then operations go from state (s11,d11) to reduce source rate and introduce an amount d22 of single diversity at state (s22,d22). This is the moderate adaptation.

If z2 occurs, then operations instead go from state (s11, d11) to reduce source rate and introduce two amounts of diversity d42,e42 at state (s42,d42,e42). This is the aggressive adaptation.

Criterion z1 is suitably established as (A≧F>Th1) AND frequency of two-consecutive-losses-or more is Th2 or less.

Criterion z2 is suitably established as (F>A>Th1) OR frequency of two-consecutive-losses-or more exceeds Th2.

If and when QoS becomes ameliorated, such that a criterion z3 is met, then operations are transitioned from state (s42,d42,e42) to state (s22,d22), and/or from state (s22,d22) to state (s12,d12), and/or from state (s12,d12) to state (s11, d11) as shown.

Criterion z3 is suitably established as (F<Th3) AND frequency of two-consecutive-losses-or more is less than a threshold Th4.

Th1 is suitably made 3%, Th2 is suitably 2%, Th3 is suitably 0.5% and Th4 is suitably 0.25%. The skilled worker suitably tunes the thresholds. Also, an automated tuning process suitably varies the thresholds over illustrative ranges 1-5% for Th1 and Th2, and over 0% to 2% for Th3 and Th4 for most satisfactory adaptation operation.

Note among other advantageous features of the process of FIG. 31 that the return transition from state (s42,d42,e42) to state (s22,d22) is suitably made to be a larger transition in overall transmission rate than the subsequent return transition from (s22,d22) to (s12,d12) and thence to (s11,d11). In this way, a smoother servo homing behavior is achieved.

FIG. 31 is interpreted in light of the embodiments and transition criteria earlier discussed herein, and it should be apparent that numerous embodiments varying the arrangements illustrated in FIG. 31 are also contemplated based on mixing and matching various criteria from other embodiments.

Figure 32:
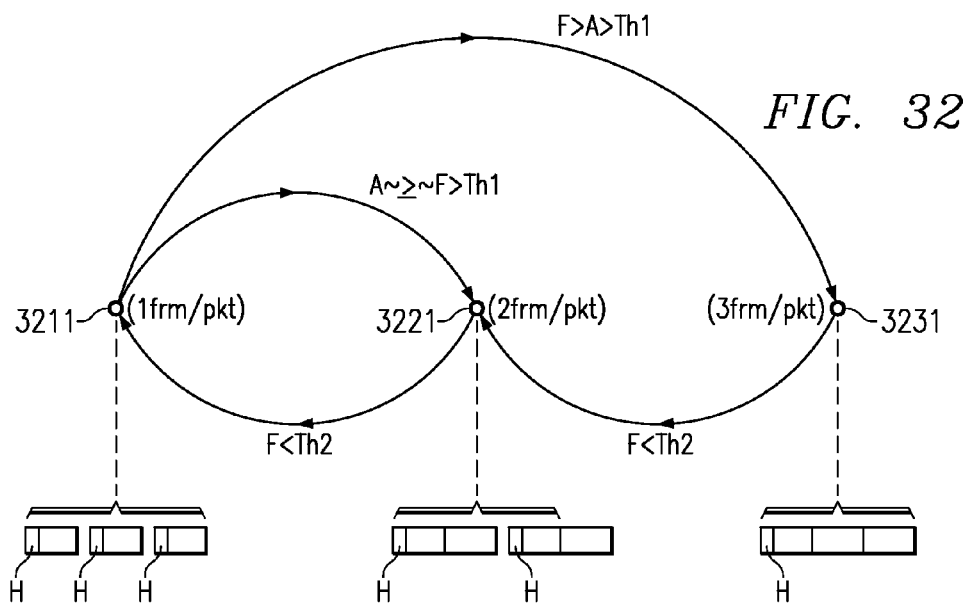
FIG. 32 is a diagrammatic representation of packets in three states of differing numbers of frames per packet combined with a process embodiment of adaptive control of those states in a media-over-packet computer.

FIG. 32 illustrates process, device and system embodiments applying a further concept of varying the number of frames per packet (frm/pkt) by transition from a state 3211 (1 frm/pkt) to a state 3221 (2 frm/pkt) when A≧F>Th1. When F>A>Th1 in state 3211, a more aggressive adaptation transition to a state 3231 (3 frm/pkt) occurs.

Bracketed sets of packets illustrate the meaning of each state. State 3211 corresponds to transmission of packets in a series of packets each with a header H and a payload comprising one frame of compressed data, sent at a certain number of packets per second and a certain number of frames per second.

A second state 3221 involves transmission of packets in a series of packets each with a header H and a payload comprising two frames of compressed data sent suitably (but not necessarily) at the same number of frames per second as in state 3211, but at a different and fewer number of packets per second. Notice that a brace indicates 3 payload frames corresponding to comparable information distributed differently among packets depending on which state is used.

A third state 3231 involves transmission of packets in a series of packets each with a header H and a payload comprising three frames of compressed data sent suitably (but not necessarily) at the same number of frames per second as in state 3211, but at a different and still fewer number of packets per second. Notice that 3 payload frames are included in the same one packet with its one header when state 3231 is used.

Return transitions occur when criterion F<Th2. One return transition takes operations from state 3231 to state 3221. Another return transition takes operations from state 3221 to state 3211.

Note that the criteria for transition are suitably selected according to any of the various embodiments elsewhere described herein.

Figure 33:
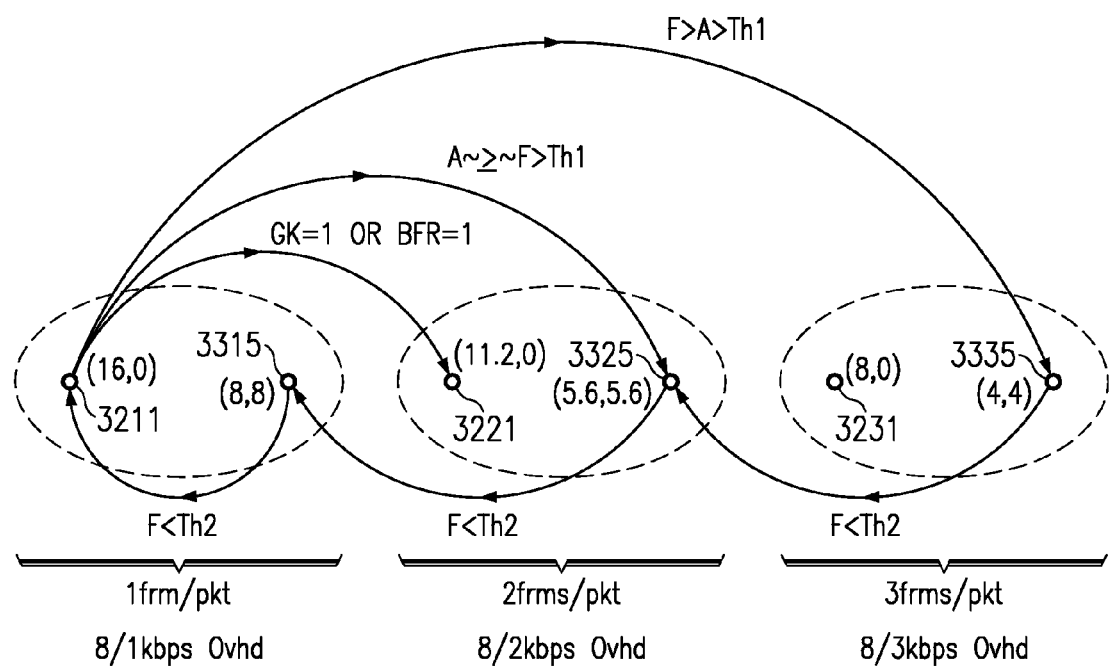
FIG. 33 is a state transition diagram for a process embodiment of adaptive control of combinations called states, of differing numbers of frames per packet and of source rate and diversity rate, in a media-over-packet computer.

The variable frames-per-packet embodiments are suitably augmented with time or path or combined time/path diversity as shown in FIG. 33. Note that ovals surround states that have the same overall transmission rate sij+dij. Suppose a transmission rate of header bits is 8 kbps of overhead (ovhd), for example, when the source rate is 16.0 kbps with one frame per packet. Then in other ovals the transmission rate overhead of header bits is the 8 kbps base rate divided by the number of frames per packet. So ovhd=4 kbps at 2 frm/pkt, and ovhd=8/3 kbps at 3 frm/pkt.

FIG. 33 illustrates process, device and system embodiments applying diversity and variable number of frames per packet (frm/pkt) using multiple description (MD) technology. In FIG. 33 operations transition from a state 3211 (1 frm/pkt, 16 kbps source rate, zero diversity rate) to a state 3325 (2 frm/pkt, (5.6 kbps source rate, 5.6 kbps diversity rate)) when A≧F>Th1. When F>A>Th1 in state 3211, a more aggressive adaptation transition to a state 3335 (3 frm/pkt, (4 kbps source rate, 4 kbps diversity rate)) occurs. Further in FIG. 33, a network condition GK=1 OR BFR=1 occurring when operations occupy state 3211, transitions the operations to a state 3221 (2 frm/pkt, 11.2 kbps, zero diversity).

Return transitions occur when criterion F<Th2. One return transition takes operations from state 3335 to state 3325. Another return transition takes operations from state 3325 to a state 3315 (1 frm/pkt, 8 kbps source rate, 8 kbps diversity rate). Another return transition takes operations from state 3315 to state 3211.

Flow diagrams of some processes for control of frames/packet are the same as FIG. 16 except the update-NEW-STATE steps 1621, 1623, 1629 and 1631 are programmed for frames per packet control. Thus, FIG. 25 steps 2515 and 2551 are enhanced by incrementing frames/packet therein. Also, FIG. 26 steps 2661 and 2671 are enhanced by decrementing frames/packet control bits to control RTP packet encapsulation 341 of FIG. 3 and packet encapsulation unit 1571 of FIG. 15. Packet headers are suitably updated with new frames/packet information as desired in steps 2541, 2561 and 2651.

Again, other criteria for the transitions as described elsewhere herein are suitably employed. Each of the types of time diversity, path diversity, and time/path diversity as described herein and in the incorporated U.S. Pat. No. 6,496,477 are contemplated for use in various embodiments.

Note that changing number of frames per packet, it may be advisable in some embodiments to make the frm/pkt transition only during a silence period following a talkspurt featuring unacceptable QoS. Other embodiments suitably make frm/pkt transition during a talkspurt without restriction.

Another embodiment performs a hybrid frame/packet adaptation: frame/packet increase occurs during both silence periods and active speech, but frame/packet decrease occurs during silence periods only. Steps 2515, 2551, 2661 and 2671 are correspondingly improved by preceding them with tests for presence of a talkspurt flag or a silence flag, so that the transitions occur according to the just mentioned logic embodiments that depend on silence only, or talkspurt, or during either silence or talkspurt. If the required test is not met, the respective step 2515, 2551, 2661 or 2671 is bypassed, and if the test is met the respective said step is performed.

Also, note a possible effect on some diversity methods when changing number of frames per packet. Suppose, for example, that a time diversity P(n)P(n−1)' in one packet is changed to P(n)P(n−1)' P(n+1)P(n)' by changing to more frames per packet. If the longer packet is lost, both P(n)' and P(n) are lost, meaning that all of the nth information is lost. Accordingly, some embodiments suitably change to a diversity method that is resistant to packet loss concurrently with (or at least close in time to) a transition from one number of frames per packet to a higher number of frames per packet.

Gateways, wireless base stations, private branch exchanges, networked appliances and other applications are suitably enabled by adaptive rate/diversity controls, chips, chipsets, printed circuit cards, and subsystems disclosed herein. Recoder and/or transcoding processes recodes or transcode the information and produces an output compressed and coded according to a different form than was received by a given device. It is contemplated that devices, processes and systems are suitably cascaded and integrated for various telecommunication and networking purposes. Where many channels are processed simultaneously, the systems are suitably replicated or multiplexed to the extent desired, so that software and hardware are effectively, efficiently and economically employed. Where blocks are shown herein, they are suitably implemented in hardware, firmware or software in any combination. The embodiments described are merely illustrative, while the scope of the inventive subject matter is defined by the claims and equivalents thereof.

What is claimed is:

1. A process of reconstructing a lost packet of voice information comprising:
   A. receiving an ordered stream of packets of voice information with each packet having a primary stage and a secondary stage, each secondary stage containing voice information only of long term predictive coding parameters, long term predictive lags, parity check, adaptive and fixed codebook gains, and no codebook pulses of a preceding packet;
   B. reproducing audible voice from the voice information in the primary stage of each packet in the stream of packets;
   C. failing to receive one, lost packet in order; and
   D. performing an audible voice excitation reconstruction of the lost packet from the voice information in the secondary stage of a packet following the one, lost packet.

2. The process of claim 1 in which the receiving includes receiving secondary stages that contain voice information on the immediately preceding packet.

3. The process of claim 1 in which the performing includes performing from the voice information in the secondary stage of a packet immediately following the one, lost packet.

4. The process of claim 1 in which the receiving includes receiving packets from a packet network.

5. The process of claim 1 in which the receiving includes receiving a sequence number in each packet.

* * * * *